(12) United States Patent
Dai et al.

(10) Patent No.: US 12,509,448 B2
(45) Date of Patent: Dec. 30, 2025

(54) SALTS OF INDOLEAMINE 2,3-DIOXYGENASE INHIBITORS

(71) Applicant: INVENTISBIO CO., LTD., Shanghai (CN)

(72) Inventors: Xing Dai, Shanghai (CN); Yueheng Jiang, Shanghai (CN); Yanqin Liu, Shanghai (CN)

(73) Assignee: INVENTISBIO CO., LTD., Shanghai (CN)

( * ) Notice: Subject to any disclaimer, the term of this patent is extended or adjusted under 35 U.S.C. 154(b) by 676 days.

(21) Appl. No.: 17/779,476

(22) PCT Filed: Nov. 23, 2020

(86) PCT No.: PCT/CN2020/130734
§ 371 (c)(1),
(2) Date: May 24, 2022

(87) PCT Pub. No.: WO2021/104186
PCT Pub. Date: Jun. 3, 2021

(65) Prior Publication Data
US 2023/0027952 A1    Jan. 26, 2023

(30) Foreign Application Priority Data

Nov. 25, 2019   (WO) ................ PCT/CN2019/120531

(51) Int. Cl.
| | | |
|---|---|---|
| *C07D 405/12* | (2006.01) | |
| *A61K 31/4433* | (2006.01) | |
| *A61K 45/06* | (2006.01) | |
| *A61P 31/10* | (2006.01) | |
| *A61P 35/00* | (2006.01) | |

(52) U.S. Cl.
CPC ........ *C07D 405/12* (2013.01); *A61K 31/4433* (2013.01); *A61K 45/06* (2013.01); *A61P 31/10* (2018.01); *A61P 35/00* (2018.01); *C07B 2200/13* (2013.01)

(58) Field of Classification Search
CPC ........ A61P 35/00; A61P 31/10; C07D 405/12; A61K 31/4433; A61K 45/06; C07B 2200/13
See application file for complete search history.

(56) References Cited

U.S. PATENT DOCUMENTS

| | | |
|---|---|---|
| 9,790,169 B2 | 10/2017 | Balog et al. |
| 10,167,254 B2 | 1/2019 | Balog et al. |
| 10,399,932 B2 | 9/2019 | Balog et al. |
| 10,399,933 B2 | 9/2019 | Balog et al. |
| 10,980,807 B2 * | 4/2021 | Dai ..................... C07D 257/04 |
| 2016/0289171 A1 | 10/2016 | Balog et al. |
| 2017/0231999 A1 | 8/2017 | Balog et al. |
| 2018/0072660 A1 | 3/2018 | Balog et al. |
| 2018/0079712 A1 | 3/2018 | Balog et al. |

FOREIGN PATENT DOCUMENTS

| | | |
|---|---|---|
| CN | 105324362 | 2/2016 |
| CN | 108260355 | 7/2018 |
| CN | 109071423 | 12/2018 |
| WO | 2014/150646 | 9/2014 |
| WO | 2017/051353 | 3/2017 |

OTHER PUBLICATIONS

Bastin, Richard J., Michael J. Bowker, and Bryan J. Slater. "Salt selection and optimisation procedures for pharmaceutical new chemical entities." Organic Process Research & Development 4, No. 5 (2000): 427-435) (Year: 2000).*
International Search Report for PCT/CN2019/120531 dated Jul. 29, 2020, 4 pages.
Written Opinion of the ISA for PCT/CN2019/120531 dated Jul. 29, 2020, 7 pages.
International Search Report for PCT/CN2020/130734 dated Mar. 3, 2021, 6 pages.
Written Opinion of the ISA for PCT/CN2020/130734 dated Mar. 3, 2021, 6 pages.

* cited by examiner

*Primary Examiner* — James H Alstrum-Acevedo
*Assistant Examiner* — Carolyn L. Ladd
(74) *Attorney, Agent, or Firm* — NIXON & VANDERHYE, PC

(57) ABSTRACT

Provided herein are compounds, salts, crystalline forms, and pharmaceutical compositions that are related to IDO inhibitors, in particular, Compound 1,1-(5-((4-chlorophenyl)amino)-6-(ethyl(tetrahydro-2H-pyran-4-yl)amino)pyridin-3-yl)cyclobutane-1-carboxylic acid. Also provided are methods of treating a disease or disorder such as a cancer or infectious disease that comprises administering to a subject in need thereof one or more of the compounds or compositions of the present disclosure.

Figure 1A:
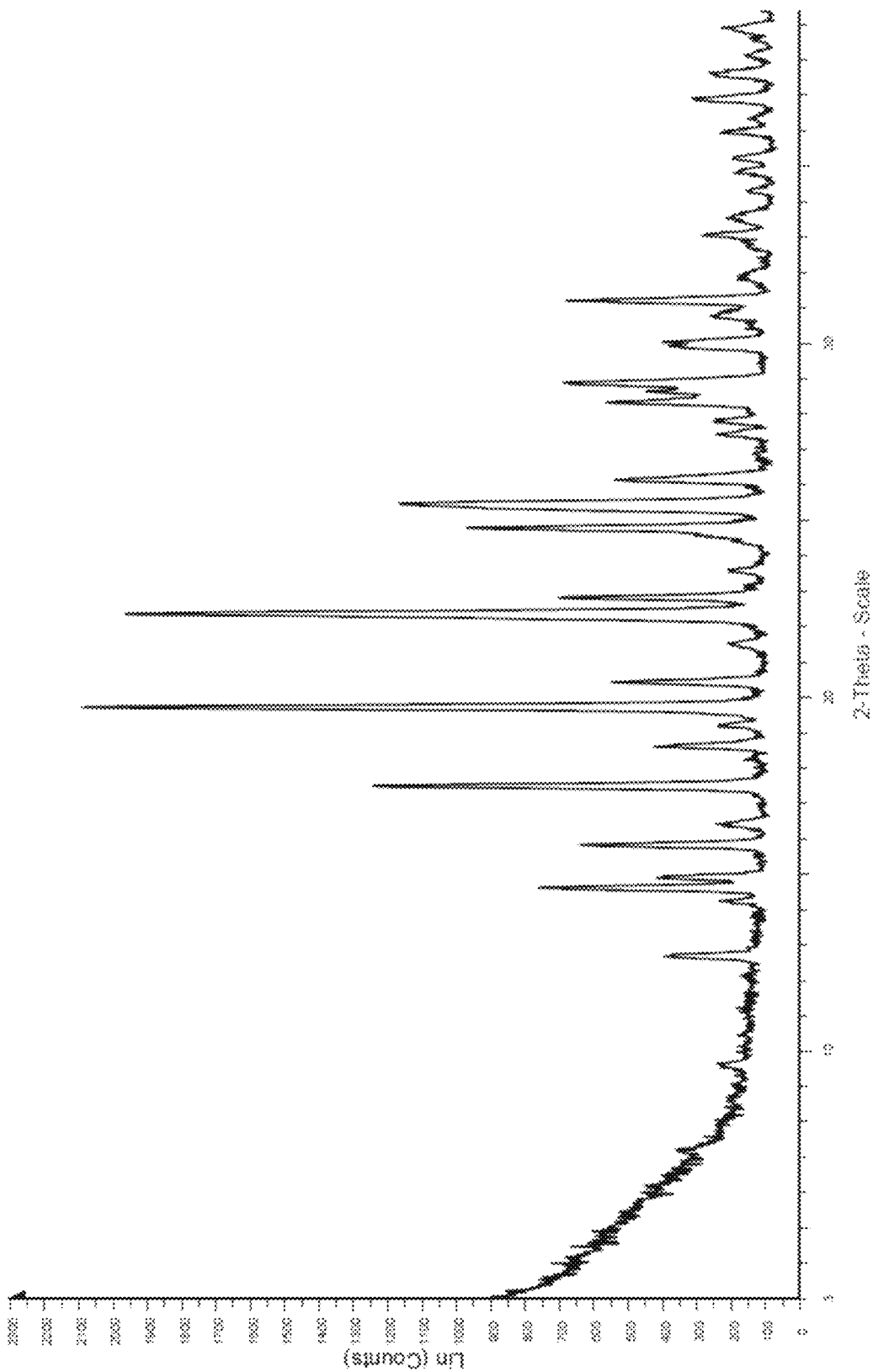

12 Claims, 18 Drawing Sheets

SALTS OF INDOLEAMINE 2,3-DIOXYGENASE INHIBITORS

This application is the U.S. national phase of International Application No. PCT/CN2020/130734 filed Nov. 23, 2020, which designated the U.S. and claims priority to International Application No. PCT/CN2019/120531 filed Nov. 25, 2019, the entire contents of each of which are hereby incorporated by reference.

BACKGROUND

Field of the Invention

In various embodiments, the present disclosure generally relates to Indoleamine 2,3-dioxygenase (IDO) inhibitors, pharmaceutical compositions comprising the same, and methods of preparation and use thereof.

Background Art

Indoleamine 2,3-dioxygenase (IDO), for example, Indoleamine 2,3-dioxygenase 1 (IDO1), is a family of heme-containing enzymes that catalyzes the degradation of the essential amino acid L-tryptophan to N-formylkynurenine. It plays an important role in the initial and rate limiting step in the breakdown of tryptophan.

It has been reported that IDO (e.g., IDO1), an enzyme induced by IFNγ, is one of the central regulators of immune responses in various physiological and pathological settings. IDO causes immunosuppression through breakdown of tryptophan in the tumor microenvironment. (Selvan et al., *Curr. Cancer Drug Targets,* 2015; Baren and Eynde Cancer Immunology Research, 2015). Overexpression of IDO was observed in various tumors (e.g., colorectal cancer, ovarian cancer, and breast cancer), which is thought to enable tumor cells escape from immunosurveillance. [Godin-Ethier et al., *Clinical Cancer Research,* 2011 November 15; 17 (22): 6985-91]. It was also found that Treg cells regulates IDO mediated tryptophan catabolism in dendritic cells. (Fallarino, et. al. Nature Immunology 2003). In addition, IDO has been associated with other diseases such as viral infections and Alzheimer's. Accordingly, IDO is a promising target in cancer, e.g., cancer immune-therapy, as well as in other diseases such as infectious diseases and Alzheimer's disease.

BRIEF SUMMARY

WO2017/139414 describes various IDO inhibitors as useful agents for treating various diseases or disorders such as a proliferative disease (e.g., cancer) or an infectious disease. In various embodiments, the present disclosure is directed to Compound 1, 1-(5-((4-chlorophenyl)amino)-6-(ethyl(tetrahydro-2H-pyran-4-yl)amino)pyridin-3-yl)cyclobutane-1-carboxylic acid and its salts, which can be for example, in an isolated form, a substantially pure form, and/or in a solid form. Further provided are pharmaceutical compositions comprising the IDO inhibitors such as Compound 1, methods of preparing the same, and methods of using the same.

Certain embodiments of the present disclosure are directed to the free acid Compound 1, which can be for example, in a substantially pure form and/or in a crystalline form. In some embodiments, the Compound 1 can be in a crystalline form II as described herein. In some embodiments, Compound 1 can be substantially pure, which can be incorporated into a pharmaceutical composition by itself. In some embodiments, the substantially pure Compound 1 can also facilitate preparation of the salts herein in a substantially pure form.

Certain specific embodiments of the present disclosure are directed to an acid addition salt of Compound 1, such as an HCl salt or an HBr salt. Not all tested acids can form an acid addition salt with Compound 1. As described herein, certain acid addition salts such as the HCl salt can have higher solubility than the free acid Compound 1. In some embodiments, the acid salt can also be prepared in high yield. Thus, in some embodiments, these acid addition salts can be more suited for certain pharmaceutical uses and developments.

In some embodiments, an HCl salt of Compound 1 is provided. In some embodiments, the HCl salt can be in an isolated form, a substantially pure form, and/or a solid form. Typically, the HCl salt herein can exist in a solid form, such as in a crystalline form or an amorphous form, or a mixture thereof. In some embodiments, the HCl salt can also be in a hydrate or solvate form. In some specific embodiments, the HCl salt can be in a crystalline form I as described herein.

In some embodiments, an HBr salt of Compound 1 is provided. In some embodiments, the HBr salt can be in an isolated form, a substantially pure form, and/or a solid form. Typically, the HBr salt herein can exist in a solid form, such as in a crystalline form or an amorphous form, or a mixture thereof. In some embodiments, the HBr salt can also be in a hydrate or solvate form. In some embodiments, the HBr salt of Compound 1 can be in a crystalline Form V as described herein.

Certain specific embodiments of the present disclosure are directed to a base addition salt of Compound 1, such as an alkali salt, including a sodium salt and potassium salt. In some embodiments, a potassium salt of Compound 1 is provided. In some embodiments, the potassium salt can be in an isolated form, a substantially pure form, and/or a solid form. Typically, the potassium salt herein can exist in a solid form, such as in a crystalline form or an amorphous form, or a mixture thereof. In some embodiments, the potassium salt can also be in a hydrate or solvate form. In some embodiments, the potassium salt of Compound 1 can be in a crystalline Form III as described herein.

In some embodiments, a sodium salt of Compound 1 is provided. In some embodiments, the sodium salt can be in an isolated form, a substantially pure form, and/or a solid form. Typically, the sodium salt herein can exist in a solid form, such as in a crystalline form or an amorphous form, or a mixture thereof. In some embodiments, the sodium salt can also be in a hydrate or solvate form. In some embodiments, the sodium salt of Compound 1 can be in a crystalline Form IV as described herein.

In some embodiments, the base addition salt can also be an amine salt, such as a meglumine salt or a tromethamine salt.

In some embodiments, the present disclosure also provides methods for preparing the salts of Compound 1. For example, in some embodiments, the present disclosure provides a method of preparing a hydrochloride salt of Compound 1, e.g., Form I. In some embodiments, the method comprises mixing Compound 1 and HCl in a solvent system to form the hydrochloride salt. In some embodiments, the method further comprises separating the HCl salt from the solvent system, such as by precipitating the HCl salt out (e.g., after cooling, as applicable, or adding an anti-solvent) from the solvent system. In some embodiments, the solvent system comprises isopropanol. In some embodiments, the solvent system is free or substantially free of a primary alcohol such as methanol or ethanol. Methods for preparing other salts of Compound 1 are described herein.

Compounds of the present disclosure can be used for preparing a pharmaceutical composition. In some embodiments, the pharmaceutical composition can comprise one or more of the compounds of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof).

The pharmaceutical compositions described herein can be formulated for any suitable routes of administration. In some embodiments, the pharmaceutical composition can be formulated for oral administration. For example, in some embodiments, the pharmaceutical composition can be a tablet or a capsule.

Certain embodiments of the present disclosure are directed to methods of using the compounds or compositions of the present disclosure. For example, in some embodiments, the present disclosure provides a method for treating a proliferative disease and/or a disease associated with IDO, in a subject in need thereof. In some embodiments, the method comprises administering to the subject an effective amount (e.g., therapeutically effective amount) of a compound of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof), or pharmaceutical composition described herein. In some embodiments, the disease associated with IDO is cancer or an infectious disease as described herein.

Compounds of the present disclosure can be used as a monotherapy or in a combination therapy. For example, in some embodiments, the method herein is for treating cancer in a subject in need thereof, the method comprising administering to the subject an effective amount (e.g., therapeutically effective amount) of a compound of the present disclosure. In some embodiments, the method can further comprise treating the subject with an additional anti-cancer therapy. In some embodiments, the additional anti-cancer therapy is immunotherapy, radiation therapy, chemotherapy, cell therapy, surgery and/or transplantation. In some embodiments, the method herein is for treating an infectious disease in a subject in need thereof, the method comprising administering to the subject an effective amount (e.g., therapeutically effective amount) of a compound of the present disclosure. In some embodiments, the infectious disease is a viral infection, and the subject is further treated with an additional anti-viral therapy. In some embodiments, the additional anti-viral therapy comprises administering to the subject an additional anti-viral agent or anti-viral vaccine.

It is to be understood that both the foregoing summary and the following detailed description are exemplary and explanatory only, and are not restrictive of the invention herein.

BRIEF DESCRIPTION OF THE DRAWINGS/FIGURES

Figure 1B:
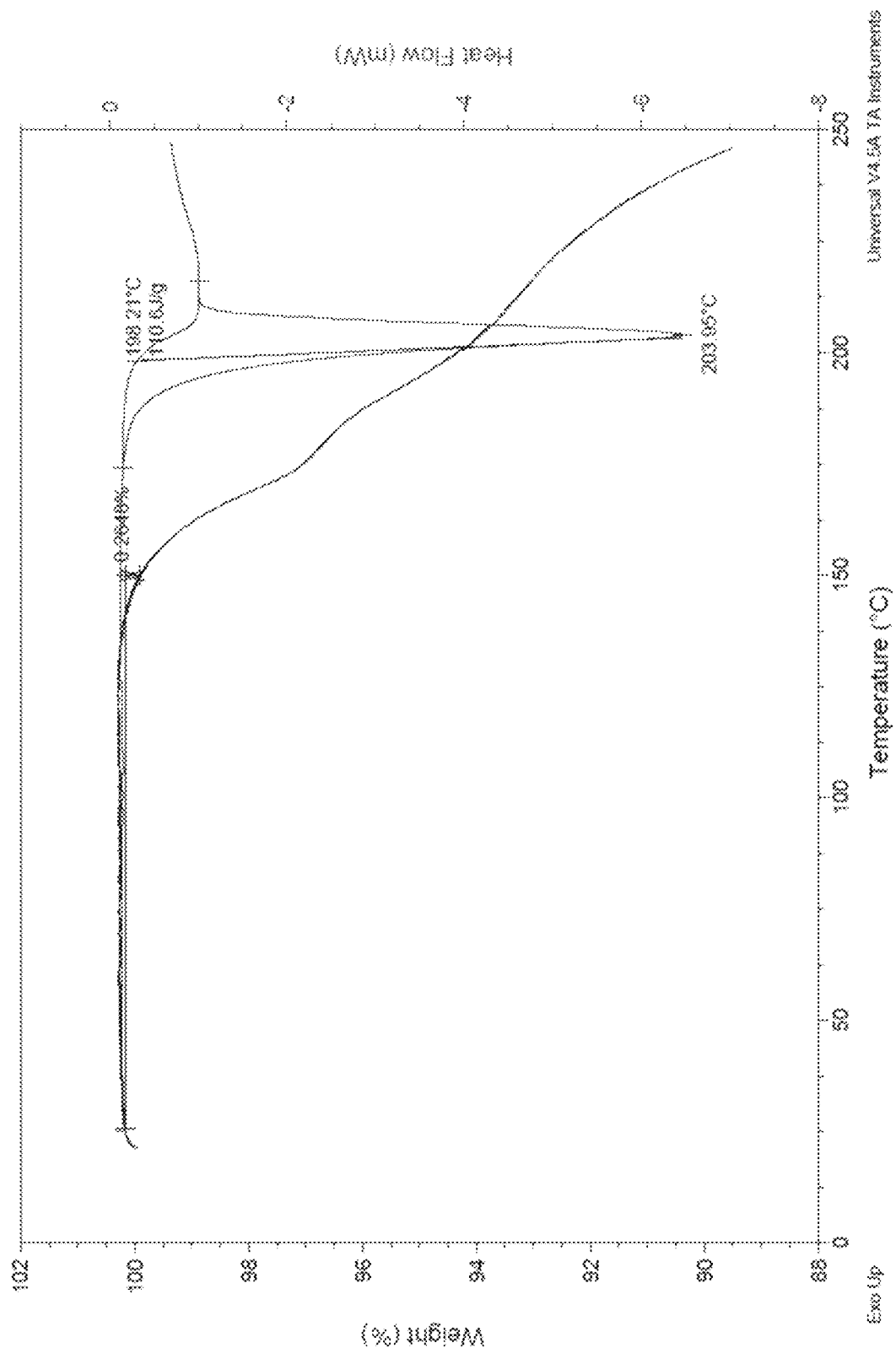
Figure 1C:
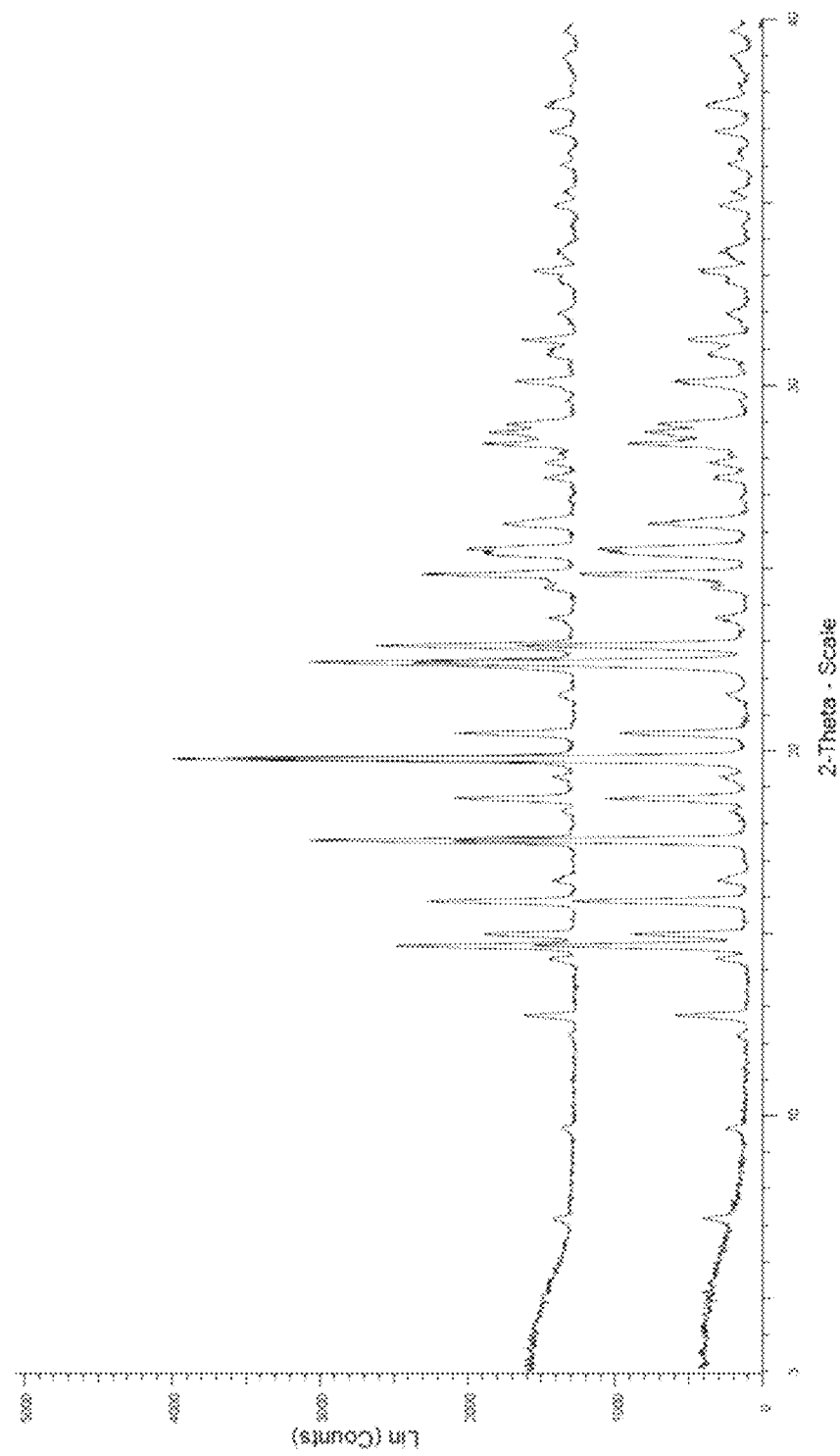
Figure 1D:
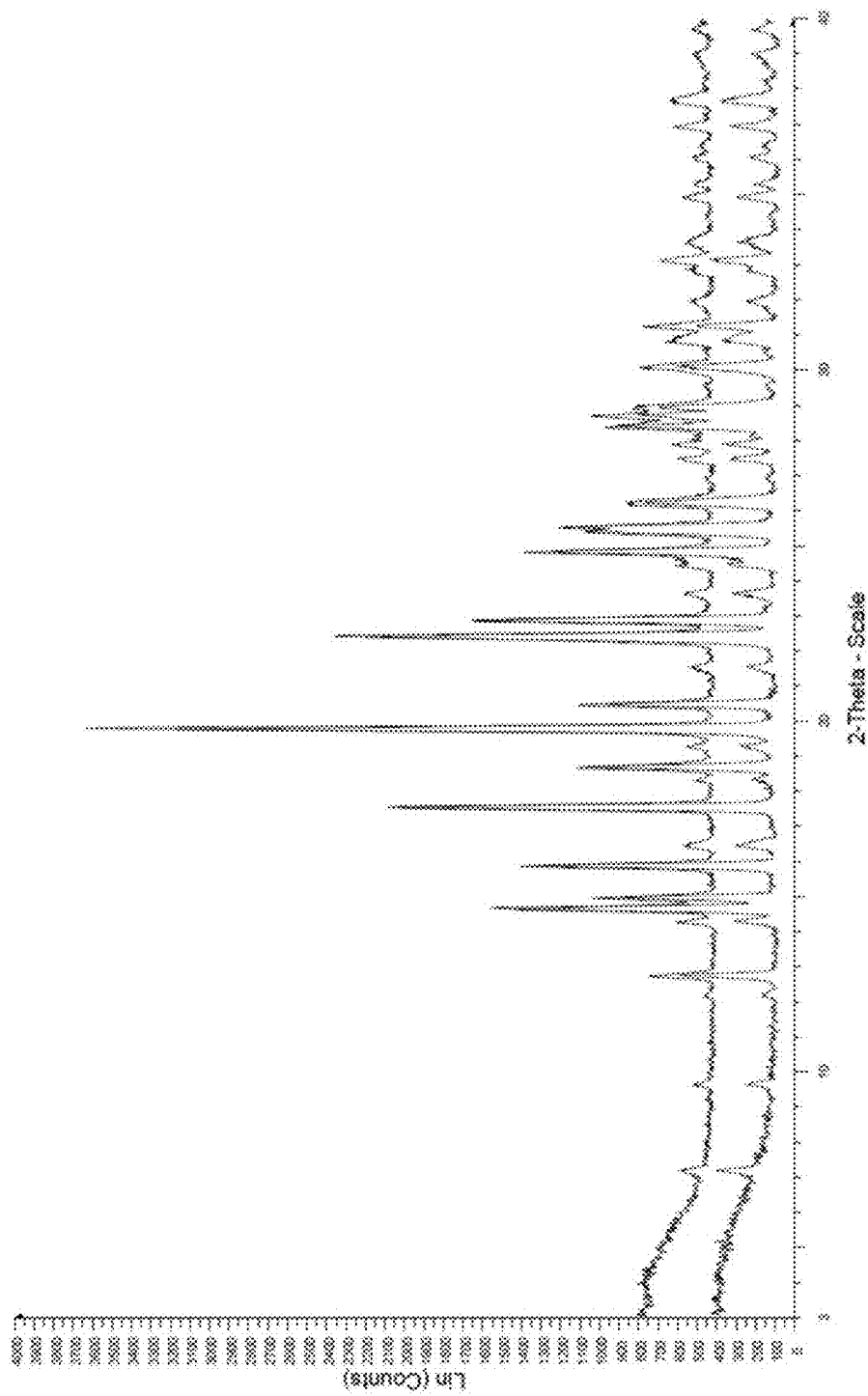
Figure 1E:
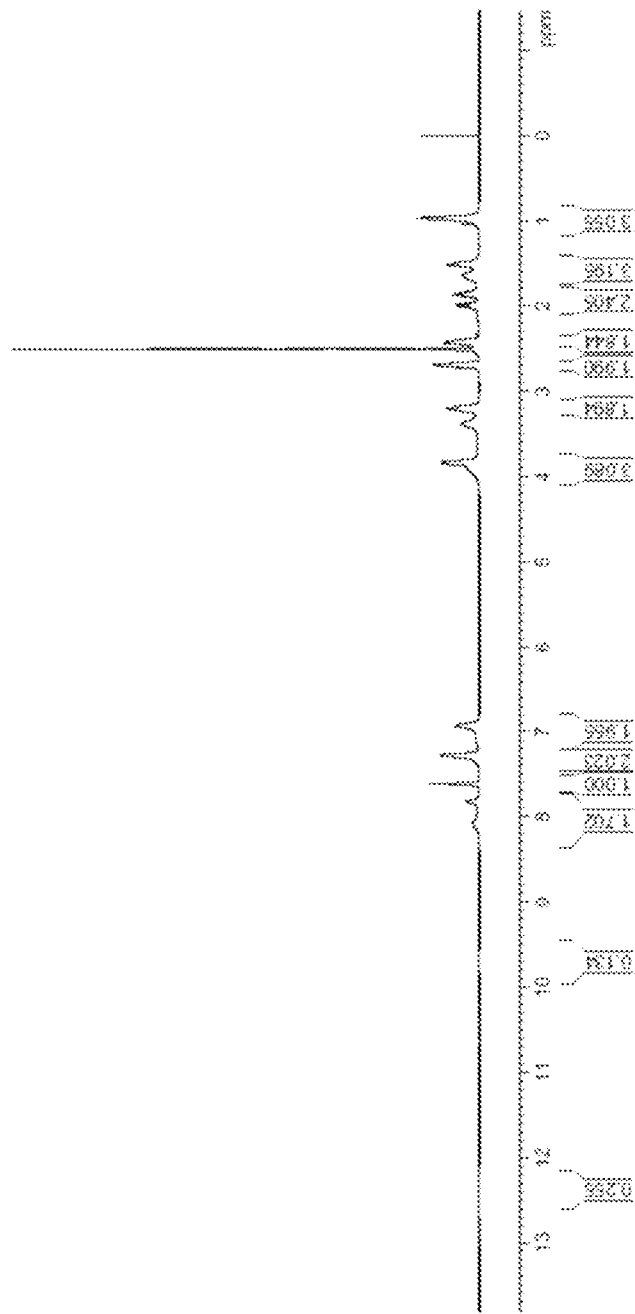
Figure 1F:
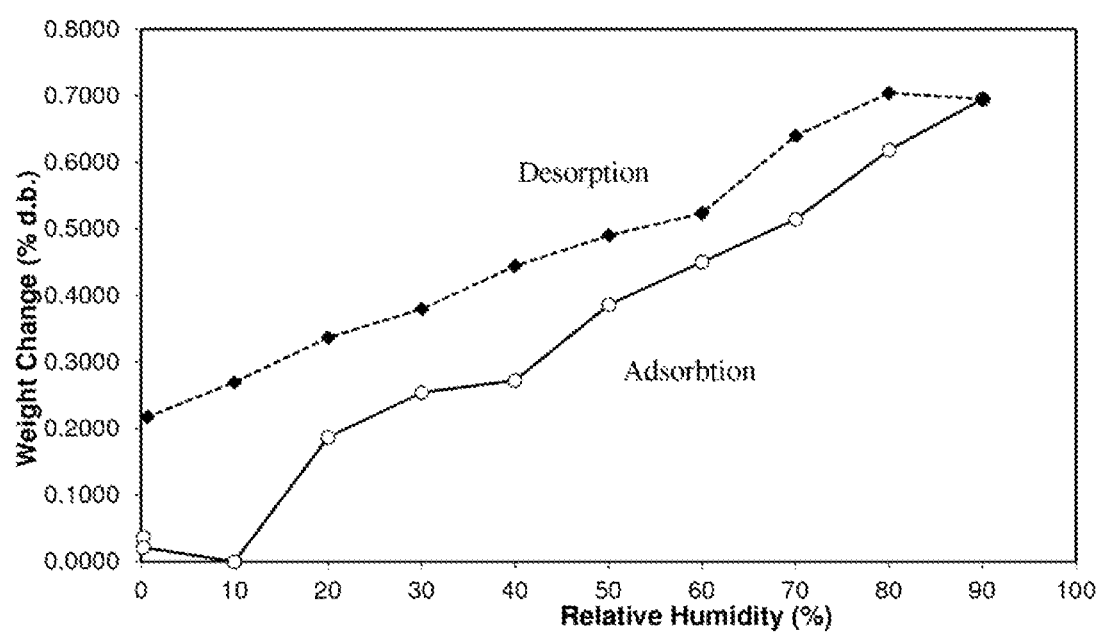

FIG. 1A shows a representative X-ray powder diffraction (XRPD) spectrum of crystalline form I of the hydrochloride salt of Compound 1. FIG. 1B shows a representative thermogravimetric analysis (TGA) and differential scanning calorimetry (DSC) analysis of crystalline form I of the hydrochloride salt of Compound 1. FIG. 1C presents XRPD spectra showing that Form I remained unchanged after storage under the condition of 25° C./92.5% RH for 10 days. FIG. 1D presents XRPD spectra showing that Form I remained unchanged after storage at 60° C. for 10 days. FIG. 1E presents a representative H NMR spectrum of the hydrochloride salt of Compound 1 in DMSO. FIG. 1F presents a representative Dynamic moisture sorption analysis (DVS) of the hydrochloride salt of Compound 1 in Form I. The XRPD spectra show that Form I remained unchanged after the DVS study (figure not shown).

Figure 2A:
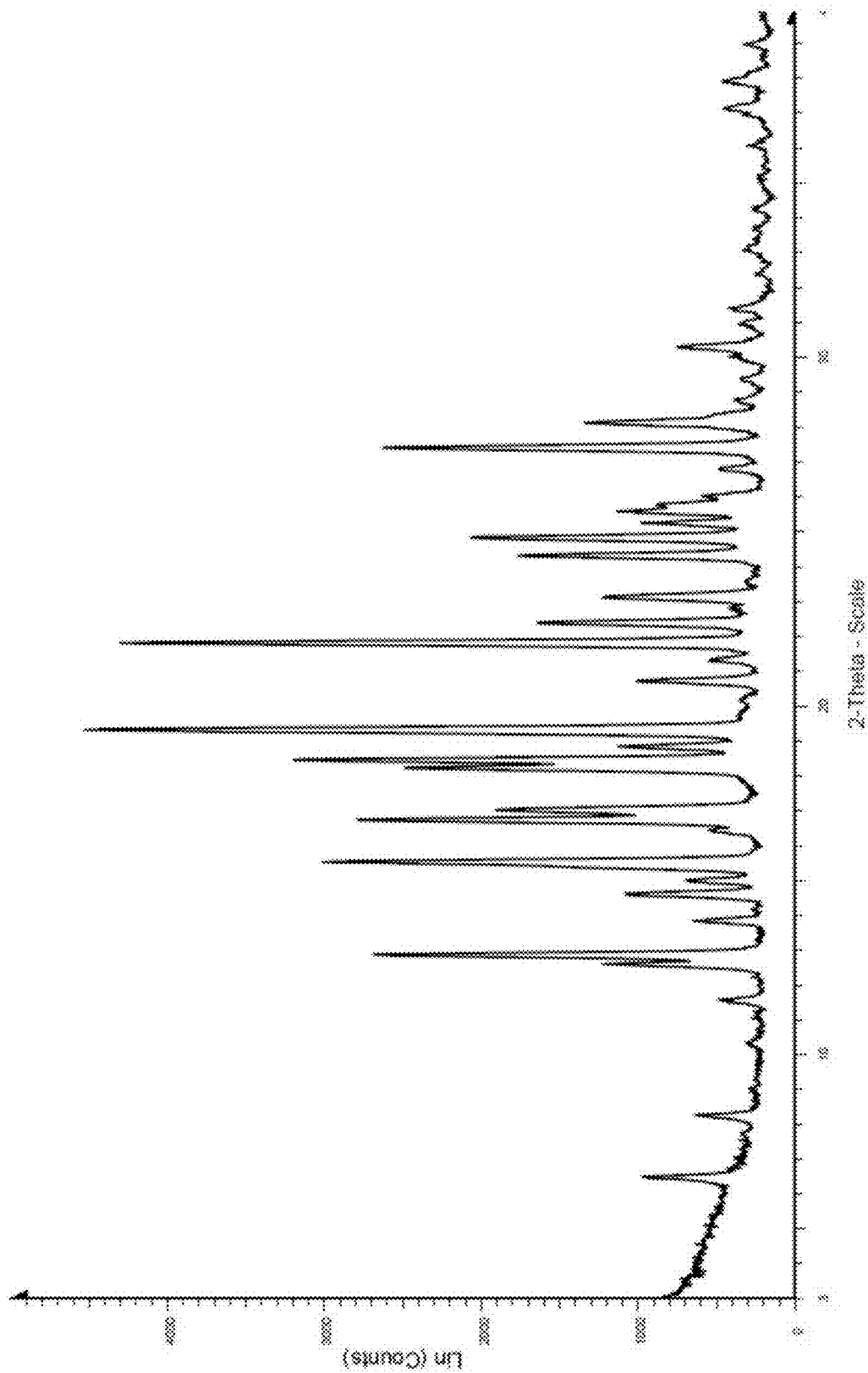
Figure 2B:
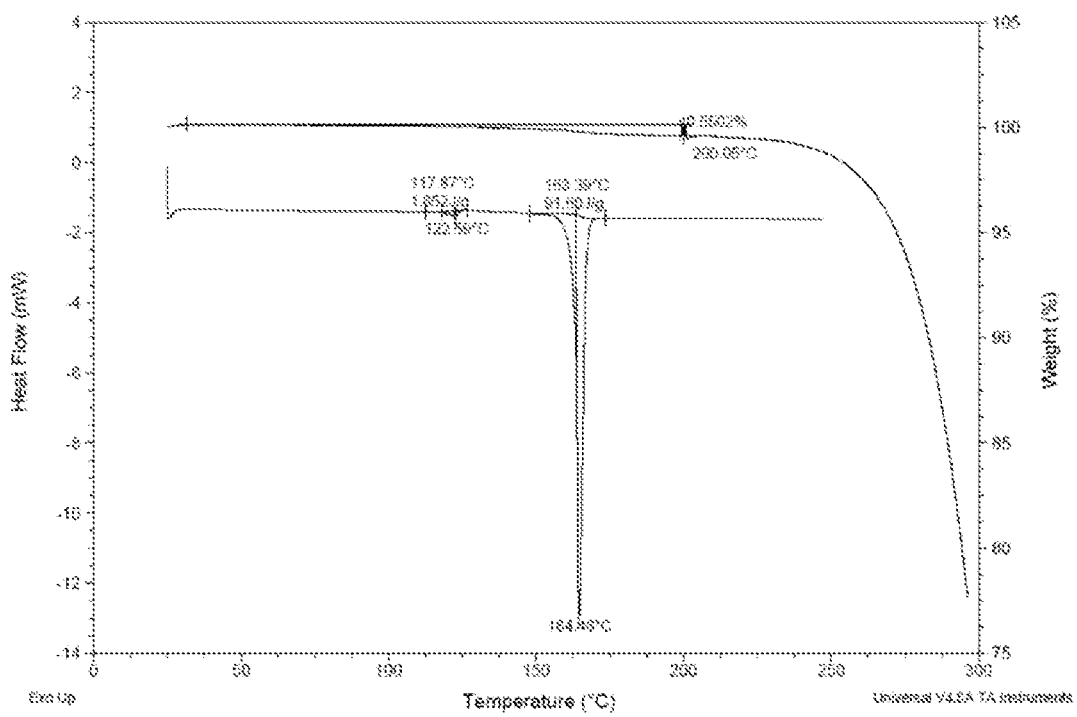
Figure 2C:
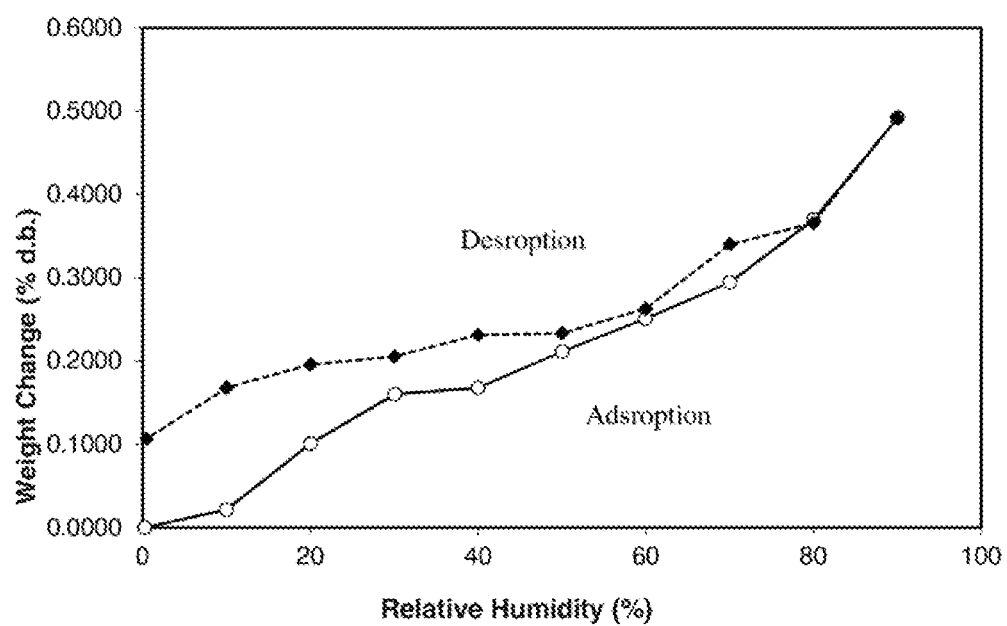
Figure 2D:
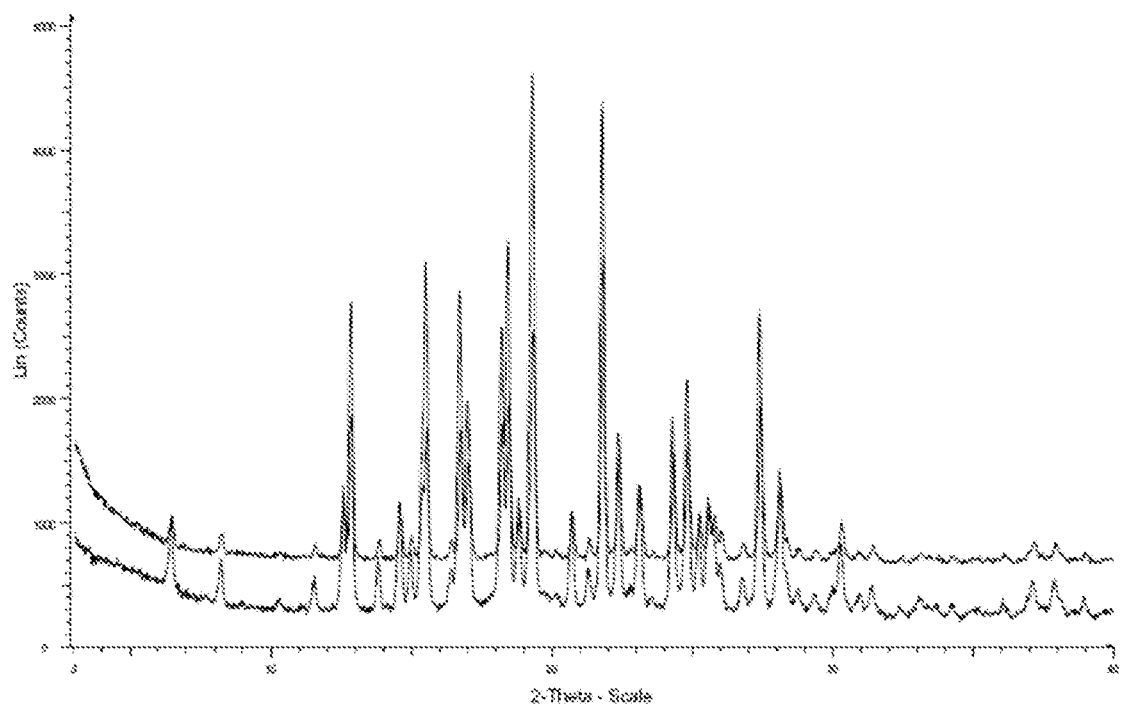

FIG. 2A shows a representative X-ray powder diffraction (XRPD) spectrum of crystalline form II of Compound 1 (free acid form). FIG. 2B shows a representative thermogravimetric analysis (TGA) and differential scanning calorimetry (DSC) analysis of crystalline form II of Compound 1 (free acid form). FIG. 2C presents a representative Dynamic moisture sorption analysis (DVS) of form II of Compound 1 (free acid form). FIG. 2D presents XRPD spectra showing that Form II remained unchanged after the DVS study.

Figure 3A:
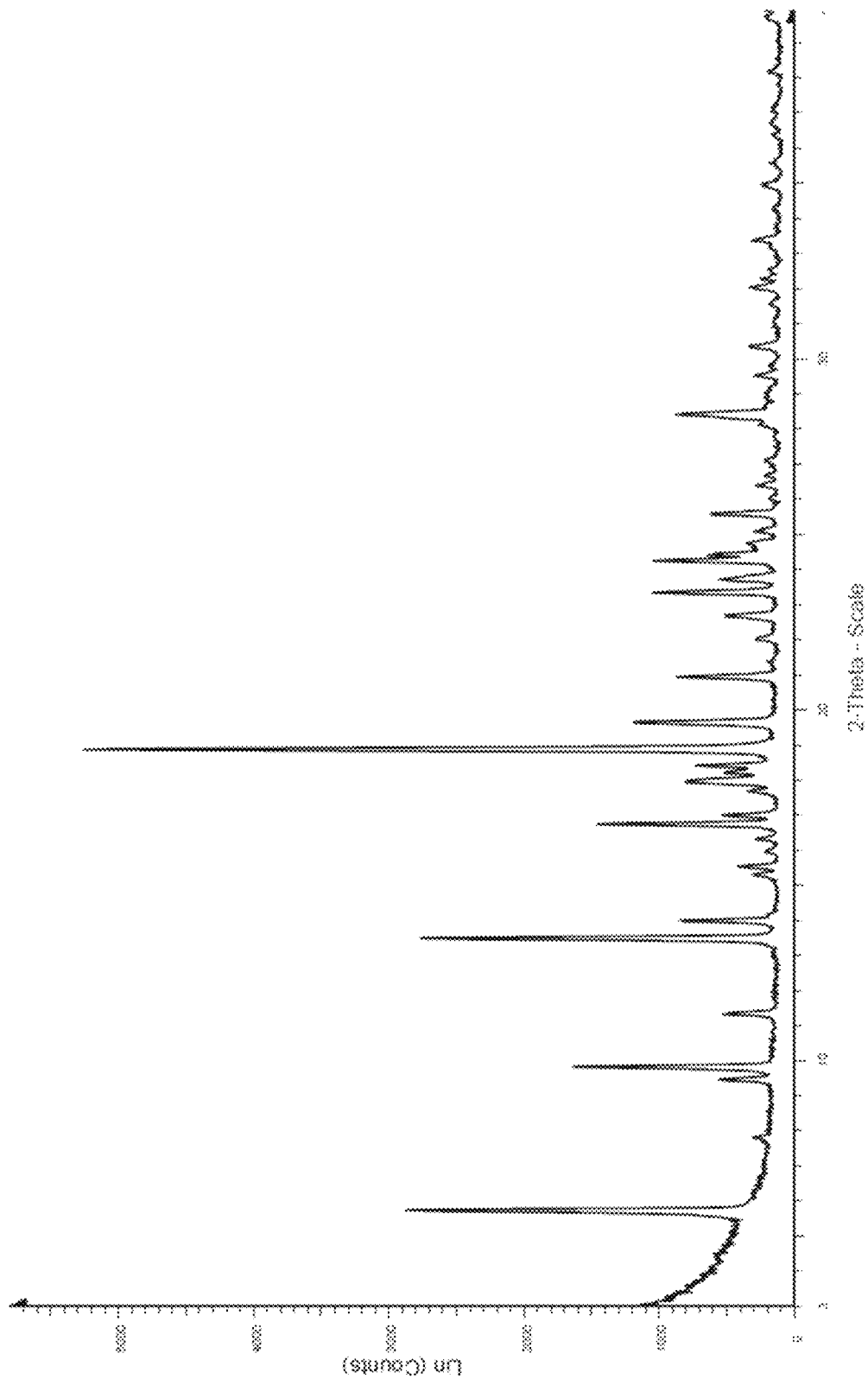
Figure 3B:
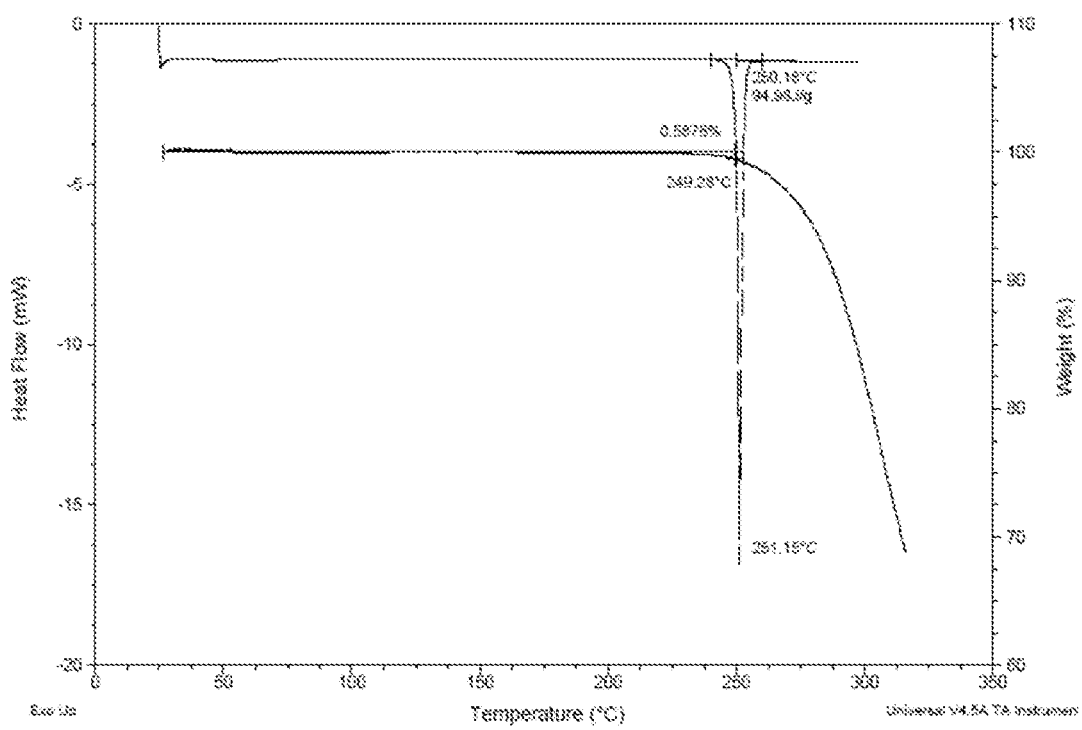
Figure 3C:
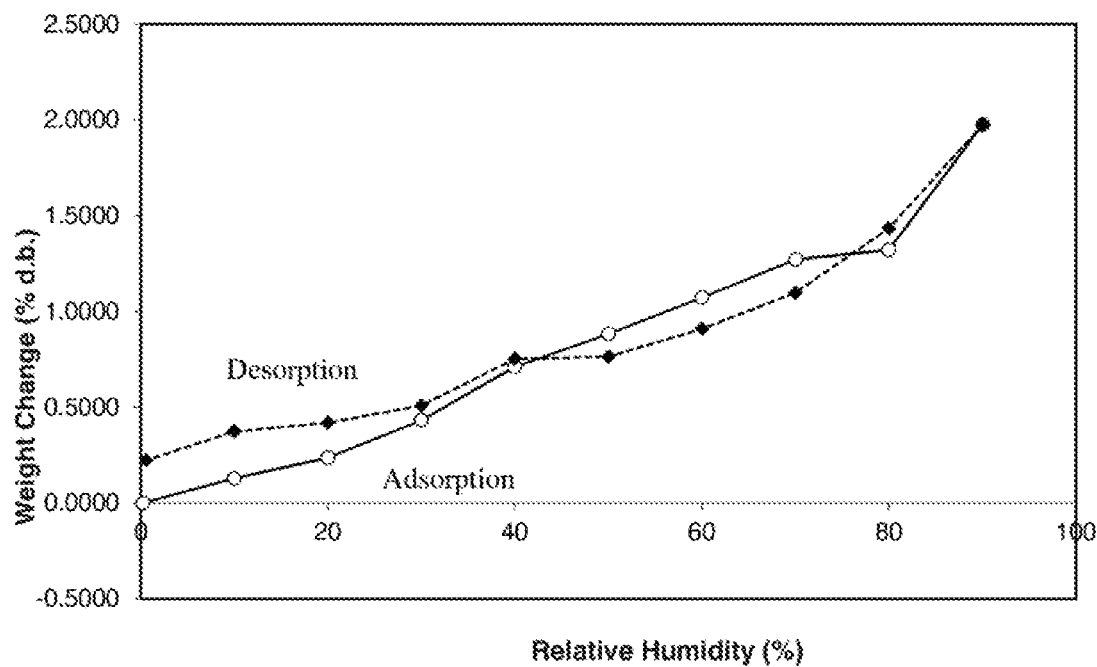
Figure 3D:
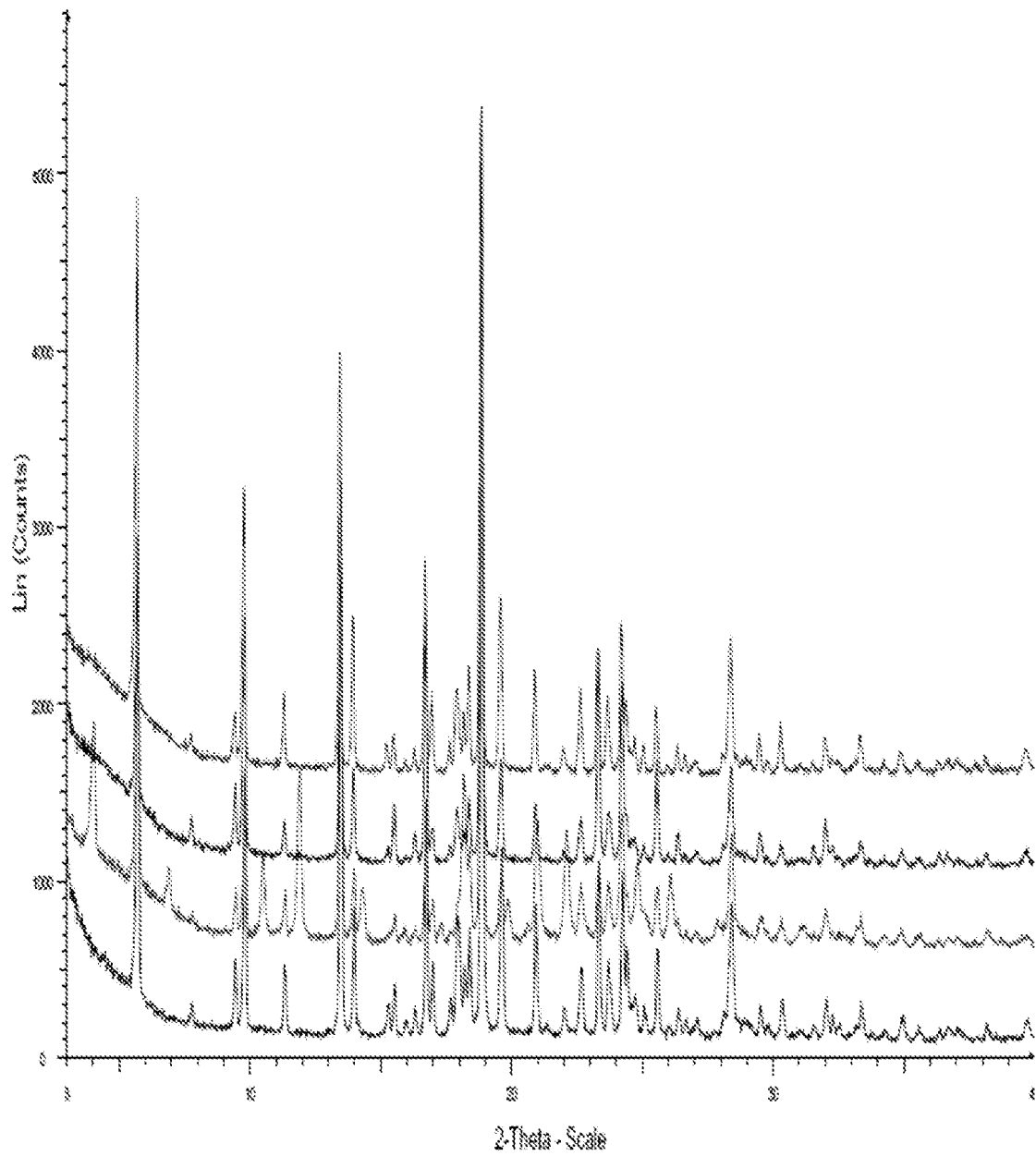
Figure 3E:
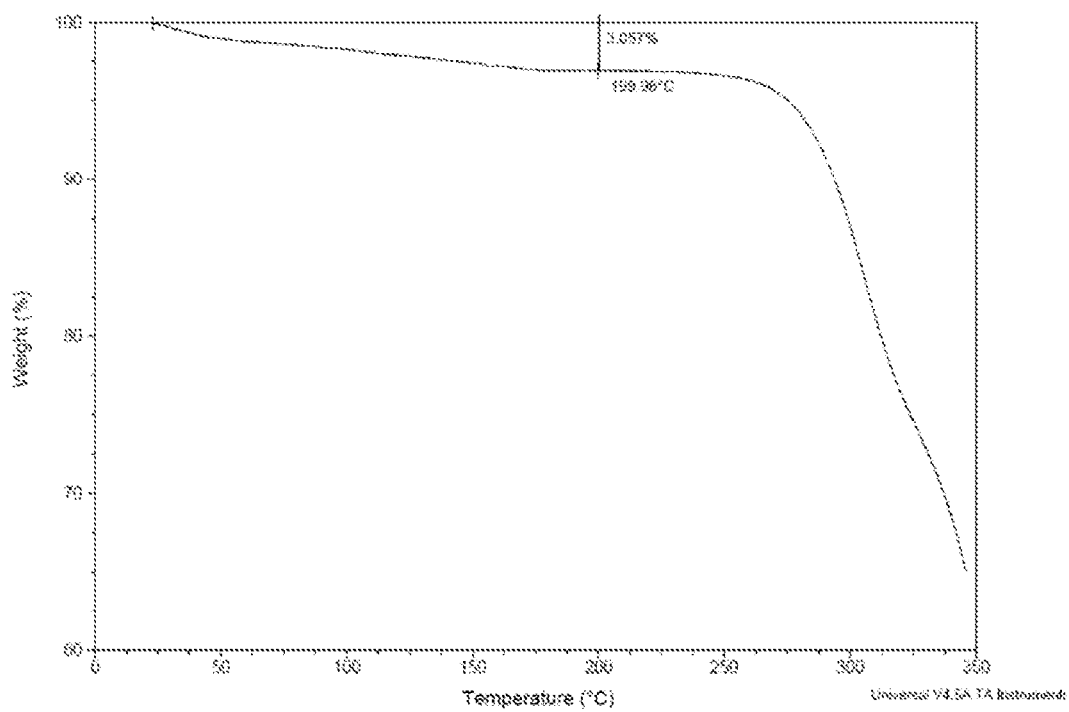

FIG. 3A shows a representative X-ray powder diffraction (XRPD) spectrum of crystalline form III of the potassium salt of Compound 1. FIG. 3B shows a representative thermogravimetric analysis (TGA) and differential scanning calorimetry (DSC) analysis of crystalline form III of the potassium salt of Compound 1. FIG. 3C presents a representative Dynamic moisture sorption analysis (DVS) of form III of the potassium salt of Compound 1. FIG. 3D presents XRPD spectra showing that the potassium salt obtained in a solvate form from concentrating its methanol solution. FIG. 3E presents a representative TGA spectrum showing that the potassium salt obtained from concentrating its methanol solution is a solvate.

Figure 4A:
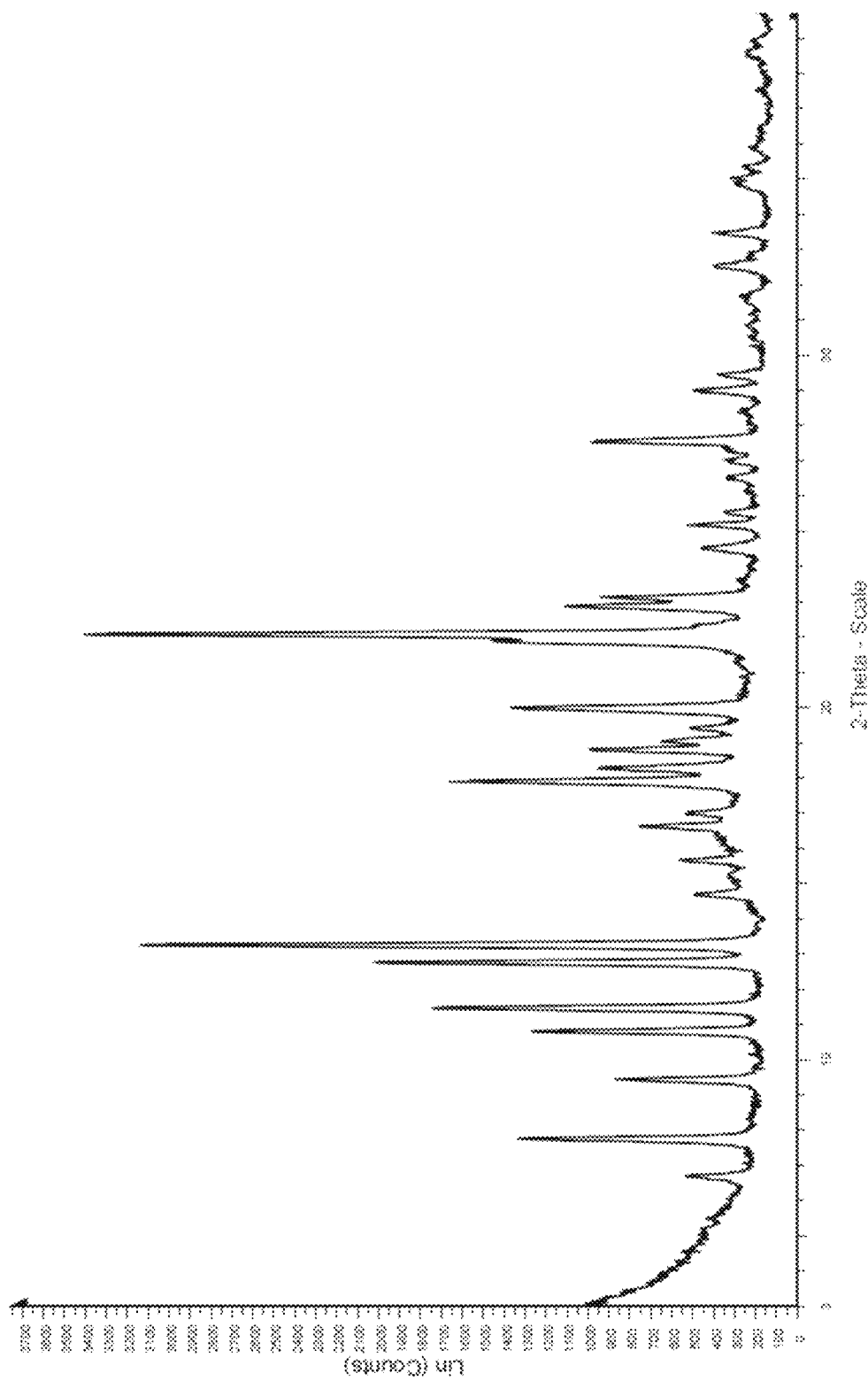
Figure 4B:
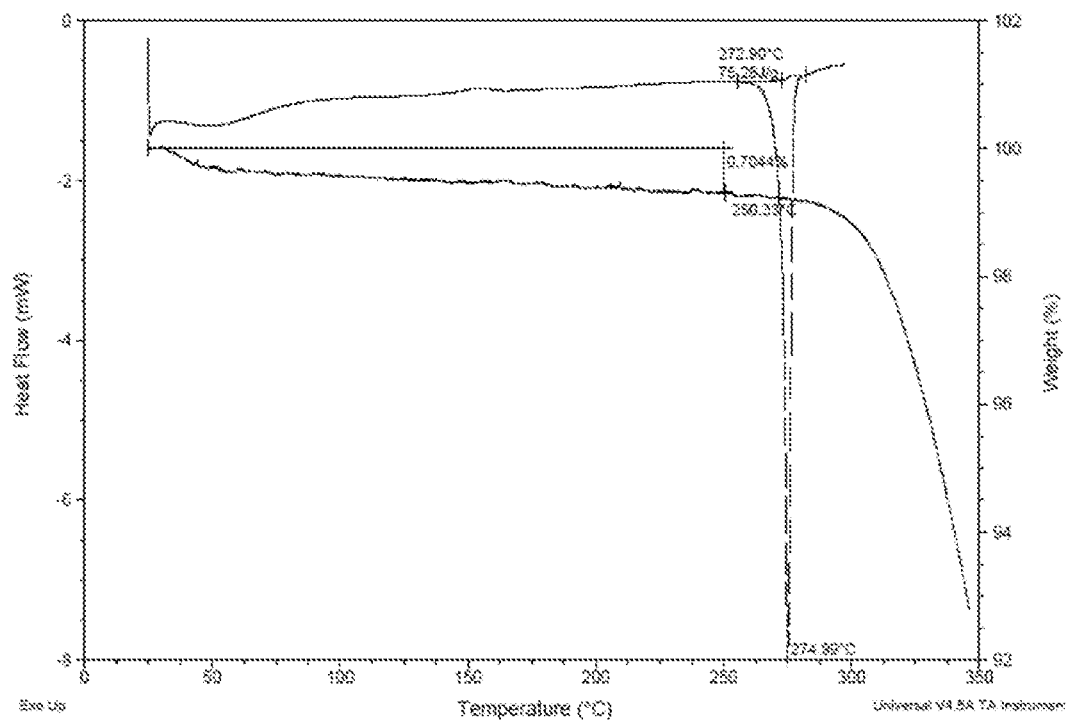
Figure 4C:
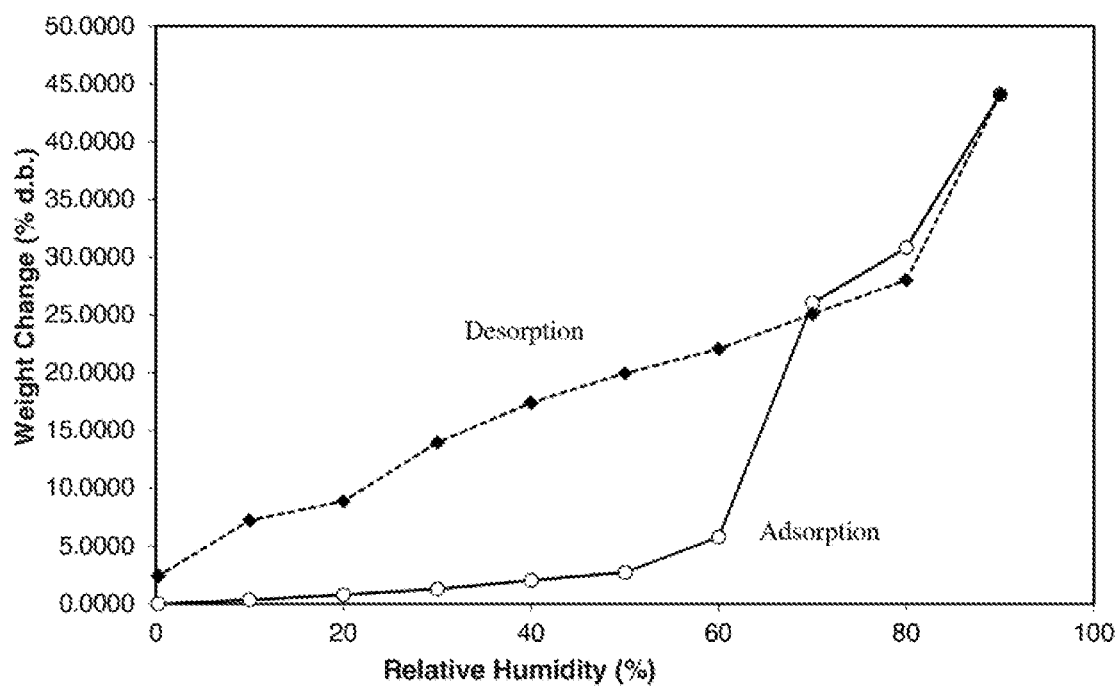
Figure 4D:
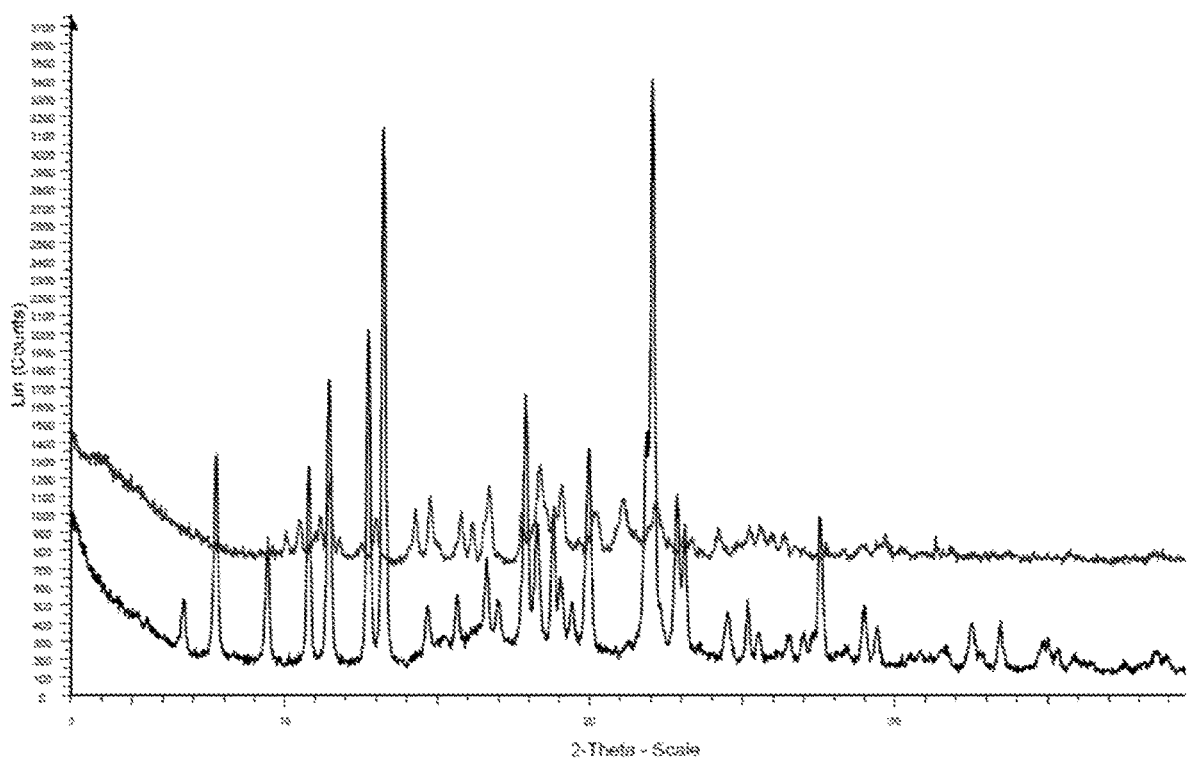

FIG. 4A shows a representative X-ray powder diffraction (XRPD) spectrum of crystalline form IV of the sodium salt of Compound 1. FIG. 4B shows a representative thermogravimetric analysis (TGA) and differential scanning calorimetry (DSC) analysis of crystalline form IV of the sodium salt of Compound 1. FIG. 4C presents a representative Dynamic moisture sorption analysis (DVS) of form IV of the sodium salt of Compound 1. FIG. 4D presents XRPD spectra showing that Form IV changed into a different form after the DVS study.

Figure 5A:
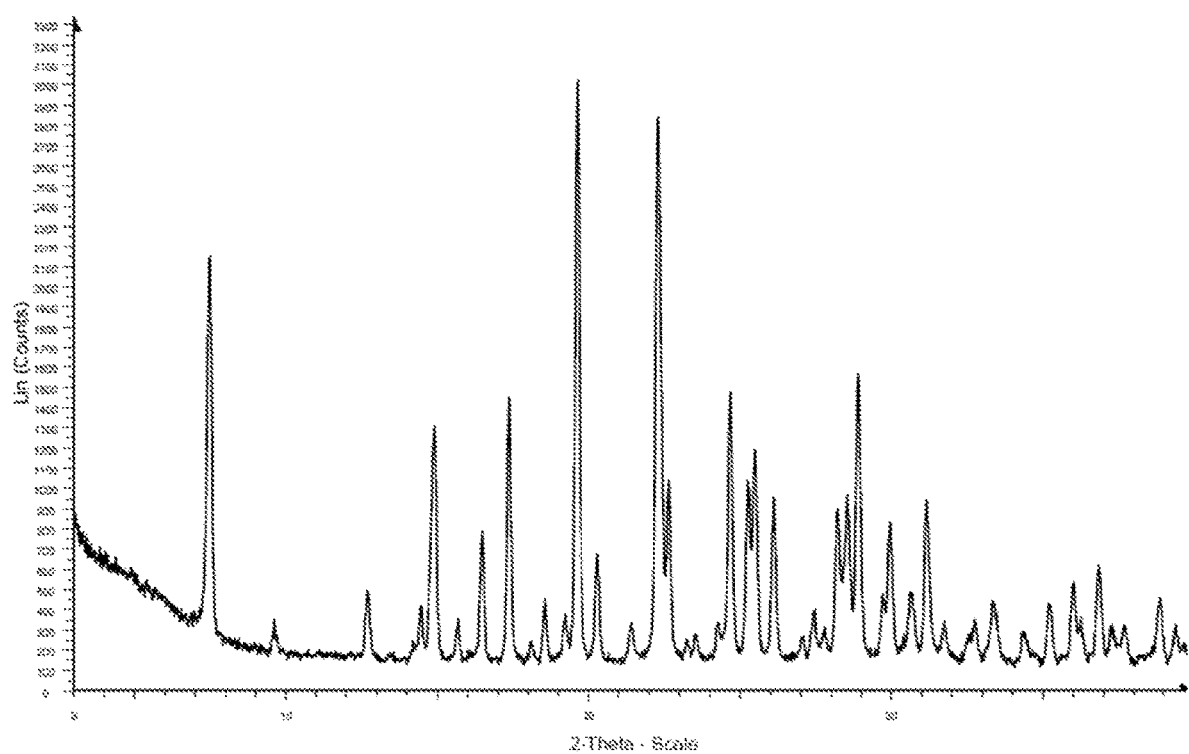
Figure 5B:
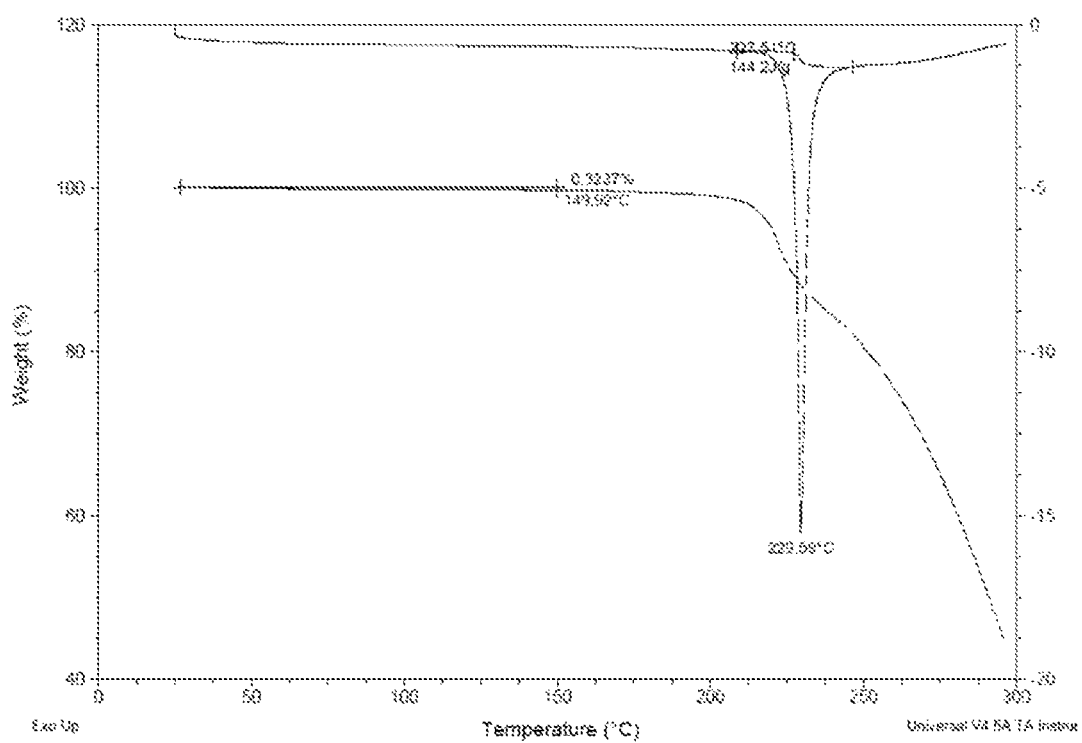

FIG. 5A shows a representative X-ray powder diffraction (XRPD) spectrum of crystalline form V of the hydrobromide salt of Compound 1. FIG. 5B shows a representative thermogravimetric analysis (TGA) and differential scanning calorimetry (DSC) analysis of crystalline form V of the hydrobromide salt of Compound 1.

DETAILED DESCRIPTION

In various embodiments, the present disclosure is directed to IDO inhibitors and salts thereof. As discussed in details herein, the present inventors have found that Compound 1, which has a chemical name of 1-(5-((4-chlorophenyl)amino)-6-(ethyl(tetrahydro-2H-pyran-4-yl)amino)pyridin-3-yl)cyclobutane-1-carboxylic acid, and can be represented by the following chemical structure:

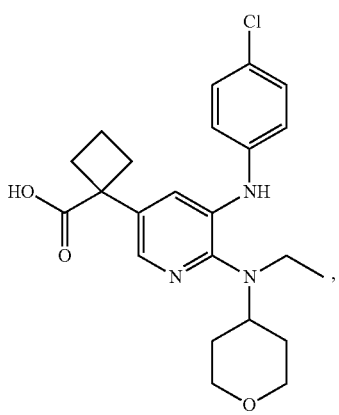

can form salts with certain acids and bases, but not others. Thus, in various embodiments, the present disclosure is directed to a salt of Compound 1, which can for example be in an isolated form, a substantially pure form, and/or in a solid form. In some embodiments, the provided salts can exist in a solid form, which can be a crystalline, solvate, hydrate, or amorphous form. These salts offer alternative ways for preparing, formulating, and using Compound 1. As exemplified in the Examples section, some representative salt forms such as the HCl salt, potassium salt, can have enhanced solubility in water compared to Compound 1 itself (i.e., the free acid form). Accordingly, in some embodiments, the salt forms herein can be more suited for various pharmaceutical uses compared to the free acid form.

Some embodiments of the present disclosure are also directed to methods of preparing Compound 1 and salts thereof, for example, in an isolated form, a substantially pure form, and/or in a solid form. As also exemplified in the Examples section, preparation of a salt of Compound 1, such as a base addition salt in its solid form, can be a low yielding process. However, the present inventors unexpectedly found that certain acid addition salts, such as the HCl salt of Compound 1, can be produced in high yield as a solid product, which process can be easily reproduced and can be scaled up for commercial manufacturing. Accordingly, certain embodiments of the present disclosure are also directed to these methods of preparations.

As described in PCT/US2017/017063, published as WO2017/139414, Compound 1 is an inhibitor of Indoleamine-2,3-dioxxygenase (IDO), which can be useful for treating or preventing diseases or disorders associated with IDO, such as cancer or infectious disease. Thus, some embodiments of the present disclosure are also directed to pharmaceutical compositions comprising Compound 1 or a salt thereof as described herein. In some embodiments, a method of treating or preventing a disease or disorder associated with IDO is also provided, which comprises administering to a subject in need thereof a therapeutically effective amount of the Compound 1 or a salt thereof as described herein, or a pharmaceutical composition described herein.

Compound 1

In some embodiments, the present disclosure is directed to Compound 1. Compound 1 and its synthesis were described in PCT/US2017/017063, published as WO2017/139414, the content of which is herein incorporated by reference in its entirety. Compound 1 can be referred to herein as in its free acid form to distinguish it from a salt formed with an external acid or base, even though internal ionization of the carboxylic acid function in Compound 1 is theoretically possible. Unless obvious from context, for example, referred to as existing in a salt form, Compound 1 should be understood as in its free acid form as discussed.

In some embodiments, the present disclosure provides Compound 1 in a substantially pure form and/or in a crystalline form. In some embodiments, the Compound 1 in a substantially pure form and/or a crystalline form can be used to prepare a pharmaceutical composition directly. In some embodiments, the Compound 1 in a substantially pure form and/or a crystalline form can be used to prepare a salt herein.

In some embodiments, the Compound 1 is in a crystalline form. In some embodiments, the Compound 1 is in a crystalline Form II. In some embodiments, crystalline Form II can be characterized by (1) an X-ray powder diffraction (XRPD) pattern having one or more (e.g., 1, 2, 3, 4, 5, 6, 7, or 8) of the following peaks: 12.8, 15.5, 16.7, 18.2, 18.4, 19.3, 21.8, and 27.4 degrees 2 theta, ±0.2°; (2) an X-ray powder diffraction (XRPD) pattern having one or more (e.g., 6 or more, 8 or more, 12 or more, or all) of the following peaks: 6.4, 12.6, 12.8, 14.6, 15.5, 16.7, 17.0, 18.2, 18.4, 18.8, 19.3, 20.7, 21.8, 22.4, 23.1, 24.3, 24.8, 25.3, 25.6, 27.4, and 28.1 degrees 2 theta, ±0.2°; (3) an XRPD pattern substantially the same as shown in FIG. 2A; (4) a Differential Scanning Calorimetry (DSC) pattern substantially the same as shown in FIG. 2B; or any combination thereof (e.g., (1) and (4), (2) and (4), (1), (2) and (4), or (3) and (4)). In some embodiments, the crystalline Form II can be characterized by an XRPD pattern having the major peaks (e.g., peaks with relative intensity of 20% or above, 30% or above, 40% or above, 50% or above, 60% or above, 70% or above, 80% or above, or 90% or above) of FIG. 2A or as shown in Table 1, degrees 2 theta, ±0.2°. To be clear, when it is said that the XRPD pattern of Form II has the major peaks of FIG. 2A or Table 1 or is substantially the same as FIG. 2A, it does not require that the XRPD pattern have the same relative intensities for the corresponding peaks as shown in FIG. 2A or Table 1, as applicable. It suffices that the XRPD pattern includes the peaks at the respective diffraction angels (degrees 2 theta, ±0.2°) corresponding to the peaks as shown in FIG. 2A or Table 1, as applicable, regardless of their relative intensities. Similar expressions as to other crystalline forms herein should be understood similarly. In some embodiments, the crystalline Form II can be characterized by an XRPD pattern having all of the following peaks: 12.8, 15.5, 16.7, 18.2, 18.4, 19.3, 21.8, and 27.4 degrees 2 theta, ±0.2°. In some embodiments, the crystalline Form II can also be characterized by a DSC pattern having an endotherm peak with an onset temperature of about 163.4° C. and/or peak temperature at about 164.5° C. In some embodiments, the crystalline Form II is substantially the same as the crystalline form obtained in Example 2 of this application.

The Compound 1 in crystalline Form II can be prepared by methods described herein. For example, in some embodiments, Compound 1 in crystalline Form II can be prepared by dissolving Compound 1 in a first solvent, such as ethyl acetate, to form a solution, and then adding an anti-solvent, such as heptane, to the solution to precipitate Compound 1. An exemplified procedure is shown in Example 2.

In some embodiments, the Compound 1 can be characterized as being substantially pure. In some embodiments, the Compound 1 can be characterized by a purity by weight and/or by HPLC area of about 70%, about 75%, about 80%, about 85%, about 90%, about 95%, about 97%, about 99%, or any ranges between the specified values. For example, in some embodiments, the Compound 1 can be characterized by a purity by HPLC area of about 70%, about 75%, about 80%, about 85%, about 90%, about 95%, about 97%, about 99%, or any ranges between the specified values. The substantially pure Compound 1 can be in a solid form (e.g., crystalline Form II, amorphous form, or a combination thereof) or in a solution, suspension, or another form. In some embodiments, the substantially pure Compound 1 can be in crystalline Form II.

Acid Addition Salt

In some embodiments, the present disclosure is directed to an acid addition salt of Compound 1. In some specific embodiments, the acid addition salt is an HCl salt or an HBr salt of Compound 1. As shown in the Examples section, not all acids can form an acid addition salt with Compound 1 under the tested conditions. For example, HCl acid, HBr acid, methanesulfonic acid and benzenesulfonic acid formed salts with Compound 1 under the tested conditions, whereas Phosphoric acid, L-Tartaric acid, Succinic acid and Maleic acid did not.

In some embodiments, an HCl salt of Compound 1 is provided. In some embodiments, the HCl salt can be in an isolated form, a substantially pure form, and/or a solid form. Typically, the HCl salt herein can exist in a solid form, such as in a crystalline form or an amorphous form, or a mixture thereof. In some embodiments, the HCl salt can also be in a hydrate or solvate form.

As detailed in the Examples section, the HCl salt of Compound 1 (e.g., in Form I) can be more suited for various pharmaceutical uses compared to Compound 1 and its various other salts such as sodium or potassium salt. For example, the HCl salt was found to be more soluble than Compound 1. The HCl salt of Compound 1 was also found to be physically and chemically stable at 40° C./75% RH (relative humidity) during testing period. In the DVS test, the HCl salt was found to have low hygroscopicity, only absorbed less than 0.7% at 80% RH, which is in sharp contrast to the sodium salt of Compound 1 that absorbed about 30% water at 80% RH. The process of the HCl salt preparation was also more feasible for production, which is more repeatable with higher yield compared to the potassium salt preparation.

In some embodiments, the present disclosure provides the HCl salt of Compound 1 in a crystalline Form I. In some embodiments, the crystalline Form I can be characterized by (1) an X-ray powder diffraction (XRPD) pattern having one or more (e.g., 1, 2, 3, 4, or 5) of the following peaks: 14.7, 17.5, 19.8, 22.4, 22.9 degrees 2 theta, ±0.2°; (2) an X-ray powder diffraction (XRPD) pattern having one or more (e.g., 6 or more, 8 or more, 12 or more, or all) of the following peaks: 12.7, 14.7, 15.0, 15.9, 17.5, 18.7, 19.8, 20.5, 22.4, 22.9, 24.8, 25.5, 26.2, 28.4, 28.7, 29.0 and 30.1 degrees 2 theta, ±0.2°; (3) an XRPD pattern substantially the same as shown in FIG. 1A; (4) a Differential Scanning Calorimetry (DSC) pattern substantially the same as shown in FIG. 1B; or any combination thereof (e.g., (1) and (4), (2) and (4), (1), (2) and (4), or (3) and (4)). In some embodiments, the crystalline Form I can be characterized by an XRPD pattern having the major peaks (e.g., peaks with relative intensity of 20% or above, 30% or above, 40% or above, 50% or above, 60% or above, 70% or above, 80% or above, or 90% or above) of FIG. 1A or as shown in Table 2, degrees 2 theta, ±0.2°. In some embodiments, the crystalline Form I can be characterized by an XRPD pattern having all of the following peaks: 14.7, 17.5, 19.8, 22.4, 22.9 degrees 2 theta, ±0.2°.

As explained herein, it is the diffraction angle (degrees 2 theta, ±0.2°), rather than its relative intensities, that is characteristic of the XRPD peaks. Those skilled in the art would understand that the same crystalline form can have XRPD spectra having its characteristic peaks showing different relative intensities. In some embodiments, the crystalline Form I can also be characterized by a DSC pattern having an endotherm peak with an onset temperature of about 198.2° C. and/or peak temperature at about 204.0° C. In some embodiments, the crystalline Form I is substantially the same as the crystalline form obtained in Example 3 of this application.

In some embodiments, the HCl salt can be substantially pure. For example, in some embodiments, the HCl salt of Compound 1 is characterized by a purity by weight and/or by HPLC area of at least 70% (e.g., at least 75%, at least 80%, at least 85%, at least 90%, at least 95%, at least 97%, or at least 99%). In some embodiments, the HCl salt of Compound 1 is characterized by a purity by weight and/or by HPLC area of about 70%, about 75%, about 80%, about 85%, about 90%, about 95%, about 97%, about 99%, or any ranges between the specified values. The substantially pure HCl salt of Compound 1 can be in a solid form (e.g., crystalline Form I, amorphous form, or a combination thereof) or in a solution, suspension, or another form. In some embodiments, the substantially pure HCl salt of Compound 1 can be in crystalline Form I. Unless otherwise obvious from context, for the purpose of calculating the weight percentage of the salt in the substantially pure salt, anything other than the salt, or a solvate or hydrate form thereof, is regarded as an impurity, which includes for example residual solvents, moisture contents, etc. For the avoidance of doubt, a composition comprising the substantially pure salt herein and one or more other ingredients should be understood as a mixture of the substantially pure salt herein and the one or more other ingredients, for example, such composition can be obtained directly or indirectly from mixing the substantially pure salt herein with the one or more other ingredients, such as water, pharmaceutically acceptable excipients, etc.

As used herein, when a salt is said to exist or be in one particular crystalline form, it should be understood that in some embodiments, the salt can exist substantially in that particular form. However, in some embodiments, the salt can also exist in the particular form, in a mixture with one or more other solid forms, including amorphous form. For example, in some embodiments, the HCl salt of Compound 1 can exist substantially in Form I, such as more than 80% by weight, more than 90% by weight, or more than 95% by weight, and in some embodiments, no other solid form can be identified, for example, by XRPD. In some embodiments, the HCl salt can exist in Form I, in a mixture with one or more solid forms such as an amorphous form.

Exemplary methods for preparing crystalline Form I of the HCl salt are described herein. Typically, the method can include mixing Compound 1 and HCl in a solvent system to form the hydrochloride salt. The HCl for mixing can be in any suitable form, such as an aqueous HCl, or HCl in an alcohol. In some embodiments, the method further comprises separating the HCl salt from the solvent system, such as by precipitating the HCl salt out (e.g., after cooling, as applicable, or adding an anti-solvent) from the solvent system. In some embodiments, the method can comprise dissolving Compound 1 in the solvent system to form a solution; adding HCl (e.g., as an aqueous solution) to the solution to form the HCl salt, which can be precipitated out (e.g., after cooling, as applicable, or adding an anti-solvent).

In some embodiments, Compound 1 can also be suspended or partially dissolved in the solvent system to form a suspension or partial solution; and the method can include adding HCl (e.g., as an aqueous solution) to the suspension or partial solution to form the HCl salt, which can be precipitated out. Example of preparations of Form I are provided herein.

The solvent system useful for preparing the HCl salt is not particularly limited; for example, it can be a single solvent system or contains a mixture of two or more solvents. In some embodiments, the solvent system comprises at least one non-aqueous solvent. In some embodiments, the at least one non-aqueous solvent can comprise isopropanol. As detailed herein, in some embodiments, when a primary alcohol such as methanol was used for the preparation of the HCl salt, partial esterification was observed. Accordingly, in some embodiments, the solvent system can also be free or substantially free of a primary alcohol, such as methanol or ethanol. In some embodiments, any primary alcohol, such as methanol or ethanol, does not exist in an amount that can cause ester formation during the HCl salt formation.

Typically, the HCl salt forming step can be carried out under heat. In some embodiments, the preparation method can comprise mixing Compound 1 and HCl in the solvent system at a temperature of about 20° C. to about 80° C., such as about 60° C., to form the hydrochloride salt. In some embodiments, upon cooling, the HCl salt can be precipitated out from the solvent system. In some embodiments, seed crystals of the HCl salt can be added to facilitate formation. Such seed crystals can be prepared by following the procedures herein without using any seed crystals. For example, the following shows a representative procedure for preparing seed crystals of the HCl salt in Form I. To a solution of Compound 1 (3 g, 6.98 mmol) in isopropanol (IPA) (18 mL) was added conc. HCl (0.6 mL) at 40-45° C., and the mixture was cooled to 15-25° C. for 6 hours and 0-5° C. for 4 hours. Filtered, and the filter cake was dried to give an HCl salt of Compound 1 which can be used as seed crystals of the HCl salt in Form I.

In some embodiments, Form I of the HCl salt can be recrystallized under suitable conditions with various solvents or combinations. Suitable solvents for recrystallization include, but are not limited to, THF, toluene, MeOH, ethanol, n-propanol, isopropanol, isobutanol, methyl tert-butyl ether, ether, isoamylol, butyl acetate, ethyl formate, 1,4-dioxane, n-butanol, tert-butanol, n-heptane, cyclohexane, methyl isobutyl ketone, dimethylbenzene, isobutyl acetate, 2-butanone, acetonitrile, acetone, ethyl acetate, isopropyl acetate, and water. The solvents can be used alone or in various combinations. Recrystallization technics are generally known in the art. For example, the HCl salt of Compound 1 can be slurried in one or more of the solvents at room temperature or under heat; the HCl salt of Compound 1 can be heated in one or more of the solvents followed by cooling; the HCl salt of Compound 1 can be dissolved in a solvent and then an antisolvent is added; and other techniques such as solid/liquid diffusion or liquid/liquid diffusion can also be used.

In some embodiments, the present disclosure also provides an HCl salt that can be produced by any of the applicable methods described in the Examples section.

In some embodiments, a hydrobromide salt (HBr salt) of Compound 1 is provided. In some embodiments, the HBr salt can be in an isolated form, a substantially pure form, and/or a solid form. Typically, the HBr salt herein can exist in a solid form, such as in a crystalline form or an amorphous form, or a mixture thereof. In some embodiments, the HBr salt can also be in a hydrate or solvate form.

In some embodiments, the present disclosure provides the HBr salt of Compound 1 in a crystalline Form V. In some embodiments, the crystalline Form V can be characterized by (1) an X-ray powder diffraction (XRPD) pattern having one or more (e.g., 1, 2, 3, 4, 5, 6, or 7) of the following peaks: 7.4, 14.9, 17.3, 19.6, 22.3, 24.7, and 28.9 degrees 2 theta, ±0.2°; (2) an X-ray powder diffraction (XRPD) pattern having one or more (e.g., 5 or more, 10 or more, 15 or more, or all) of the following peaks: 7.4, 14.9, 16.5, 17.3, 19.6, 20.3, 22.3, 22.6, 24.7, 25.3, 25.5, 26.1, 28.2, 28.6, 28.9, 30.0, 31.2, 36.0 and 36.9 degrees 2 theta, ±0.2°; (3) an XRPD pattern substantially the same as shown in FIG. 5A; (4) a Differential Scanning Calorimetry (DSC) pattern substantially the same as shown in FIG. 5B; or any combination thereof (e.g., (1) and (4), (2) and (4), (1), (2) and (4), or (3) and (4)). In some embodiments, the crystalline Form V can be characterized by an XRPD pattern having the major peaks (e.g., peaks with relative intensity of 20% or above, 30% or above, 40% or above, 50% or above, 60% or above, 70% or above, 80% or above, or 90% or above) of FIG. 5A or as shown in Table 5, degrees 2 theta, ±0.2°. In some embodiments, the crystalline Form V can be characterized by an XRPD pattern having all of the following peaks: 7.4, 14.9, 17.3, 19.6, 22.3, 24.7, and 28.9 degrees 2 theta, ±0.2°. In some embodiments, the crystalline Form V can also be characterized by a DSC pattern having an endotherm peak with an onset temperature of about 227.5° C. and/or peak temperature at about 229.6° C. In some embodiments, the crystalline Form V is substantially the same as the crystalline form obtained in Example 7 of this application.

In some embodiments, the HBr salt can be substantially pure. In some embodiments, the HBr salt of Compound 1 is characterized by a purity by weight and/or by HPLC area of at least 70% (e.g., at least 75%, at least 80%, at least 85%, at least 90%, at least 95%, at least 97%, or at least 99%). In some embodiments, the HBr salt of Compound 1 is characterized by a purity by weight and/or by HPLC area of about 70%, about 75%, about 80%, about 85%, about 90%, about 95%, about 97%, about 99%, or any ranges between the specified values. The substantially pure HBr salt of Compound 1 can be in a solid form (e.g., crystalline Form V, amorphous form, or a combination thereof) or in a solution, suspension, or another form. In some embodiments, the substantially pure HBr salt of Compound 1 can be in crystalline Form V.

In some embodiments, the HBr salt of Compound 1 can exist substantially in Form V, such as more than 80% by weight, more than 90% by weight, or more than 95% by weight, and in some embodiments, no other solid form can be identified, for example, by XRPD. In some embodiments, the HBr salt can exist in Form V, in a mixture with one or more solid forms such as an amorphous form.

Exemplary methods for preparing crystalline Form V of the HBr salt are described herein. Typically, the method can include mixing Compound 1 and HBr in a solvent system to form the hydrobromide salt. The HBr for mixing can be in any suitable form, such as an aqueous HBr, or HBr in an alcohol. In some embodiments, the method further comprises separating the HBr salt from the solvent system, such as by precipitating the HBr salt out (e.g., after cooling, as applicable, or adding an anti-solvent) from the solvent system. In some embodiments, the method can comprise dissolving Compound 1 in the solvent system to form a solution; adding HBr (e.g., as an aqueous solution) to the solution to form the HBr salt, which can be precipitated out (e.g., after cooling, as applicable, or adding an anti-solvent). In some embodiments, Compound 1 can also be suspended or partially dissolved in the solvent system to form a suspension or partial solution; and the method can include adding HBr (e.g., as an aqueous solution) to the suspension or partial solution to form the HBr salt, which can be precipitated out. Examples of preparations of Form V are provided herein.

The solvent system useful for preparing the HBr salt is not particularly limited; for example, it can be a single solvent system or contains a mixture of two or more solvents. In some embodiments, the solvent system comprises at least one non-aqueous solvent. In some embodiments, the at least one non-aqueous solvent can comprise isopropanol. As detailed herein, in some embodiments, when a primary alcohol such as methanol was used for the preparation of the HBr salt, partial esterification was observed. Accordingly, in some embodiments, the solvent system can also be free or substantially free of a primary alcohol, such as methanol or ethanol. In some embodiments, any primary alcohol, such as methanol or ethanol, does not exist in an amount that can cause ester formation during the HBr salt formation.

The HBr salt forming step can be carried out under heat or at room temperature. In some embodiments, the preparation method can comprise mixing Compound 1 and HBr in the solvent system at a temperature of about 20° C. to about 80° C., such as about 60° C., to form the hydrobromide salt. In some embodiments, the HBr salt can be precipitated out from the solvent system. In some embodiments, an antisolvent such as ethyl acetate, isopropyl acetate can be used to precipitate the HBr salt. In some embodiments, Form V of the HBr salt can be recrystallized under suitable conditions with various solvents or combinations, e.g., as described herein. The solvents can be used alone or in various combinations. Recrystallization technics are generally known in the art. For example, the HBr salt of Compound 1 can be slurried in one or more of the solvents at room temperature or under heat; the HBr salt of Compound 1 can be heated in one or more of the solvents followed by cooling; the HBr salt of Compound 1 can be dissolved in a solvent and then an antisolvent is added; and other techniques such as solid/liquid diffusion or liquid/liquid diffusion can also be used.

In some embodiments, the present disclosure also provides an HBr salt that can be produced by any of the applicable methods described in the Examples section.

In some embodiments, the present disclosure also provides a sulfonic acid salt of Compound 1, for example, a methanesulfonic acid or a benzenesulfonic acid salts of Compound 1.

Base Addition Salt

In some embodiments, the present disclosure is directed to a base addition salt of Compound 1. In some specific embodiments, the base addition salt is an alkali salt, such as a sodium or potassium salt of Compound 1. As shown in the Examples section, not all bases can form a base addition salt with Compound 1 in a solid form under the tested conditions. For example, Compound 1 formed salt with NaOH, KOH, L-arginine, L-lysine, meglumine, tromethamine, and choline hydroxide under the tested conditions, whereas the other tested bases did not.

In some embodiments, a potassium salt of Compound 1 is provided. In some embodiments, the potassium salt can be in an isolated form, a substantially pure form, and/or a solid form. Typically, the potassium salt herein can exist in a solid form, such as in a crystalline form or an amorphous form, or a mixture thereof. In some embodiments, the potassium salt can also be in a hydrate or solvate form.

As detailed in the Examples section, the potassium salt (e.g., in Form III) was found to be more soluble than Compound 1. The potassium salt of Compound 1 was also found to be physically and chemically stable at 40° C./75% RH (relative humidity) during testing period. In the DVS test, the potassium salt was found to have low hygroscopicity, only absorbed 1.32% moisture at 80% RH, which is in sharp contrast to the sodium salt of Compound 1 that absorbed about 30% water at 80% RH.

In some embodiments, the present disclosure provides the potassium salt of Compound 1 in a crystalline Form III. In some embodiments, the crystalline Form III can be characterized by (1) an X-ray powder diffraction (XRPD) pattern having one or more (e.g., 1, 2, or 3) of the following peaks: 5.7, 13.5, and 18.9 degrees 2 theta, ±0.2°; (2) an X-ray powder diffraction (XRPD) pattern having one or more (e.g., 3 or more, 5 or more, or all) of the following peaks: 5.7, 9.8, 13.5, 16.7, 18.9, 19.6, 23.4, and 24.3 degrees 2 theta, ±0.2°; (3) an XRPD pattern substantially the same as shown in FIG. 3A; (4) a Differential Scanning Calorimetry (DSC) pattern substantially the same as shown in FIG. 3B; or any combination thereof (e.g., (1) and (4), (2) and (4), (1), (2) and (4), or (3) and (4)). In some embodiments, the crystalline Form III can be characterized by an XRPD pattern having the major peaks (e.g., peaks with relative intensity of 20% or above, 30% or above, 40% or above, 50% or above, 60% or above, 70% or above, 80% or above, or 90% or above) of FIG. 3A or as shown in Table 3, degrees 2 theta, ±0.2°. In some embodiments, the crystalline Form III can be characterized by an XRPD pattern having all of the following peaks: 5.7, 13.5, and 18.9 degrees 2 theta, ±0.2°. In some embodiments, the crystalline Form III can also be characterized by a DSC pattern having an endotherm peak with an onset temperature of about 250.2° C. and/or peak temperature at about 251.2° C. In some embodiments, the crystalline Form III is substantially the same as the crystalline form obtained in Example 5 of this application. The potassium salt was also found to form solvates or hydrates easily, for example, a methanol solvate, which might contribute to the low yielding process of preparing the potassium salt in Form III.

In some embodiments, the potassium salt can be substantially pure. For example, in some embodiments, the potassium salt of Compound 1 is characterized by a purity by weight and/or by HPLC area of least 70% (e.g., at least 75%, at least 80%, at least 85%, at least 90%, at least 95%, at least 97%, or at least 99%). In some embodiments, the potassium salt of Compound 1 is characterized by a purity by weight and/or by HPLC area of about 70%, about 75%, about 80%, about 85%, about 90%, about 95%, about 97%, about 99%, or any ranges between the specified values. The substantially pure potassium salt of Compound 1 can be in a solid form (e.g., crystalline Form III, amorphous form, a hydrate or a solvate, or a combination thereof) or in a solution, suspension, or another form. In some embodiments, the substantially pure potassium salt of Compound 1 can be in crystalline Form III.

In some embodiments, the potassium salt of Compound 1 can exist substantially in Form III, such as more than 80% by weight, more than 90% by weight, or more than 95% by weight, and in some embodiments, no other solid form of the potassium salt can be identified, for example, by XRPD. In some embodiments, the potassium salt can exist in Form III, in a mixture with one or more solid forms such as an amorphous form, a hydrate or a solvate.

Exemplary methods for preparing crystalline Form III of the potassium salt are described herein. Typically, the method can include mixing Compound 1 and a potassium base (e.g., KOH) in a solvent system (e.g., methanol) to form the potassium salt. In some embodiments, the method further comprises separating the potassium salt from the solvent system. In some embodiments, the potassium base is potassium hydroxide, which can be in any suitable form, such as a solid form or an aqueous solution. In some embodiments, the separating step can comprise removing at least a portion of the solvent system, and adding a second solvent system to precipitate the potassium salt. As exemplified in the Examples section, when an alcoholic solvent such as methanol was used, the initial solid formed upon removing the solvent is a solvate. However, this solvate can be treated with a second solvent system to provide potassium salt in crystalline Form III. In some embodiments, the second solvent system can be ethyl acetate. In some embodiments, the second solvent system can be isopropyl acetate.

In some embodiments, the present disclosure also provides a potassium salt that can be produced by any of the applicable methods described in the Examples section.

In some embodiments, a sodium salt of Compound 1 is provided. In some embodiments, the sodium salt can be in an isolated form, a substantially pure form, and/or a solid form. Typically, the sodium salt herein can exist in a solid form, such as in a crystalline form or an amorphous form, or a mixture thereof. In some embodiments, the sodium salt can also be in a hydrate or solvate form.

In some embodiments, the present disclosure provides the sodium salt of Compound 1 in a crystalline Form IV. In some embodiments, the crystalline Form IV can be characterized by (1) an X-ray powder diffraction (XRPD) pattern having one or more (e.g., 1, 2, 3, 4 or 5) of the following peaks: 11.4, 12.7, 13.2, 17.9, and 22.1 degrees 2 theta, ±0.2°; (2) an X-ray powder diffraction (XRPD) pattern having one or more (e.g., 5 or more, 10 or more, 15 or all) of the following peaks: 7.7, 9.4, 10.8, 11.4, 12.7, 13.2, 16.6, 17.9, 18.3, 18.8, 20.0, 21.8, 22.1, 22.9, 23.1, and 27.6 degrees 2 theta, ±0.2°; (3) an XRPD pattern substantially the same as shown in FIG. 4A; (4) a Differential Scanning Calorimetry (DSC) pattern substantially the same as shown in FIG. 4B; or any combination thereof (e.g., (1) and (4), (2) and (4), (1), (2) and (4), or (3) and (4)). In some embodiments, the crystalline Form IV can be characterized by an XRPD pattern having the major peaks (e.g., peaks with relative intensity of 20% or above, 30% or above, 40% or above, 50% or above, 60% or above, 70% or above, 80% or above, or 90% or above) of FIG. 4A or as shown in Table 4, degrees 2 theta, ±0.2°. In some embodiments, the crystalline Form IV can be characterized by an XRPD pattern having all of the following peaks: 11.4, 12.7, 13.2, 17.9, and 22.1 degrees 2 theta, ±0.2°. In some embodiments, the crystalline Form IV can also be characterized by a DSC pattern having an endotherm peak with an onset temperature of about 272.9° C. and/or peak temperature at about 275.0° C. In some embodiments, the crystalline Form IV is substantially the same as the crystalline form obtained in Example 6 of this application. The sodium salt was also found to form solvates or hydrates under various conditions.

In some embodiments, the sodium salt can be substantially pure. For example, in some embodiments, the sodium salt of Compound 1 is characterized by a purity by weight and/or by HPLC area of least 70% (e.g., at least 75%, at least 80%, at least 85%, at least 90%, at least 95%, at least 97%, or at least 99%). In some embodiments, the sodium salt of Compound 1 is characterized by a purity by weight and/or by HPLC area of about 70%, about 75%, about 80%, about 85%, about 90%, about 95%, about 97%, about 99%, or any ranges between the specified values. The substantially pure sodium salt of Compound 1 can be in a solid form (e.g., crystalline Form IV, amorphous form, a hydrate or a solvate, or a combination thereof) or in a solution, suspension, or another form. In some embodiments, the substantially pure sodium salt of Compound 1 can be in crystalline Form IV.

In some embodiments, the sodium salt of Compound 1 can exist substantially in Form IV, such as more than 80% by weight, more than 90% by weight, or more than 95% by weight, and in some embodiments, no other solid form of the sodium salt can be identified, for example, by XRPD. In some embodiments, the sodium salt can exist in Form IV, in a mixture with one or more solid forms such as an amorphous form, a hydrate or a solvate.

Exemplary methods for preparing crystalline Form IV of the sodium salt are described herein. Typically, the method can include mixing Compound 1 and a sodium base (e.g., NaOH) in a solvent system (e.g., methanol) to form the sodium salt. In some embodiments, the method further comprises separating the sodium salt from the solvent system. In some embodiments, the sodium base is sodium hydroxide, which can be in any suitable form, such as a solid form or an aqueous solution. In some embodiments, the separating step can comprise removing at least a portion of the solvent system, and adding a second solvent system to precipitate the sodium salt. In some embodiments, the second solvent system can be ethyl acetate. In some embodiments, the second solvent system can be isopropyl acetate.

In some embodiments, the present disclosure also provides a sodium salt that can be produced by any of the applicable methods described in the Examples section.

In some embodiments, the base addition salt of the present disclosure can also be an amine salt of Compound 1, which can be for example, in an isolated form, a substantially pure form, and/or in a solid form. In some embodiments, the amine salt can be a lysine (e.g., L-Lysine) salt, an arginine (e.g., L-Arginine) salt, a tromethamine salt, or a meglumine salt. In some embodiments, the amine salt can also be in an amorphous form, a hydrate form, or a solvate form. In some embodiments, the present disclosure also provides an amine salt that can be produced by any of the applicable methods described in the Examples section.

Some embodiments of the present disclosure are also directed to methods of preparing Compound 1 or a salt thereof.

In some embodiments, the present disclosure is also directed to any products produced by any of the methods herein, and methods of using such products.

Pharmaceutical Compositions

In various embodiments, the present disclosure also provides pharmaceutical compositions comprising a compound of the present disclosure, such as the HCl salt described herein, and optionally a pharmaceutically acceptable excipient. In certain embodiments, a pharmaceutical composition described herein comprises a salt of the present disclosure, such as the HCl salt described herein, and a pharmaceutically acceptable excipient. The pharmaceutical compositions described herein are useful in treating and/or preventing various diseases or disorders associated with IDO, such as cancer or an infectious disease.

In some embodiments, the present disclosure provides a pharmaceutical composition comprising one or more of the compounds of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof). Typically, the pharmaceutical composition comprises a therapeutically effective amount of one or more of the compounds of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof) and optionally a pharmaceutically acceptable excipient or carrier. In some embodiments, the pharmaceutical composition comprises one or more of the substantially pure compounds as described herein (e.g., Compound 1, the HCl salt of Compound 1, the HBr salt of Compound 1, the sodium salt of Compound 1, or the potassium salt of Compound 1, etc.). In some embodiments, the pharmaceutical composition comprises one or more of the crystalline forms selected from Compound 1 in Form II, the HCl salt of Compound 1 in Form I, the potassium salt of Compound 1 in Form III, the sodium salt of Compound 1 in Form IV, and the HBr salt of Compound 1 in Form V.

In some specific embodiments, the pharmaceutical composition comprises Form I of the HCl salt of Compound 1. In some specific embodiments, the active ingredient in the pharmaceutical composition can comprise, consist essentially of, or consist of the HCl salt of Compound 1 in Form I. In some embodiments, Compound 1 exists in the pharmaceutical composition essentially in Form I, for example, at least 80% (e.g., at least 85%, at least 90%, at least 95%, by weight of total Compound 1) of Compound 1 exist in the pharmaceutical composition in Form I. In some embodiments, the pharmaceutical composition is substantially free of Compound 1 in any other solid form, such as other salts or other crystalline forms. For example, in some embodiments, the pharmaceutical composition is free or substantially free of Compound 1 in its free acid form, for example, the pharmaceutical composition can in some embodiments include less than 10%, less than 5%, less than 2%, less than 1%, by weight of total Compound 1, or non-detectable amount, of Compound 1 in its free acid form. In some embodiments, the pharmaceutical composition is free or substantially free of Compound 1 in a salt form other than HCl salt of Compound 1, for example, the pharmaceutical composition can in some embodiments include less than 10%, less than 5%, less than 2%, less than 1%, by weight of total Compound 1, or non-detectable amount, of Compound 1 in a salt form other than HCl salt of Compound 1. In some embodiments, the pharmaceutical composition is free or substantially free of Compound 1 in a crystalline form other than Form I of the HCl salt of Compound 1, for example, the pharmaceutical composition can in some embodiments include less than 10%, less than 5%, less than 2%, less than 1%, by weight of total Compound 1, or non-detectable amount, of Compound 1 in a solid form other than Form I. Weight of total Compound 1 in a pharmaceutical composition, as used herein, refers to the weight of all forms of Compound 1 combined, including for example, free acid form, salts, crystalline forms, amorphous forms, hydrates, solvates etc., expressed in equivalent weight of Compound 1 as a free acid. For the calculation of the weight percentages of each different form in a given pharmaceutical composition, it should be clear to those skilled in the art that the weight of each different form will be first converted into its respective equivalent weight of Compound 1 as a free acid, which is then divided by the weight of total Compound 1 as defined herein.

In some specific embodiments, the active ingredient in the pharmaceutical composition can comprise, consist essentially of, or consist of the HCl salt of Compound 1 in Form I, amorphous form, or a mixture thereof. In some embodiments, Compound 1 can exist in the pharmaceutical composition as a mixture of Form I and an amorphous form of the HCl salt of Compound 1, for example, at least 80% (e.g., at least 85%, at least 90%, at least 95%, by weight of total Compound 1) of Compound 1 can exist in the pharmaceutical composition in Form I or an amorphous form of the HCl salt.

In some specific embodiments, the pharmaceutical composition comprises Form V of the HBr salt of Compound 1. In some specific embodiments, the active ingredient in the pharmaceutical composition can comprise, consist essentially of, or consist of the HBr salt of Compound 1 in Form V. In some embodiments, Compound 1 exists in the pharmaceutical composition essentially in Form V, for example, at least 80% (e.g., at least 85%, at least 90%, at least 95%, by weight of total Compound 1) of Compound 1 exist in the pharmaceutical composition in Form V. In some embodiments, the pharmaceutical composition is substantially free of Compound 1 in any other solid form, such as other salts or other crystalline forms. For example, in some embodiments, the pharmaceutical composition is free or substantially free of Compound 1 in its free acid form, for example, the pharmaceutical composition can in some embodiments include less than 10%, less than 5%, less than 2%, less than 1%, by weight of total Compound 1, or non-detectable amount, of Compound 1 in its free acid form. In some embodiments, the pharmaceutical composition is free or substantially free of Compound 1 in a salt form other than HBr salt of Compound 1, for example, the pharmaceutical composition can in some embodiments include less than 10%, less than 5%, less than 2%, less than 1%, by weight of total Compound 1, or non-detectable amount, of Compound 1 in a salt form other than HBr salt of Compound 1. In some embodiments, the pharmaceutical composition is free or substantially free of Compound 1 in a crystalline form other than Form V of the HBr salt of Compound 1, for example, the pharmaceutical composition can in some embodiments include less than 10%, less than 5%, less than 2%, less than 1%, by weight of total Compound 1, or non-detectable amount, of Compound 1 in a solid form other than Form V.

In some specific embodiments, the active ingredient in the pharmaceutical composition can comprise, consist essentially of, or consist of the HBr salt of Compound 1 in Form V, amorphous form, or a mixture thereof. In some embodiments, Compound 1 can exist in the pharmaceutical composition as a mixture of Form V and an amorphous form of the HBr salt of Compound 1, for example, at least 80% (e.g., at least 85%, at least 90%, at least 95%, by weight of total Compound 1) of Compound 1 can exist in the pharmaceutical composition in Form V or an amorphous form of the HBr salt.

In some specific embodiments, the pharmaceutical composition comprises Form III of the potassium salt of Compound 1. In some specific embodiments, the active ingredient in the pharmaceutical composition can comprise, consist essentially of, or consist of the potassium salt of Compound 1 in Form III. In some embodiments, Compound 1 exists in the pharmaceutical composition essentially in Form III, for example, at least 80% (e.g., at least 85%, at least 90%, at least 95%, by weight of total Compound 1) of Compound 1 exist in the pharmaceutical composition in Form III. In some embodiments, the pharmaceutical composition is substantially free of Compound 1 in any other solid form, such as other salts or other crystalline forms. For example, in some embodiments, the pharmaceutical composition is free or substantially free of Compound 1 in its free acid form, for example, the pharmaceutical composition can in some embodiments include less than 10%, less than 5%, less than 2%, less than 1%, by weight of total Compound 1, or non-detectable amount, of Compound 1 in its free acid form. In some embodiments, the pharmaceutical composition is free or substantially free of Compound 1 in a salt form other than potassium salt of Compound 1, for example, the pharmaceutical composition can in some embodiments include less than 10%, less than 5%, less than 2%, less than 1%, by weight of total Compound 1, or non-detectable amount, of Compound 1 in a salt form other than potassium salt of Compound 1. In some embodiments, the pharmaceutical composition is free or substantially free of Compound 1 in a crystalline form other than Form III of the potassium salt of Compound 1, for example, the pharmaceutical composition can in some embodiments include less than 10%, less than 5%, less than 2%, less than 1%, by weight of total Compound 1, or non-detectable amount, of Compound 1 in a solid form other than Form III.

In some specific embodiments, the active ingredient in the pharmaceutical composition can comprise, consist essentially of, or consist of the potassium salt of Compound 1 in Form III, amorphous form, a hydrate, a solvate, or a mixture thereof. In some embodiments, Compound 1 can exist in the pharmaceutical composition as a mixture of Form III and an amorphous form of the potassium salt of Compound 1, for example, at least 80% (e.g., at least 85%, at least 90%, at least 95%, by weight of total Compound 1) of Compound 1 can exist in the pharmaceutical composition in Form III or an amorphous form of the potassium salt. In some embodiments, Compound 1 can exist in the pharmaceutical composition as a mixture of Form III and one or more forms selected from a hydrate form, a solvate form, and an amorphous form of the potassium salt of Compound 1.

In some specific embodiments, the pharmaceutical composition comprises Form IV of the sodium salt of Compound 1. In some specific embodiments, the active ingredient in the pharmaceutical composition can comprise, consist essentially of, or consist of the sodium salt of Compound 1 in Form IV. In some embodiments, Compound 1 exists in the pharmaceutical composition essentially in Form IV, for example, at least 80% (e.g., at least 85%, at least 90%, at least 95%, by weight of total Compound 1) of Compound 1 exist in the pharmaceutical composition in Form IV. In some embodiments, the pharmaceutical composition is substantially free of Compound 1 in any other solid form, such as other salts or other crystalline forms. For example, in some embodiments, the pharmaceutical composition is free or substantially free of Compound 1 in its free acid form, for example, the pharmaceutical composition can in some embodiments include less than 10%, less than 5%, less than 2%, less than 1%, by weight of total Compound 1, or non-detectable amount, of Compound 1 in its free acid form. In some embodiments, the pharmaceutical composition is free or substantially free of Compound 1 in a salt form other than sodium salt of Compound 1, for example, the pharmaceutical composition can in some embodiments include less than 10%, less than 5%, less than 2%, less than 1%, by weight of total Compound 1, or non-detectable amount, of Compound 1 in a salt form other than sodium salt of Compound 1. In some embodiments, the pharmaceutical composition is free or substantially free of Compound 1 in a crystalline form other than Form IV of the sodium salt of Compound 1, for example, the pharmaceutical composition can in some embodiments include less than 10%, less than 5%, less than 2%, less than 1%, by weight of total Compound 1, or non-detectable amount, of Compound 1 in a solid form other than Form IV.

In some specific embodiments, the active ingredient in the pharmaceutical composition can comprise, consist essentially of, or consist of the sodium salt of Compound 1 in Form IV, amorphous form, a hydrate form, a solvate form, or a mixture thereof. In some embodiments, Compound 1 can exist in the pharmaceutical composition as a mixture of Form III and an amorphous form of the sodium salt of Compound 1, for example, at least 80% (e.g., at least 85%, at least 90%, at least 95%, by weight of total Compound 1) of Compound 1 can exist in the pharmaceutical composition in Form III or an amorphous form of the sodium salt. In some embodiments, Compound 1 can exist in the pharmaceutical composition as a mixture of Form IV and one or more forms selected from a hydrate form, a solvate form, and an amorphous form of the sodium salt of Compound 1.

Typically, the pharmaceutical composition comprising the salt of Compound 1 (e.g., in Form I, II, III, IV, and/or amorphous form) does not include a significant amount of Compound 1 as a free acid. In some embodiments, the pharmaceutical composition described herein above can also include a mixture of the salt and the free acid form (other than and in addition to any amount that may exist through equilibrium).

In some embodiments, the pharmaceutical composition can also include the free acid Compound 1 as an active ingredient. In some specific embodiments, the pharmaceutical composition comprises Compound 1 in Form II. In some specific embodiments, the active ingredient in the pharmaceutical composition can comprise, consist essentially of, or consist of Compound 1 in Form II. In some embodiments, Compound 1 exists in the pharmaceutical composition essentially in Form II, for example, at least 80% (e.g., at least 85%, at least 90%, at least 95%, by weight of total Compound 1) of Compound 1 exist in the pharmaceutical composition in Form II. In some embodiments, the pharmaceutical composition is substantially free of Compound 1 in any other solid form, such as a salt form or other solid form such as crystalline forms. For example, in some embodiments, the pharmaceutical composition is free or substantially free of Compound 1 in its salt form, for example, the pharmaceutical composition can in some embodiments include less than 10%, less than 5%, less than 2%, less than 1%, by weight of total Compound 1, or non-detectable amount, of Compound 1 in its salt form. In some embodiments, the pharmaceutical composition is free or substantially free of Compound 1 in a crystalline form other than Compound 1 in Form II, for example, the pharmaceutical composition can in some embodiments include less than 10%, less than 5%, less than 2%, less than 1%, by weight of total Compound 1, or non-detectable amount, of Compound 1 in a solid form other than Form II.

In some specific embodiments, the active ingredient in the pharmaceutical composition can comprise, consist essentially of, or consist of Compound 1 in Form II, amorphous form, a hydrate form, a solvate form, or a mixture thereof. In some embodiments, Compound 1 can exist in the pharmaceutical composition as a mixture of Form II and an amorphous form of Compound 1, for example, at least 80% (e.g., at least 85%, at least 90%, at least 95%, by weight of total Compound 1) of Compound 1 can exist in the pharmaceutical composition in Form II or an amorphous form of Compound 1. In some embodiments, Compound 1 can exist in the pharmaceutical composition as a mixture of Form II and one or more forms selected from a hydrate form, a solvate form, and an amorphous form of Compound 1.

Other salts, for example, any one or more of the amine salts of Compound 1 described herein, such as the meglumine salts, tromethamine salts, etc. of Compound 1, can be formulated similarly to those described herein for the salt of Compound 1 described above, such as Form I of the HCl salt.

Typically, the compound of the present disclosure is provided in an effective amount in the pharmaceutical composition. In certain embodiments, the effective amount is a therapeutically effective amount (e.g., amount effective for treating a cancer or infectious disease associated with IDO in a subject in need thereof). In certain embodiments, the effective amount is a prophylactically effective amount (e.g., amount effective for preventing a cancer or infectious disease associated with IDO in a subject in need thereof and/or for keeping a subject in need thereof in remission of a cancer or infectious disease associated with IDO).

Pharmaceutical compositions described herein can be prepared by any method known in the art of pharmacology. In general, such preparatory methods include bringing the active ingredient, such as the salt of the present disclosure, into association with a carrier or excipient, and/or one or more other accessory ingredients, and then, if necessary and/or desirable, shaping, and/or packaging the product into a desired single- or multi-dose unit.

Pharmaceutical compositions can be prepared, packaged, and/or sold in bulk, as a single unit dose, and/or as a plurality of single unit doses. A "unit dose" is a discrete amount of the pharmaceutical composition comprising a predetermined amount of the active ingredient. The amount of the active ingredient is generally equal to the dosage of the active ingredient which would be administered to a subject and/or a convenient fraction of such a dosage, such as one-half or one-third of such a dosage.

Relative amounts of the active ingredient, the pharmaceutically acceptable excipient, and/or any additional ingredients in a pharmaceutical composition described herein will vary, depending upon the identity, size, and/or condition of the subject treated and further depending upon the route by which the composition is to be administered. The composition may comprise between 0.1% and 100% (w/w) active ingredient.

Pharmaceutically acceptable excipients useful for the manufacture of the pharmaceutical compositions herein include, for example, inert diluents, dispersing and/or granulating agents, surface active agents and/or emulsifiers, disintegrating agents, binding agents, preservatives, buffering agents, lubricating agents, and/or oils. Excipients such as cocoa butter and suppository waxes, coloring agents, coating agents, sweetening, flavoring, and perfuming agents may also be present in the composition.

The pharmaceutical composition can be formulated for any routes of administration, for example, oral administration. Typically, the pharmaceutical composition is a solid dosage form. However, in some embodiments, other dosage forms such as liquid, suspension, or semi-solid dosage forms can also be used.

Solid dosage forms for oral administration include for example capsules, tablets, pills, powders, and granules. In such solid dosage forms, the active ingredient is mixed with at least one inert, pharmaceutically acceptable excipient or carrier such as sodium citrate or dicalcium phosphate and/or (a) fillers or extenders such as starches, lactose, sucrose, glucose, mannitol, and silicic acid, (b) binders such as, for example, carboxymethylcellulose, alginates, gelatin, polyvinylpyrrolidinone, sucrose, and acacia, (c) humectants such as glycerol, (d) disintegrating agents such as agar, calcium carbonate, potato or tapioca starch, alginic acid, certain silicates, and sodium carbonate, (e) solution retarding agents such as paraffin, (f) absorption accelerators such as quaternary ammonium compounds, (g) wetting agents such as, cetyl alcohol and glycerol monostearate, (h) absorbents such as kaolin and bentonite clay, and (i) lubricants such as talc, calcium stearate, magnesium stearate, solid polyethylene glycols, sodium lauryl sulfate, and mixtures thereof. In the case of capsules, tablets, and pills, the dosage form may include a buffering agent.

Solid compositions of a similar type can be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the art of pharmacology. They may optionally comprise opacifying agents and can be of a composition that they release the active ingredient(s) only, or preferentially, in a certain part of the intestinal tract, optionally, in a delayed manner. Examples of encapsulating compositions which can be used include polymeric substances and waxes. Solid compositions of a similar type can be employed as fillers in soft and hard-filled gelatin capsules using such excipients as lactose or milk sugar as well as high molecular weight polethylene glycols and the like.

The active ingredient (e.g., the compounds of the present disclosure) can be in a micro-encapsulated form with one or more excipients as noted above. The solid dosage forms of tablets, dragees, capsules, pills, and granules can be prepared with coatings and shells such as enteric coatings, release controlling coatings, and other coatings well known in the pharmaceutical formulating art. In such solid dosage forms the active ingredient can be admixed with at least one inert diluent such as sucrose, lactose, or starch. Such dosage forms may comprise, as is normal practice, additional substances other than inert diluents, e.g., tableting lubricants and other tableting aids such a magnesium stearate and microcrystalline cellulose. In the case of capsules, tablets and pills, the dosage forms may comprise buffering agents. They may optionally comprise opacifying agents and can be of a composition that they release the active ingredient(s) only, or preferentially, in a certain part of the intestinal tract, optionally, in a delayed manner. Examples of encapsulating agents which can be used include polymeric substances and waxes.

Although the descriptions of pharmaceutical compositions provided herein are mainly directed to pharmaceutical compositions which are suitable for administration to humans, such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and/or perform such modification with ordinary experimentation.

The compounds of the present disclosure are typically formulated in dosage unit form for ease of administration and uniformity of dosage. It will be understood, however, that the total daily usage of the compositions described herein will be decided by a physician within the scope of sound medical judgment. The specific therapeutically effective dose level for any particular subject or organism will depend upon a variety of factors including the disease being treated and the severity of the disorder; the activity of the specific active ingredient employed; the specific composition employed; the age, body weight, general health, sex, and diet of the subject; the time of administration, route of administration, and rate of excretion of the specific active ingredient employed; the duration of the treatment; drugs used in combination or coincidental with the specific active ingredient employed; and like factors well known in the medical arts.

Also encompassed by the disclosure are kits (e.g., pharmaceutical packs). The kits provided may comprise a pharmaceutical composition or compound described herein and a container (e.g., a vial, ampule, bottle, syringe, and/or dispenser package, or other suitable container). In some embodiments, provided kits may optionally further include a second container comprising a pharmaceutical excipient for dilution or suspension of a pharmaceutical composition or compound described herein. In some embodiments, the pharmaceutical composition or compound described herein provided in the first container and the second container are combined to form one unit dosage form.

In certain embodiments, a kit described herein includes a first container comprising a compound or pharmaceutical composition described herein. In certain embodiments, a kit described herein is useful in treating a proliferative disease (e.g., non-small cell lung cancer small cell lung cancer, breast cancer, renal cell carcinoma, bladder cancer, head and neck cancer, ovarian cancer, brain cancer, cancers of the gastrointestinal tract, liver cancer, pancreatic cancer, melanoma, leukemia, lymphoma, etc.) in a subject in need thereof, and/or preventing a proliferative disease in a subject in need thereof.

In certain embodiments, a kit described herein further includes instructions for using the compound or pharmaceutical composition included in the kit. A kit described herein may also include information as required by a regulatory agency such as the U.S. Food and Drug Administration (FDA). In certain embodiments, the information included in the kits is prescribing information. In certain embodiments, the kits and instructions provide for treating a proliferative disease in a subject in need thereof, and/or preventing a proliferative disease in a subject in need thereof. A kit described herein may include one or more additional pharmaceutical agents described herein as a separate composition.

Methods of Treatment

The compounds of the present disclosure and pharmaceutical compositions described herein are useful in treating and/or preventing proliferative diseases and/or a disease associated with IDO such as cancer or infectious diseases. As discussed in WO2017/139414, the content of which is hereby incorporated by reference in its entirety, IDO inhibitors such as Compound 1 demonstrated in vitro potency and in vivo efficacy, which are useful in treating and/or preventing proliferative diseases (e.g., cancer), for example, via the inhibition of IDO and/or inhibition of tryptophan catabolism resulting in reduction of the kynurenine level. Also discussed in WO2017/139414, IDO inhibitors such as Compound 1 show better human hepatocyte clearance compared to other IDO inhibitors known in the art, including INCB-24360 and others disclosed in WO2014150677 and WO2014150646.

Accordingly, in some embodiments, the present disclosure also provides methods of treating a proliferative disease and/or a disease associated with IDO, in a subject in need thereof, the methods comprising administering to the subject an effective amount (e.g., therapeutically effective amount) of a compound of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof), or pharmaceutical composition described herein.

In some embodiments, the present disclosure also provide a method of preventing a proliferative disease and/or a disease associated with IDO, in a subject in need thereof, the methods comprising administering to the subject an effective amount (e.g., prophylactically effective amount) of a salt of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof), or a pharmaceutical composition described herein.

In some embodiments, the present disclosure provides a method of treating a disease associated with indoleamine 2,3-dioxegenase (IDO) comprising administering to a subject in need thereof an effective amount of any one or more of the compounds of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof) or the pharmaceutical composition described herein.

In some embodiments, the disease associated with IDO is a proliferative disease, such as cancer. In some embodiments, the cancer is selected from the group consisting of lung cancer (e.g., non-small cell lung cancer, small cell lung cancer), breast cancer, prostate cancer, ovarian cancer, endometrial cancer, cervical cancer, bladder cancer, head and neck cancer, renal cell carcinoma, esophageal cancer, pancreatic cancer, brain cancer, cancers of the gastrointestinal tract, liver cancer, leukemia, lymphoma, melanoma, multiple myeloma, Ewing's sarcoma, and osteosarcoma. In some embodiments, the method further comprises treating the subject with an additional anti-cancer therapy. In some embodiments, the additional anti-cancer therapy is immunotherapy, radiation therapy, chemotherapy, cell therapy, surgery and/or transplantation.

In some embodiments, the disease associated with IDO is an infectious disease. In some embodiments, the infectious disease is a viral infection. In some embodiments, the subject is further treated with an additional anti-viral therapy. In some embodiments, the additional anti-viral therapy comprises administering to the subject an additional anti-viral agent or anti-viral vaccine.

In certain embodiments, the method is for treating and/or preventing a proliferative disease. In certain embodiments, the proliferative disease is cancer (e.g., cancer (non-small cell lung cancer, small cell lung cancer), breast cancer, prostate cancer, ovarian cancer, endometrial cancer, cervical cancer, bladder cancer, head and neck cancer, renal cell carcinoma, esophageal cancer, pancreatic cancer, brain cancer, cancers of the gastrointestinal tract, liver cancer, leukemia, lymphoma, melanoma, multiple myeloma, Ewing's sarcoma, or osteosarcoma). In certain embodiments, the proliferative disease is an inflammatory disease. In certain embodiments, the proliferative disease is an immune-related disease.

In some embodiments, the present disclosure provides a method of treating a proliferative disease comprising administering to a subject in need thereof an effective amount of any one or more of the compounds of the present disclosure (e.g., Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof) or the pharmaceutical composition described herein. In some embodiments, the proliferative disease is a cancer selected from the group consisting of lung cancer (e.g., non-small cell lung cancer, small cell lung cancer), breast cancer, prostate cancer, ovarian cancer, endometrial cancer, cervical cancer, bladder cancer, head and neck cancer, renal cell carcinoma, esophageal cancer, pancreatic cancer, brain cancer, cancers of the gastrointestinal tract, liver cancer, leukemia, lymphoma, melanoma, multiple myeloma, Ewing's sarcoma, and osteosarcoma.

In certain embodiments, the method described herein further includes administering to the subject an additional pharmaceutical agent. In certain embodiments, the method described herein further includes contacting a biological sample of the subject with an additional pharmaceutical agent. In certain embodiments, the method described herein further includes contacting a tissue of the subject with an additional pharmaceutical agent. In certain embodiments, the method described herein further includes treating the subject in need of the treatment a second anti-cancer therapy, such as chemotherapy, immunotherapy (e.g., anti-PD-1 or anti-PD-L1 antibody), cell therapy (e.g., CAR-T cell therapy), surgery, radiation therapy, and/or transplantation (e.g., bone marrow transplantation). In some examples, the second anti-cancer therapy involves the use of one or more anti-cancer agents, e.g., those known in the art, including anti-cancer drugs in clinical use or in clinical trials.

The compounds and/or compositions of the present disclosure can be administered by any route, including enteral (e.g., oral), parenteral, intravenous, intramuscular, intra-arterial, intramedullary, intrathecal, subcutaneous, intraventricular, transdermal, interdermal, rectal, intravaginal, intraperitoneal, topical (as by powders, ointments, creams, and/or drops). Specifically contemplated routes are oral administration, intravenous administration (e.g., systemic intravenous injection), regional administration via blood and/or lymph supply, and/or direct administration to an affected site. In general, the most appropriate route of administration will depend upon a variety of factors including the nature of the agent (e.g., its stability in the environment of the gastrointestinal tract), and/or the condition of the subject (e.g., whether the subject is able to tolerate oral administration).

In some embodiments, the compounds and/or compositions of the present disclosure can be administered in combination with one or more additional pharmaceutical agents (e.g., therapeutically and/or prophylactically active agents) useful in treating and/or preventing a proliferative disease. The compounds or compositions can be administered in combination with additional pharmaceutical agents that improve their activity (e.g., activity (e.g., potency and/or efficacy) in treating a proliferative disease in a subject in need thereof, and/or in preventing a proliferative disease in a subject in need thereof), improve bioavailability, improve safety, reduce drug resistance, reduce and/or modify metabolism, inhibit excretion, and/or modify distribution in a subject, biological sample, tissue, or cell. It will also be appreciated that the therapy employed may achieve a desired effect for the same disorder, and/or it may achieve different effects. In certain embodiments, a pharmaceutical composition described herein including a compound of the present disclosure and an additional pharmaceutical agent shows a synergistic effect that is absent in a pharmaceutical composition including one of the compound and the additional pharmaceutical agent, but not both.

In some embodiments, the compound or composition of the present disclosure can be administered concurrently with, prior to, or subsequent to one or more additional pharmaceutical agents, which may be useful as, e.g., combination therapies in treating and/or preventing a proliferative disease. Pharmaceutical agents include therapeutically active agents. Pharmaceutical agents also include prophylactically active agents. Pharmaceutical agents include small organic molecules such as drug compounds (e.g., compounds approved for human or veterinary use by the U.S. Food and Drug Administration as provided in the Code of Federal Regulations (CFR)), peptides, proteins, carbohydrates, monosaccharides, oligosaccharides, polysaccharides, nucleoproteins, mucoproteins, lipoproteins, synthetic polypeptides or proteins, antibodies, small molecules linked to proteins such as antibodies, glycoproteins, steroids, nucleic acids, DNAs, RNAs, nucleotides, nucleosides, oligonucleotides, antisense oligonucleotides, lipids, hormones, vitamins, and cells. In certain embodiments, the additional pharmaceutical agent is a pharmaceutical agent useful in treating a proliferative disease. In certain embodiments, the additional pharmaceutical agent is a pharmaceutical agent useful in preventing a proliferative disease. In certain embodiments, the additional pharmaceutical agent is a pharmaceutical agent approved by a regulatory agency (e.g., the US FDA) for treating and/or preventing a proliferative disease. Each additional pharmaceutical agent may be administered at a dose and/or on a time schedule determined for that pharmaceutical agent. The additional pharmaceutical agents may also be administered together with each other and/or with the salt or composition of the present disclosure in a single dose or administered separately in different doses. The particular combination to employ in a regimen will take into account compatibility of the salt of the present disclosure with the additional pharmaceutical agent(s) and/or the desired therapeutic and/or prophylactic effect to be achieved. In general, it is expected that the additional pharmaceutical agent(s) in combination be utilized at levels that do not exceed the levels at which they are utilized individually. In some embodiments, the levels utilized in combination will be lower than those utilized individually.

In certain embodiments, the additional pharmaceutical agent is an anti-proliferative agent (e.g., anti-cancer agent). In certain embodiments, the additional pharmaceutical agent is an anti-cancer agent, anti-angiogenesis agent, anti-inflammatory agent, immunosuppressant, anti-bacterial agent, anti-viral agent, cardiovascular agent, cholesterol-lowering agent, anti-diabetic agent, anti-allergic agent, pain-relieving agent, or a combination thereof.

In some embodiments, the method herein is for treating a proliferative diseases such as cancer in a subject in need thereof, the method comprising administering to the subject an effective amount (e.g., therapeutically effective amount) of a compound of the present disclosure. In certain embodiments, the compounds described herein or pharmaceutical compositions can be administered in combination with an anti-cancer therapy including, but not limited to, transplantation (e.g., bone marrow transplantation, stem cell transplantation), surgery, radiation therapy, cell therapy (e.g., CAR-T cell therapy), immunotherapy (e.g., anti-PD-1 or anti-PD-L1 antibody, or a cancer vaccine), and chemotherapy. Treatment with the IDO inhibiting compound may be performed prior to, concurrently with, or after the other therapy.

In some embodiments, the method herein is for treating an infectious disease in a subject in need thereof, the method comprising administering to the subject an effective amount (e.g., therapeutically effective amount) of a compound of the present disclosure. When the compounds of the present disclosure are used for treating a viral infection, it may be co-used with a second anti-viral agent, which may be different from any of the IDO inhibitors described herein. In some examples, the anti-viral agent is an anti-viral vaccine. The second anti-viral agent may be administered prior to, concurrently, or after the administration of the compounds of the present disclosure.

Other combined therapies involving IDO inhibitors, as known in the art, are also within the scope of the present disclosure. See, for example, WO2015006520, the relevant disclosures of which are incorporated by reference for the purposes or subject matter referenced herein.

Exemplary Embodiments

The following shows exemplary embodiments 1-71 of the present disclosure. Embodiment 1. A hydrochloride salt of Compound 1, e.g., in an isolated form, a substantially pure form, and/or in a solid form:

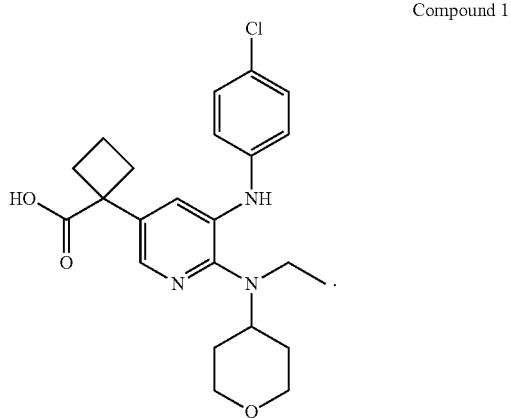 [SMILES: CCN(c1ncc(C2(C(=O)O)CCC2)cc1Nc1ccc(Cl)cc1)C1CCOCC1]

Compound 1

Embodiment 2. The hydrochloride salt of embodiment 1, which is in a crystalline Form I, characterized by (1) an X-ray powder diffraction (XRPD) pattern having one or more (e.g., 1, 2, 3, 4, or 5) of the following peaks: 14.7, 17.5, 19.8, 22.4, 22.9 degrees 2 theta, ±0.2°; (2) an X-ray powder diffraction (XRPD) pattern having one or more (e.g., 6 or more, 8 or more, 12 or more, or all) of the following peaks: 12.7, 14.7, 15.0, 15.9, 17.5, 18.7, 19.8, 20.5, 22.4, 22.9, 24.8, 25.5, 26.2, 28.4, 28.7, 29.0 and 30.1 degrees 2 theta, ±0.2°; (3) an XRPD pattern substantially the same as shown in FIG. 1A; (4) a Differential Scanning Calorimetry (DSC) pattern substantially the same as shown in FIG. 1B; or any combination thereof (e.g., (1) and (4), (2) and (4), (1), (2) and (4), or (3) and (4)).

Embodiment 3. The hydrochloride salt of embodiment 1 or 2, which is prepared by a process comprising: a) mixing Compound 1 and HCl in a solvent system comprising at least one non-aqueous solvent to form the hydrochloride salt; and optionally b) separating (e.g., precipitating) the hydrochloride salt from the solvent system.

Embodiment 4. The hydrochloride salt of embodiment 3, wherein the at least one non-aqueous solvent comprises isopropanol.

Embodiment 5. The hydrochloride salt of embodiment 3 or 4, wherein the solvent system is free or substantially free of a primary alcohol (e.g., methanol, ethanol, etc.).

Embodiment 6. The hydrochloride salt of embodiment 1, which is in an amorphous form.

Embodiment 7. The hydrochloride salt of any one of embodiments 1-6, which is substantially pure.

Embodiment 8. A pharmaceutical composition comprising the hydrochloride salt of any one of embodiments 1-7, and optionally a pharmaceutically acceptable excipient.

Embodiment 9. The pharmaceutical composition of embodiment 8, which is free or substantially free of Compound 1 in free acid form.

Embodiment 10. The pharmaceutical composition of embodiment 8 or 9, comprising the hydrochloride salt of embodiment 2, wherein the pharmaceutical composition is free or substantially free of Compound 1 in a salt form other than hydrochloride salt.

Embodiment 11. The pharmaceutical composition of any one of embodiments 8-10, comprising the hydrochloride salt of embodiment 2, wherein the pharmaceutical composition is free or substantially free of hydrochloride salt of Compound 1 in a solid form other than Form I.

Embodiment 12. The pharmaceutical composition of any one of embodiments 8-10, comprising the hydrochloride salt of embodiment 2, and further comprising hydrochloride salt of Compound 1 in an amorphous form.

Embodiment 13. Compound 1 in a substantially pure form and/or a crystalline form:

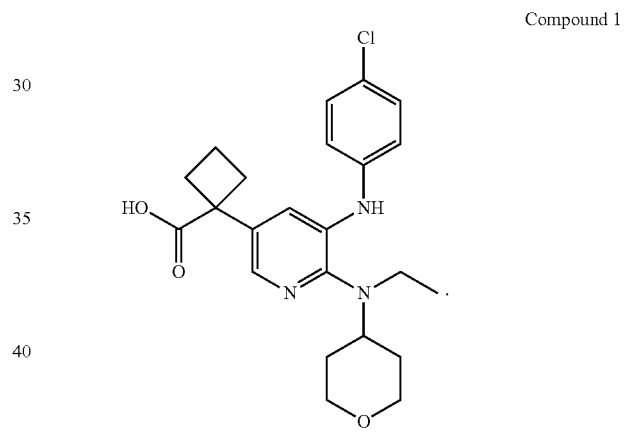

Compound 1

Embodiment 14. The Compound 1 of embodiment 13, which is in a crystalline Form II, characterized by (1) an X-ray powder diffraction (XRPD) pattern having one or more (e.g., 1, 2, 3, 4, 5, 6, 7, or 8) of the following peaks: 12.8, 15.5, 16.7, 18.2, 18.4, 19.3, 21.8, and 27.4 degrees 2 theta, ±0.2°; (2) an X-ray powder diffraction (XRPD) pattern having one or more (e.g., 6 or more, 8 or more, 12 or more, or all) of the following peaks: 6.4, 12.6, 12.8, 14.6, 15.5, 16.7, 17.0, 18.2, 18.4, 18.8, 19.3, 20.7, 21.8, 22.4, 23.1, 24.3, 24.8, 25.3, 25.6, 27.4, and 28.1 degrees 2 theta, ±0.2°; (3) an XRPD pattern substantially the same as shown in FIG. 2A; (4) a Differential Scanning Calorimetry (DSC) pattern substantially the same as shown in FIG. 2B; or any combination thereof (e.g., (1) and (4), (2) and (4), (1), (2) and (4), or (3) and (4)).

Embodiment 15. The Compound 1 of embodiment 13 or 14, which is substantially pure.

Embodiment 16. A pharmaceutical composition comprising the Compound 1 of any one of embodiments 13-15, and optionally a pharmaceutically acceptable excipient.

Embodiment 17. The pharmaceutical composition of embodiment 16, which is free or substantially free of Compound 1 in a salt form.

Embodiment 18. The pharmaceutical composition of embodiment 16, further comprising a salt form of Compound 1, e.g., the HCl salt of any of embodiments 1-7.
Embodiment 19. The pharmaceutical composition of any one of embodiments 16-18, further comprising an amorphous form of Compound 1.
Embodiment 20. A potassium salt of Compound 1, e.g., in an isolated form, a substantially pure form, and/or in a solid form:

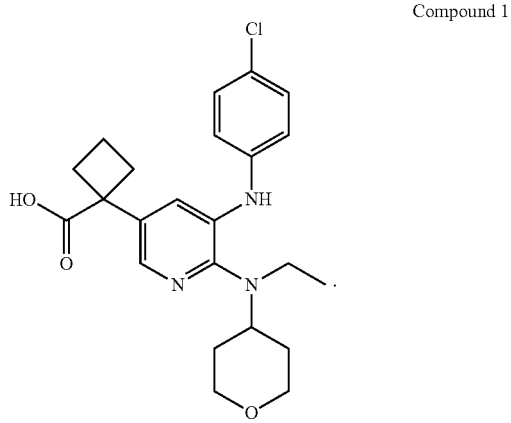 [SMILES: CCN(c1ncc(C2(C(=O)O)CCC2)cc1Nc1ccc(Cl)cc1)C1CCOCC1]

Compound 1

Embodiment 21. The potassium salt of embodiment 20, which is in a crystalline Form III, characterized by (1) an X-ray powder diffraction (XRPD) pattern having one or more (e.g., 1, 2, or 3) of the following peaks: 5.7, 13.5, and 18.9 degrees 2 theta, ±0.2°; (2) an X-ray powder diffraction (XRPD) pattern having one or more (e.g., 3 or more, 5 or more, or all) of the following peaks: 5.7, 9.8, 13.5, 16.7, 18.9, 19.6, 23.4, and 24.3 degrees 2 theta, ±0.2°; (3) an XRPD pattern substantially the same as shown in FIG. 3A; (4) a Differential Scanning Calorimetry (DSC) pattern substantially the same as shown in FIG. 3B; or any combination thereof (e.g., (1) and (4), (2) and (4), (1), (2) and (4), or (3) and (4)).
Embodiment 22. The potassium salt of embodiment 20 or 21, which is prepared by a process comprising: a) mixing Compound 1 and a potassium base (e.g., KOH) in a solvent system (e.g., methanol) to form the potassium salt; and optionally b) separating the potassium salt from the solvent system.
Embodiment 23. The potassium salt of embodiment 22, wherein the separating of step b) comprises removing at least a portion of the solvent system, and adding a second solvent system to precipitate the potassium salt.
Embodiment 24. The potassium salt of embodiment 23, wherein the second solvent system comprises ethyl acetate or isopropyl acetate.
Embodiment 25. The potassium salt of embodiment 20, which is in an amorphous form, or a hydrate or solvate form.
Embodiment 26. The potassium salt of any one of embodiments 20-25, which is substantially pure.
Embodiment 27. A pharmaceutical composition comprising the potassium salt of any one of embodiments 20-26, and optionally a pharmaceutically acceptable excipient.
Embodiment 28. The pharmaceutical composition of embodiment 27, which is free or substantially free of Compound 1 in free acid form.
Embodiment 29. The pharmaceutical composition of embodiment 27 or 28, comprising the potassium salt of embodiment 21, wherein the pharmaceutical composition is free or substantially free of Compound 1 in a salt form other than potassium salt.
Embodiment 30. The pharmaceutical composition of any one of embodiments 27-29, comprising the potassium salt of embodiment 21, wherein the pharmaceutical composition is free or substantially free of potassium salt of Compound 1 in a solid form other than Form III.
Embodiment 31. The pharmaceutical composition of any one of embodiments 27-29, comprising the potassium salt of embodiment 21, and further comprising potassium salt of Compound 1 in an amorphous form, a hydrate, and/or a solvate form.
Embodiment 32. A sodium salt of Compound 1, e.g., in an isolated form, a substantially pure form, and/or in a solid form:

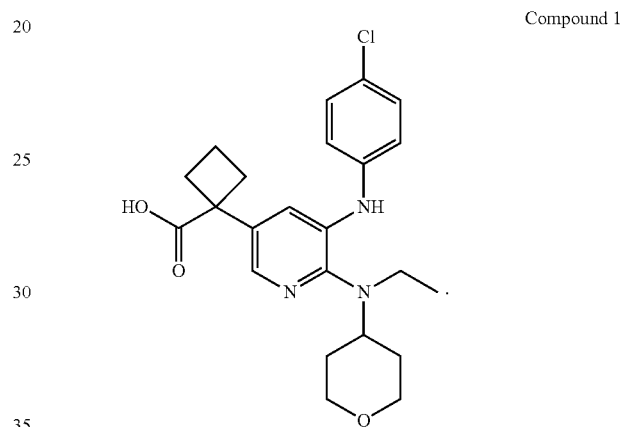

Compound 1

Embodiment 33. The sodium salt of embodiment 32, which is in a crystalline Form IV, characterized by (1) an X-ray powder diffraction (XRPD) pattern having one or more (e.g., 1, 2, 3, 4 or 5) of the following peaks: 11.4, 12.7, 13.2, 17.9, and 22.1 degrees 2 theta, ±0.2°; (2) an X-ray powder diffraction (XRPD) pattern having one or more (e.g., 5 or more, 10 or more, 15 or all) of the following peaks: 7.7, 9.4, 10.8, 11.4, 12.7, 13.2, 16.6, 17.9, 18.3, 18.8, 20.0, 21.8, 22.1, 22.9, 23.1, and 27.6 degrees 2 theta, ±0.2°; (3) an XRPD pattern substantially the same as shown in FIG. 4A; (4) a Differential Scanning Calorimetry (DSC) pattern substantially the same as shown in FIG. 4B; or any combination thereof (e.g., (1) and (4), (2) and (4), (1), (2) and (4), or (3) and (4)).
Embodiment 34. The sodium salt of embodiment 32 or 33, which is prepared by a process comprising: a) mixing Compound 1 and a sodium base (e.g., NaOH) in a solvent system (e.g., methanol) to form the sodium salt; and optionally b) separating the sodium salt from the solvent system.
Embodiment 35. The sodium salt of embodiment 34, wherein the separating of step b) comprises removing at least a portion of the solvent system, and adding a second solvent system to precipitate the sodium salt.
Embodiment 36. The sodium salt of embodiment 35, wherein the second solvent system comprises ethyl acetate or isopropyl acetate.
Embodiment 37. The sodium salt of embodiment 32, which is in an amorphous form, or a hydrate or solvate form.
Embodiment 38. The sodium salt of any one of embodiments 32-37, which is substantially pure.

Embodiment 39. A pharmaceutical composition comprising the sodium salt of any one of embodiments 32-38, and optionally a pharmaceutically acceptable excipient.

Embodiment 40. The pharmaceutical composition of embodiment 39, which is free or substantially free of Compound 1 in free acid form.

Embodiment 41. The pharmaceutical composition of embodiment 39 or 40, comprising the sodium salt of embodiment 33, wherein the pharmaceutical composition is free or substantially free of Compound 1 in a salt form other than sodium salt.

Embodiment 42. The pharmaceutical composition of any one of embodiments 39-41, comprising the sodium salt of embodiment 33, wherein the pharmaceutical composition is free or substantially free of sodium salt of Compound 1 in a solid form other than Form IV.

Embodiment 43. The pharmaceutical composition of any one of embodiments 39-41, comprising the sodium salt of embodiment 33, and further comprising sodium salt of Compound 1 in an amorphous form, a hydrate, and/or a solvate form.

Embodiment 44. A hydrobromide salt of Compound 1, e.g., in an isolated form, a substantially pure form, and/or in a solid form:

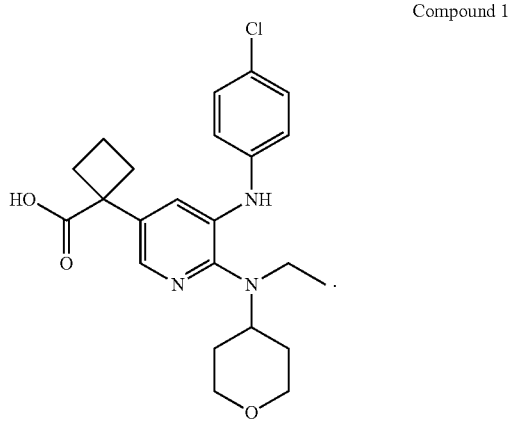 [SMILES: CCN(c1ncc(C2(C(=O)O)CCC2)cc1Nc1ccc(Cl)cc1)C1CCOCC1]

Compound 1

Embodiment 45. The hydrobromide salt of embodiment 44, which is in a crystalline Form V, characterized by (1) an X-ray powder diffraction (XRPD) pattern having one or more (e.g., 1, 2, 3, 4, 5, 6, or 7) of the following peaks: 7.4, 14.9, 17.3, 19.6, 22.3, 24.7, and 28.9 degrees 2 theta, ±0.2°; (2) an X-ray powder diffraction (XRPD) pattern having one or more (e.g., 5 or more, 10 or more, 15 or more, or all) of the following peaks: 7.4, 14.9, 16.5, 17.3, 19.6, 20.3, 22.3, 22.6, 24.7, 25.3, 25.5, 26.1, 28.2, 28.6, 28.9, 30.0, 31.2, 36.0 and 36.9 degrees 2 theta, 0.2°; (3) an XRPD pattern substantially the same as shown in FIG. 5A; (4) a Differential Scanning Calorimetry (DSC) pattern substantially the same as shown in FIG. 5B; or any combination thereof (e.g., (1) and (4), (2) and (4), (1), (2) and (4), or (3) and (4)).

Embodiment 46. The hydrobromide salt of embodiment 32 or 33, which is prepared by a process comprising: a) mixing Compound 1 and HBr in a solvent system comprising at least one non-aqueous solvent to form the hydrobromide salt; and optionally b) separating (e.g., precipitating) the hydrobromide salt from the solvent system.

Embodiment 47. The hydrobromide salt of embodiment 46, wherein the at least one non-aqueous solvent comprises isopropanol.

Embodiment 48. The hydrobromide salt of embodiment 47, wherein the solvent system is free or substantially free of a primary alcohol (e.g., methanol, ethanol, etc.).

Embodiment 49. The hydrobromide salt of embodiment 44, which is in an amorphous form, or a hydrate or solvate form.

Embodiment 50. The hydrobromide salt of any one of embodiments 44-49, which is substantially pure.

Embodiment 51. A pharmaceutical composition comprising the hydrobromide salt of any one of embodiments 44-50, and optionally a pharmaceutically acceptable excipient.

Embodiment 52. The pharmaceutical composition of embodiment 51, which is free or substantially free of Compound 1 in free acid form.

Embodiment 53. The pharmaceutical composition of embodiment 51 or 52, comprising the hydrobromide salt of embodiment 45, wherein the pharmaceutical composition is free or substantially free of Compound 1 in a salt form other than hydrobromide salt.

Embodiment 54. The pharmaceutical composition of any one of embodiments 51-53, comprising the hydrobromide salt of embodiment 45, wherein the pharmaceutical composition is free or substantially free of hydrobromide salt of Compound 1 in a solid form other than Form V.

Embodiment 55. The pharmaceutical composition of any one of embodiments 51-53, comprising the hydrobromide salt of embodiment 45, and further comprising hydrobromide salt of Compound 1 in an amorphous form, a hydrate, and/or a solvate form.

Embodiment 56. A methanesulfonic acid or benzene sulfonic acid of Compound 1, e.g., in an isolated form, a substantially pure form, and/or in a solid form:

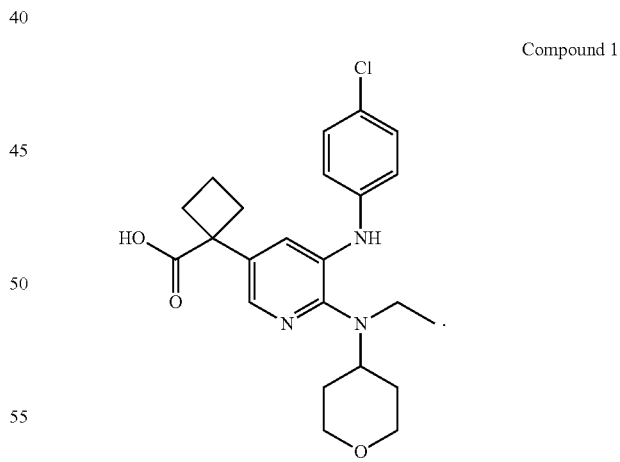

Compound 1

Embodiment 57. An amine salt of Compound 1, e.g., in an isolated form, a substantially pure form, and/or in a solid form:

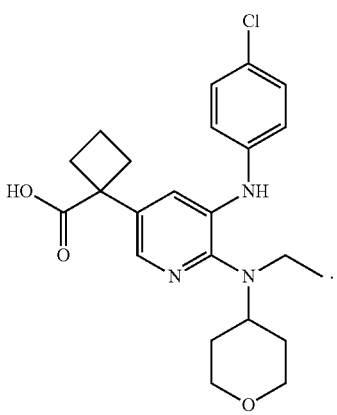

Compound 1

Embodiment 58. The amine salt of embodiment 57, which is a lysine (e.g., L-Lysine) salt, an arginine (e.g., L-Arginine) salt, a tromethamine salt, or a meglumine salt.

Embodiment 59. The amine salt of embodiment 57 or 58, which is in an amorphous, hydrate or solvate form.

Embodiment 60. The amine salt of any one of embodiments 57-59, prepared by a method according to Example 3 of this application.

Embodiment 61. A salt of Compound 1 prepared by any of the method of preparation described herein, e.g., as shown in Examples 2-7.

Embodiment 62. A pharmaceutical composition comprising the salt of any one of embodiments 56-61, and optionally a pharmaceutically acceptable excipient.

Embodiment 63. A method of treating a disease associated with indoleamine 2,3-dioxegenase (IDO), the method comprising administering to a subject in need thereof an effective amount of the hydrochloride salt of any one of embodiments 1-7, the Compound 1 of any one of embodiments 13-15, the potassium salt of any one of embodiments 20-26, the sodium salt of any one of embodiments 32-38, the hydrobromide salt of any one of embodiments 44-50, or the salt of any one of embodiments 56-61, or the pharmaceutical composition of any one of embodiments 8-12, 16-19, 27-31, 39-43, 51-55 or 62.

Embodiment 64. The method of embodiment 63, wherein the disease associated with IDO is cancer.

Embodiment 65. The method of embodiment 64, wherein the cancer is selected from the group consisting of lung cancer, breast cancer, prostate cancer, ovarian cancer, endometrial cancer, cervical cancer, bladder cancer, head and neck cancer, renal cell carcinoma, esophageal cancer, pancreatic cancer, brain cancer, cancers of the gastrointestinal tract, liver cancer, leukemia, lymphoma, melanoma, multiple myeloma, Ewing's sarcoma, and osteosarcoma.

Embodiment 66. The method of embodiment 64 or 65, further comprising treating the subject with an additional anti-cancer therapy.

Embodiment 67. The method of embodiment 66, wherein the additional anti-cancer therapy is immunotherapy, radiation therapy, chemotherapy, cell therapy, surgery and/or transplantation.

Embodiment 68. The method of embodiment 63, wherein the disease associated with IDO is an infectious disease.

Embodiment 69. The method of embodiment 68, wherein the infectious disease is a viral infection.

Embodiment 70. The method of embodiment 69, wherein the subject is further treated with an additional anti-viral therapy.

Embodiment 71. The method of embodiment 70, wherein the additional anti-viral therapy comprises administering to the subject an additional anti-viral agent or anti-viral vaccine.

Definitions

"Compound(s) of the present disclosure" as used herein refers to Compound 1 and any salt of Compound 1 described herein, for example, Compound 1, an acid addition salt of Compound 1 (e.g., HCl salt, HBr salt, etc.), a base addition salt of Compound 1 (e.g., a potassium salt, a sodium salt, etc.), an isolated form thereof, a substantially pure form thereof, a solid form thereof including crystalline forms, amorphous forms, hydrates and/or solvates. In some embodiments, Compounds of the present disclosure can preferably refer to a hydrochloride salt of Compound 1 (e.g., in Form I), hydrobromide salt of Compound 1 (e.g., in Form V), or potassium salt of Compound 1 (e.g., in Form III) described herein, which can be in an isolated form, a substantially pure form, and/or a solid form, such as one or more crystalline forms described herein, amorphous form, hydrate, solvate, or any mixture thereof. In some specific embodiments, Compounds of the present disclosure can refer to Compound 1 in Form II, the HCl salt of Compound 1 in Form I, the potassium salt of Compound 1 in Form III, the sodium salt of Compound 1 in Form IV, or the HBr salt of Compound 1 in Form V, or any combination thereof.

As used herein, the term "about" modifying an amount related to the invention refers to variation in the numerical quantity that can occur, for example, through routine testing and handling; through inadvertent error in such testing and handling; through differences in the manufacture, source, or purity of ingredients employed in the invention; and the like. As used herein, "about" a specific value also includes the specific value, for example, about 10% includes 10%. Whether or not modified by the term "about", the claims include equivalents of the recited quantities. In one embodiment, the term "about" means within 20% of the reported numerical value.

As used herein, the terms "treat," "treating," "treatment," and the like refer to eliminating, reducing, or ameliorating a disease or condition, and/or symptoms associated therewith. Although not precluded, treating a disease or condition does not require that the disease, condition, or symptoms associated therewith be completely eliminated. As used herein, the terms "treat," "treating," "treatment," and the like may include "prophylactic treatment," which refers to reducing the probability of redeveloping a disease or condition, or of a recurrence of a previously-controlled disease or condition, in a subject who does not have, but is at risk of or is susceptible to, redeveloping a disease or condition or a recurrence of the disease or condition. The term "treat" and synonyms contemplate administering a therapeutically effective amount of a salt of the present disclosure to a subject in need of such treatment.

The term "therapeutically effective amount," as used herein, refers to that amount of a therapeutic agent (e.g., any one or more of the Compounds of the present disclosure) sufficient to result in amelioration of one or more symptoms of a disorder or condition (e.g., a cancer or an infection associated with IDO), or prevent appearance or advancement of a disorder or condition, or cause regression of or cure from the disorder or condition.

The term "subject" (alternatively referred to herein as "patient") as used herein, refers to an animal, preferably a mammal, most preferably a human, who has been the object of treatment, observation or experiment. In any of the embodiments described herein, the subject can be a human.

EXAMPLES

Example 1. General Methods

Materials: the starting materials, reagents, solvents, etc. are generally available through commercial sources.

$^1$H NMR was performed using Bruker Advance 300 equipped with automated sample (B-ACS 120).

POWDER X-RAY DIFFRACTION (XRPD): The solid samples were examined using X-ray diffractometer (Bruker D8 advance). The system is equipped with LynxEye detector. The x-ray wavelength is 1.5406 Å. The samples were scanned from 3 to 40° 2θ, at a step size 0.02° 2θ. The tube voltage and current were 40 KV and 40 mA, respectively.

Polarizing microscope analysis (PLM): PLM analysis was conducted on a Nikon Instruments Eclipse 80i. The image was captured by a DS camera and transmitted to the computer. The photo was processed with the NIS-Elements D3.0 software.

TGA ANALYSIS: TGA analysis was carried out on a TA Instruments TGA Q500. Samples were placed in an open tarred aluminum pan, automatically weighed, and inserted into the TGA furnace. The samples were heated at a rate of 100° C./min to final temperature.

DSC ANALYSIS: DSC analysis was conducted on a TA Instruments Q200. The calibration standard was indium. A sample in weight was placed into a TA DSC pan, and weight was accurately recorded. The samples were heated under nitrogen (50 ml/min) at a rate of 100° C./min to a final temperature.

Dynamic moisture sorption analysis (DVS): DVS was determined using IGAsorp (Hiden Isochema, UK). The sample was tested at a targeted RH of 10 to 90% full cycle in step mode. The analysis was performed in 10% RH increments.

HPLC ANALYSIS: a representative HPLC method is shown below, which can be used, for example, to analyze the purity, solubility, and stability of the salts herein.

| | |
|---|---|
| Instrument | Agilent 1260 |
| Column | Eclipse Plus C18, 3.5 µm, 4.6 mm × 100 mm |
| Column temperature | 40° C. |
| Mobile phase | A: 0.1% TFA in water, B: 0.1% TFA in ACN |
| Gradient condition (% of B) | 0-15 min: 10-90%, 15-17 min: 90% |
| Flow rate | 1.0 mL/min |
| Injection volume | 10 µL |
| UV wavelength | 246 nm |
| Post time | 3 min |

Example 2. Preparation and Solid State Characterization of Compound 1

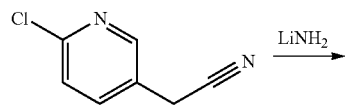

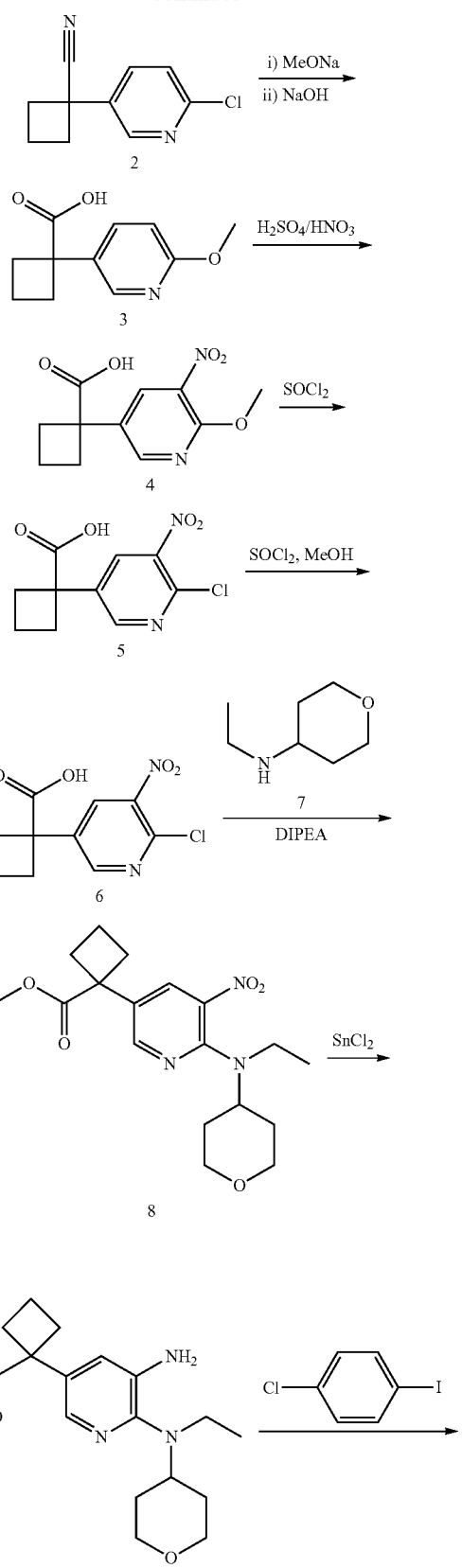

-continued

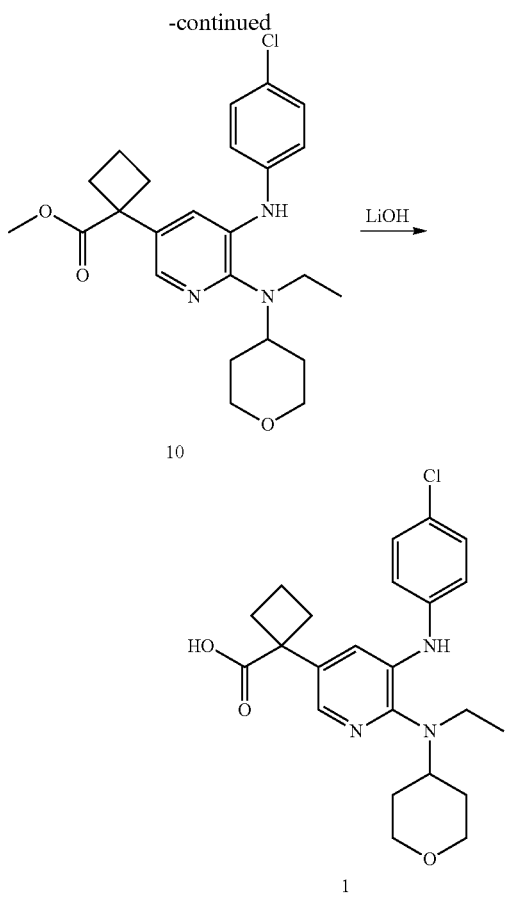

THF (8 L) and LiNH₂ (361 g, 15.72 mol) were charged to a reactor, and the system was heated to 40±3° C. 5-10% of total weight of a mixture of 2-(6-chloropyridin-3-yl)acetonitrile (800 g, 5.24 mol) and 1,3-dibromopropane (2117 g, 10.49 mol) in THF (800 mL) was charged drop-wise to the reactor at 40-45° C., followed by addition of LiNH₂ (60 g, 2.61 mol) to the above reactor. The remaining of 2-(6-chloropyridin-3-yl)acetonitrile and 1,2-dibromopropane solution was then charged drop-wise at 40-50° C. The reaction was stirred for 15-30 min, and then quenched with MeOH (2.4 L) under 25° C. Filtered through celite and the filtrate was concentrated. The residue was diluted with EA (4 L), and the solution was washed with H₂O (4 L). The aqueous phase was re-extracted with EA (2.4 L). The combined organic phase was washed with brine (2.4 L) and then concentrated. The residue was dissolved into THF and the solution was used for next step directly.

To the above solution of compound 2 in THF was added MeOH (4 L) and MeONa (283 g, 5.24 mol). The mixture was heated to 60° C. After 6 hours, MeONa (283 g, 5.24 mol) was added. After another 6 hours, MeONa (283 g, 5.24 mol) was added. After the reaction was completed, the mixture was cooled to room temperature, filtered and the filtrate was concentrated to 3.5 L. The residue was diluted with purified water (22.4 L), and NaOH (1258 g, 31.45 mol) was added. The mixture was heated at 80° C. for 4 hours, and then cooled to room temperature. DCM (4 L) and purified water (4 L) were charged. The aqueous phase was separated and extracted with DCM. The aqueous phase was neutralized to pH 4-5 with conc. HCl and extracted with DCM again. The combined organic layer was concentrated to 4 L. To the residue was added conc. H₂SO₄ (3.6 kg) while maintaining the temperature below 40° C., and the solution was then concentrated to about 2.8 L to give a crude 3 solution.

Under N₂ atmosphere, conc. H₂SO₄ (9.6 kg) was charged to a reactor and 95% HNO₃ (696 g, 10.49 mol) was then charged maintaining the temperature below 20° C. The mixture was heated to 55±2° C., and 70% of the above solution of the crude compound 3 and H₂SO₄ in DCM were charged slowly to the reactor under 60° C. Then 95% HNO₃ (348 g, 5.25 mol) was charged slowly at 55-60° C. and stirred for at least two hours. The remaining 30% of the solution of the compound 3 was added and stirred at 55-60° C. for at least 35 hours. 95% HNO₃ (174 g, 2.62 mol) was charged at 55-60° C., and the mixture was heated at 55-60° C. for 12 hours. The mixture was cooled to 10° C. and added to water (16 L) maintaining the temperature below 20° C. The mixture was extracted with DCM and washed with water and brine. The organic phase was concentrated to not more than 2 volumes under 45° C. MTBE (5.0 v) was charged and concentrated to a volume of 1.6 L. MTBE (4 L) and n-hexane (2.4 L) were charged and the mixture was concentrated to about 2.4 L. The residue was cooled to 5-10° C. for one hour and then filtered. The filter cake was dried under vacuum at 40° C. to give compound 4.

Under N₂ atmosphere, SOCl₂ (117.9 g, 0.99 mol) and compound 4 (25 g, 99.12 mmol) were charged. The mixture was cooled to 10-15° C., and DMF (14.5 g, 0.20 mol) was charged maintaining the temperature below 35°. After the addition was completed, the mixture was heated to 78-80° C. for 4-5 hours. Then the reaction mixture was cooled and concentrated to give a residue which was added dropwise to a solution of ACN (50 mL) and water (100 mL). The resulting mixture was heated to 35-45° C. and MTBE (150 mL) was charged. The aqueous phase was separated and extracted with MTBE (50 mL). The combined organic layer was washed with water and brine, and concentrated to a volume of 50 mL. The solvent was switched to heptane, and the mixture was cooled to 0-10° C. and filtered. The filter cake was dried under vacuum to give compound 5.

To a solution of compound 5 (652 g, 2.54 mol) in MeOH (2.6 L) was added SOCl₂ (363 g, 3.05 mol) at 15-25° C., and the mixture was stirred for 2 hours and then concentrated to a volume of 2 L. To the residue was added an aqueous NaHCO₃ (8%, 2.6 L) solution, and the mixture was extracted with MTBE. The combined organic layer was washed with brine and concentrated to a volume of 1.3 L. To the residue was added DMSO (2 L), DIPEA (656.6 g, 5.08 mol) and compound 7 (656 g, 5.08 mol). The mixture was heated to 90±5° C. for 18 hours, cooled to 25° C., and MTBE (3.3 L) and water (2 L) were added. The aqueous phase was separated and extracted with MTBE (2 L). The combined organic layer was washed with brine and concentrated to a volume of 2 L. The solvent was switched to heptane and the mixture was cooled 5±5° C. Filtered and the filter cake was dried at 50±5° C. to give compound 8.

Under N₂ atmosphere, to a solution of compound 8 (952.6 g, 2.62 mol)) in EA (9.5 L) and MeOH (950 mL) was added SnCl₂.2H₂O (2069 g, 9.17 mol) in portions, and the mixture was stirred for 2 hours and then neutralized pH 8-9 with Na₂CO₃ (15% aqueous solution). Filtered and the filter cake was washed with EtOAc. The filtrate was separated and the organic layer was washed with brine and concentrated below 50° C. The solvent was switched to toluene and concentrated to a volume of 2 L. To the residue was added toluene (7.6 L), 1-chloro-4-iodobenzene (1249 g, 5.24 mol) and t-BuONa (378 g, 3.93 mol) under N₂ atmosphere. The mixture was stirred for 10 minutes and then added $Pd_2(dba)_3$ (36 g, 39.31 mmol) and RuPhos (36.7 g, 78.65 mmol). The mixture was heated to 100±5° C. for 2.5 hours and then was cooled to 20-30° C. Filtered, and the filtrate was washed with water and brine. The organic layer was concentrated and the solvent was switched to MeOH to a volume of 2.4 L. The mixture was cooled to 0-5° C. and filtered. The filter cake dried at 50±5° C. to give compound 10.

Under $N_2$ atmosphere, to a solution of compound 10 (600 g, 1.35 mol) in THF (4.2 L) and MeOH (1.2 L) was added a solution of LiOH (97 g, 4.05 mol) in water (4.2 L) under 25° C., and the mixture was stirred at 20±5° C. for 3 hours and then cooled to 0±5° C. The mixture was neutralized to pH 5-6 with hydrochloric acid and then concentrated to a volume of 4.8 L at 40° C. To the residue was added EtOAc (6 L) and separated. The aqueous phase was extracted with EA (1.8 L) and the combined the organic layer was concentrated to a low volume of 1.2 L. To the residue was added heptane (3 L), and the mixture was cooled to 20±5° C. Filtered, and the filter cake was dried at 50±5° C. to give compound 1.

Compound 1 was characterized by $^1$H NMR, XRPD, PLM, TGA, DSC, and DVS. Representative XRPD and TGA/DSC spectra are shown herein in FIGS. 2A and 2B, respectively. A table of XRPD peaks is shown below in Table 1.

$^1$H NMR and TGA profiles showed that there were some residual solvents. XRPD and PLM showed that the sample was crystalline. In TGA profile, there was about 0.5500 weight loss prior to 200° C. Two endothermic peaks with onset temperature of 117.87° C. and 163.39° C. were observed in DSC profile. This crystalline form is named Form II.

DVS result showed that it adsorbed about 0.37% of moisture at 80% RH as shown in FIG. 2C. After DVS test, XRPD pattern of the sample was not changed as shown in FIG. 2D.

Example 3. Salt Screening

Salt screening of Compound 1 was conducted with 8 acids and 10 bases in 96-well plate using 12 solvents. The 8 acids tested were Hydrochloric acid, Hydrobromic acid, Methanesulfonic acid, Phosphoric acid, L-Tartaric acid, Benzenesulfonic acid, Succinic acid and Maleic acid. The base tested were NaOH, KOH, L-arginine, L-lysine, Ammonia, Nicotinamide, Meglumine, Tromethamine, Choline hydroxide, and Glutamine. The solvents tested in the screening experiments were Methanol, Acetonitrile (ACN), Ethanol, Methyl-tert-Butyl Ether (MTBE), Isopropanol (IPA), Acetone, 2-butanone, Water, Isobutanol, Ethyl acetate (EtOAc), Tetrahydrofuran (THF), and Isopropyl acetate.

Briefly, for the acids, appropriate amount of 8 acids were dissolved with methanol to make a solution at a concentration of 0.1 M. About 315 mg of Compound 1 was dissolved in acetone to make a solution with the concentration of 30 mg/mL. The Compound 1 solution was then distributed into 12×8 wells of 96-well plates. Each well contained 100 μL of Compound 1 solution. 71 μL of each acid solution was added into each row. After dryness, 200 μL of 12 test solvents were added to column 1-12 of 10 rows. Wells were covered with a film with pinhole and evaporated in an operating laboratory fume hood under ambient conditions. Some solid samples obtained were analyzed by XRPD, $^1$H NMR etc.

For the bases, appropriate amount of 10 bases were dissolved with methanol or the mixture of methanol and water to make a solution with the concentration of 0.1 M. Appropriate amount of Compound 1 was dissolved with acetone to make a solution with the concentration of 30 mg/mL. Compound 1 solution was then distributed into 10×12 wells of 96-well plates. Each well contained 100 μL of Compound 1 solution. 70 μL of each base solution was added into each row. After dryness, 200 μL of 12 solvents were added to column 1-12 of 10 rows. Wells were covered with a film with pinhole, protected from light, and evapo-

TABLE 1

XRPD peaks of Compound 1 in Form II.

| Angle 2-Theta ° | Intensity % | Intensity Count | d value Angstrom | Angle 2-Theta ° | Intensity % | Intensity Count | d value Angstrom |
| --- | --- | --- | --- | --- | --- | --- | --- |
| 6.416 | 20.7 | 939 | 13.76593 | 24.323 | 38.9 | 1766 | 3.65648 |
| 7.666 | 7.4 | 336 | 11.52358 | 24.837 | 45.4 | 2064 | 3.58189 |
| 8.187 | 13 | 591 | 10.79073 | 25.253 | 21.5 | 975 | 3.52389 |
| 8.933 | 5.8 | 264 | 9.89106 | 25.598 | 24.8 | 1128 | 3.47719 |
| 10.284 | 6.6 | 301 | 8.59489 | 25.752 | 19.2 | 873 | 3.45673 |
| 11.517 | 10.1 | 459 | 7.67737 | 26.002 | 12.8 | 583 | 3.4241 |
| 12.552 | 26.9 | 1220 | 7.0463 | 26.805 | 10.4 | 473 | 3.32331 |
| 12.836 | 59.2 | 2688 | 6.89105 | 27.416 | 57.9 | 2629 | 3.25055 |
| 13.821 | 14.1 | 640 | 6.40227 | 28.148 | 29.5 | 1339 | 3.1677 |
| 14.58 | 23.7 | 1075 | 6.07039 | 28.77 | 8.3 | 376 | 3.10057 |
| 14.958 | 15.1 | 685 | 5.91799 | 29.394 | 7.4 | 336 | 3.03613 |
| 15.505 | 66.4 | 3015 | 5.71042 | 30.042 | 9.1 | 412 | 2.97218 |
| 16.393 | 11.5 | 523 | 5.40308 | 30.317 | 16.4 | 743 | 2.94579 |
| 16.723 | 61.5 | 2792 | 5.2971 | 30.998 | 7.2 | 326 | 2.88267 |
| 17.003 | 41.9 | 1904 | 5.21061 | 31.418 | 9.1 | 413 | 2.84503 |
| 18.223 | 54.8 | 2488 | 4.86429 | 32.437 | 5.3 | 241 | 2.75798 |
| 18.434 | 70.5 | 3200 | 4.80919 | 33.14 | 6.6 | 301 | 2.70107 |
| 18.831 | 24.8 | 1126 | 4.70872 | 33.704 | 5.7 | 258 | 2.65716 |
| 19.305 | 100 | 4542 | 4.59415 | 34.296 | 5.6 | 255 | 2.61261 |
| 20.171 | 7.6 | 343 | 4.39869 | 35.005 | 4.6 | 209 | 2.5613 |
| 20.716 | 22.1 | 1004 | 4.28421 | 35.21 | 5 | 226 | 2.54681 |
| 21.325 | 11.7 | 531 | 4.16329 | 36.116 | 6.6 | 298 | 2.48499 |
| 21.803 | 95 | 4315 | 4.07306 | 37.169 | 9.8 | 446 | 2.41698 |
| 22.388 | 36.1 | 1640 | 3.96799 | 37.947 | 10 | 453 | 2.36923 |
| 23.124 | 26.9 | 1224 | 3.84321 | 38.594 | 4.6 | 209 | 2.33097 |
| 23.572 | 6.8 | 308 | 3.77122 | 38.991 | 7 | 320 | 2.30816 | rated under N₂ conditions. Some solid samples obtained were determined by XRPD and ¹H NMR.

Results of Salt Screening Using Acids

After dry, most of samples in 96-well plate were glassy or oil. One sample in each row was analyzed by ¹H NMR and some solid samples were analyzed by XRPD. Compared with Compound 1, there was chemical shift in ¹H NMR profiles of samples in rows A, B, C, and D, and no chemical shifts in profiles of sample in rows E, F, G and H. XRPD patterns of samples in rows E, F, G and H were similar to Compound 1. So, Compound 1 formed salt with HCl acid, HBr acid, methanesulfonic acid and benzenesulfonic acid. Compound 1 did not form salt with Maleic acid, L-tartaric acid, $H_3PO_4$ acid, or Succinic acid.

Results of Salt Screening Using Bases

After evaporation to dry, most samples in 96-well plate were sticky or glassy. One sample in each row was analyzed by ¹H NMR and some samples were analyzed by PLM.

Compared with Compound 1, there was no chemical shift in ¹H NMR profiles of samples in row E, G and J. Compound 1 formed salt with NaOH, KOH, L-arginine, L-lysine, meglumine, tromethamine, and choline hydroxide.

In salt screening, Compound 1 formed salt with 7 bases and 4 acids including NaOH, KOH, L-arginine, L-lysine, meglumine, tromethamine, choline hydroxide, HCl acid, HBr acid, methanesulfonic acid and benzenesulfonic acid.

According to the initial screening results, small scale-ups with 7 bases with Compound 1 were tested. 6 solid products were formed with Compound 1, except choline hydroxide. Crystalline K salt and Na salt were prepared. Under the small scale-up conditions, no crystalline solid were obtained with L-arginine.

Compound 1 formed salt with meglumine and tromethamine, both of which appeared to be solvate or hydrate.

For meglumine, the salt was prepared by the following two procedures: Procedure 1: 42.68 mg of Compound 1 was dissolved in 300 μL of IPA with stirring at 60° C. Added 100 μL of 1 M meglumine/water solution, and reacted at 60° C. for 45 min. Cooled to room temperature, no solid sample was obtained. Concentrated to dry, sticky sample was obtained. Added 200 μL of isopropyl acetate, and evaporated overnight. Added 200 μL of isopropyl acetate, and kept stirring 48 hours. Added 400 μL of isopropyl acetate again, and kept stirring for 3 hours. Solid sample was collected by filtration. There was about 6.8% residue isopropyl acetate in this product. TGA shows that there was about 7.7% of weight loss in this product. An endothermic peak between 90° C. to 100° C. was detected by DSC. The product obtained was determined to be a solvate.

Procedure 2: 23.26 mg of meglumine was dissolved in 500 μL of methanol with stirring at 50° C. Then, 43.64 mg of Compound 1 was added. The clear solution was reacted for 30 min at 50° C. Cooled and concentrated to dry, no solid sample was obtained. Added 100 μL of ethyl acetate, a little solid was obtained. Kept stirring overnight, 400 μL of ethyl acetate was added. After stirred for 5 hours, the sample was collected by filtration. There was about 5.2% residue ethyl acetate in this product. TGA shows that there was about 5.7% weight loss in this product. An endothermic peak between 90° C. to 100° C. was detected in by DSC. The product obtained was determined to be a solvate.

For tromethamine, the salt can be prepared by the following 4 procedures.

Procedure 1: 42.18 mg of Compound 1 was dissolved in 1 mL of 0.1 M tromethamine/methanol solution. Reacted at room temperature for 2 hours, the clear solution was concentrated to dry. 200 μL of isopropyl acetate was added into the sticky sample, and then kept stirred overnight. Added 300 μL of isopropyl acetate, and stirred for another 1 hour. The solid sample was obtained by filtration.

Procedure 2: 41.60 mg of Compound 1 was dissolved in 1 mL of 0.1 M tromethamine/methanol solution. Reacted at room temperature for 30 min, the clear solution was concentrated to dry. Sticky sample was obtained. Added 400 μL of ethyl acetate, and stirred at room temperature. Few minutes later, solid sample appeared. The solid sample was collected by filtration, after stirred for 3 hours.

Procedure 3: 13.47 mg of tromethamine was dissolved in 1 mL of IPA with stirring at 60° C. Added 42.68 mg of Compound 1 and reacted for 30 min. Cooled to room temperature, no solid sample was obtained. Concentrated to dry, sticky sample was obtained. Added 200 μL of n-heptane, and kept stirring for 1 hour. The state of the sample was not changed. Added another 200 μL of n-heptane, and slowly evaporated to dry. Semi-solid was prepared. Added 500 μL of n-heptane and stirred for 4 hours continue, the solid sample was collected by filtration and dried under vacuum at 40° C. overnight.

Procedure 4: 21.58 mg of Compound 1 was dissolved in 500 μL of 0.1 M tromethamine/methanol solution. Reacted at room temperature for 1 hour, the solution was clear. Concentrated to dry, sticky sample was prepared. Added 100 μL of water and kept stirred overnight, the solid sample was prepared and collected by filtration.

According to the results of ¹H NMR, there was residue solvent in all samples, except the product obtained in Procedure 4. Chemical shifts of product 4 were small in comparison with other samples and dissociation occurred. All products were determined to be solvate or hydrate.

Compound 1 did not form salt with L-lysine under the conditions tested in small scale-up studies. ¹H NMR result showed that salt may be not formed or dissociated to Compound 1 during slurry in water. XRPD pattern of the product prepared was similar to that of Compound 1.

Based on the result of 96-well plate screening, two acid addition salts, the HCl salt and HBr salt were chosen for scale up.

Example 4. Preparation of HCl Salt of Compound 1

8 experiments with different solvents were tired to prepare HCl salt. All XRPD patterns of products were the same. TGA and DSC profiles of all products were also similar. According to ¹H NMR results, an ester by-product was formed with methanol at 60° C. in acidic condition. The molecular weight of by-product was determined to be 444.

Three procedures using IPA at 60° C. were used for scale up study of the HCl salt.

Procedure 1: 429.94 mg of Compound 1 was dissolved in 4 mL of IPA with stirring at 60° C. Added 84 μL of HCl acid, and reacted for 40 min. The clear reaction solution was cooled slowly. The reaction solution was clear till 33° C. Then some seeds were added. Lots of solid sample appeared immediately. After cooled for 4 hours, the sample was collected by filtration.

Procedure 2: 429.92 mg of Compound 1 was dissolved in 4 mL of IPA with stirring at 60° C. Added 84 μL of HCl acid, and reacted for 30 min. After filtration, the solution was hold at 60° C. for 15 min. Then, some seeds were added, and kept stirring at 60° C. for 15 min. Cooled slowly to room temperature, the solid product was collected by filtration.

Procedure 3: 429.93 mg of Compound 1 was dissolved in 5 mL of IPA with stirring at 60° C. Added 84 μL of HCl acid, and reacted for 20 min. After filtration, the solution was hold at 60° C. for 10 min. Then, some seeds were added, and kept stirring at 60° C. for 1 hour. Cooled slowly to room temperature, the solid product was collected by filtration.

A further scale-up procedure is shown below: 3.22 g of Compound 1 was transferred into 30 mL of IPA and kept clear at 60° C. for 15 minutes. Then 630 μL of conc. HCl acid was added. After reacting for 30 minutes, 10.27 mg of Compound 1 HCl salt seeds were dropped into flask with some of them undissolved. Cooling was conducted after holding for 40 minutes. The solid obtained after filtration was dried at 40° C. overnight. The final product was 2.7 g.

Seed crystal preparation: to a solution of Compound 1 (3 g, 6.98 mmol) in isopropanol (IPA) (18 mL) was added conc. HCl (0.6 mL) at 40-45° C., and the mixture was cooled to 15-25° C. for 6 hours and 0-5° C. for 4 hours. Filtered, and the filter cake was dried to give an HCl salt of Compound 1 which was used as seeds in this example.

The sample was crystalline with club shape. TGA and DSC profiles showed that there was about 0.300 weight loss prior to 150° C., and an endothermic peak with onset temperature of 198.21° C. The crystalline form was named as Form I. An $^1$H NMR spectrum is shown in FIG. 1E.

Representative XRPD and DSC spectra are shown in FIGS. 1A-11B. A table of XRPD peaks are shown below in Table 2.

TABLE 2

XRPD peak tables for form I.

| Angle 2-Theta ° | Intensity % | Intensity Count | d value Angstrom | Angle 2-Theta ° | Intensity % | Intensity Count | d value Angstrom |
|---|---|---|---|---|---|---|---|
| 7.143 | 10.9 | 398 | 12.36637 | 27.496 | 8.8 | 319 | 3.24126 |
| 9.626 | 6.7 | 242 | 9.18119 | 27.91 | 10 | 365 | 3.19418 |
| 12.202 | 4.4 | 160 | 7.24797 | 28.426 | 25.1 | 913 | 3.13738 |
| 12.739 | 16 | 581 | 6.9434 | 28.739 | 21.9 | 797 | 3.10387 |
| 14.286 | 8.3 | 303 | 6.19493 | 28.968 | 19.1 | 694 | 3.07984 |
| 14.656 | 42.8 | 1556 | 6.03938 | 29.571 | 3.9 | 140 | 3.01836 |
| 14.96 | 24.3 | 882 | 5.91713 | 30.12 | 16.5 | 601 | 2.96465 |
| 15.872 | 35.2 | 1281 | 5.57914 | 30.877 | 10.1 | 368 | 2.89365 |
| 16.446 | 8.1 | 296 | 5.38557 | 31.278 | 13.5 | 492 | 2.85746 |
| 17.535 | 57.4 | 2087 | 5.05361 | 31.98 | 6.6 | 241 | 2.79633 |
| 18.323 | 5.8 | 211 | 4.83811 | 32.876 | 6.7 | 245 | 2.7221 |
| 18.683 | 29 | 1056 | 4.74554 | 33.16 | 11.2 | 406 | 2.69947 |
| 19.263 | 7.5 | 271 | 4.60404 | 33.689 | 7.8 | 285 | 2.65827 |
| 19.77 | 100 | 3636 | 4.48699 | 34.42 | 3.5 | 129 | 2.60347 |
| 20.482 | 26.8 | 973 | 4.33268 | 34.953 | 7.9 | 287 | 2.56495 |
| 21.544 | 6.4 | 234 | 4.1215 | 35.338 | 5.7 | 208 | 2.53792 |
| 22.423 | 64.9 | 2360 | 3.96174 | 36.087 | 6.2 | 226 | 2.48692 |
| 22.887 | 45.6 | 1657 | 3.8826 | 36.441 | 4.2 | 153 | 2.46361 |
| 23.654 | 8.6 | 312 | 3.75828 | 36.98 | 9 | 326 | 2.4289 |
| 24.486 | 9.2 | 334 | 3.63254 | 37.688 | 10.1 | 368 | 2.3849 |
| 24.845 | 34 | 1235 | 3.58075 | 38.21 | 3.9 | 142 | 2.3535 |
| 25.511 | 29.9 | 1086 | 3.48888 | 38.688 | 3.9 | 141 | 2.32551 |
| 26.236 | 21.1 | 766 | 3.394 | 39.015 | 5.9 | 214 | 2.30675 |
| 26.933 | 3.9 | 143 | 3.30777 | 39.726 | 6 | 217 | 2.2671 |

Physical stability of Form I: Form I of the HCl salt was found to be stable under head and high humidity. Samples of HCl salt Form I was put into the condition of 92.5% RH or 60° C. for 10 days. Then the sample was analyzed by XRPD. Results showed that the Form I of the HCl salt was unchanged after 10 days. XRPD patterns were shown in FIG. 1C (92.5% RH for 10 days) and FIG. 1D (60° C. for 10 days). Representative DVS trace is shown in FIG. 1F. The DVS spectrum showed that the sample adsorbed 0.62% of moisture at 80% RH, and its XRPD pattern was not changed after DVS test.

Form I of the HCl salt was grinded for 2 min and 5 min. After grinding, XRPD showed the sample was still Form I, and the intensity was not decreased.

Form I of the HCl salt can dissociate to Compound 1 in water. Also, Form I of the HCl salt can be degraded in THE at 60° C.

Example 5. Preparation of Potassium Salt of Compound 1

214.3 mg of Compound 1 was added into 5 mL of methanol with stirring at room temperature. 28.08 mg of KOH was added into the suspension. The solution became clear, and reacted for 30 min. Concentrated to dry, and a sticky sample was obtained. 1 mL of ethyl acetate was added, and some solid sample appeared. Concentrated to dry again, and then 2.5 mL of ethyl acetate was added. Some solid sample was taken out and tested by XRPD and TGA, after stirred for 4 hours. The sample should be a solvate. Concentrated to dry, and dissolved with 5 mL of methanol. Concentrated again to prepare a sticky sample with more residue methanol, and then 2 mL of ethyl acetate was added. Kept stirring for 2 hours, the product was collected by filtration.

Alternatively, the potassium salt was prepared by the following procedure: 322.83 mg of Compound 1 was dissolved in 7.5 mL of 0.1 M KOH/methanol solution. Reacted for 45 min, the solution was concentrated to dry. Added 2 mL of ethyl acetate, and kept stirring for 3 hours. The sample was obtained by filtration.

The potassium salt obtained is Form III. TGA and DSC profiles showed that there was about 0.59% of weight loss prior to 250° C., and an endothermic peak with onset temperature of 250.16° C., due to the melting. PLM photo showed that the sample was needlelike shape. In water absorption study of DVS test, it adsorbed 1.32% of moisture at 80% RH as shown in FIG. 3C. After DVS test, XRPD pattern of the sample was not changed. Representative XRPD and DSC spectra are shown in FIGS. 3A and 3B. A table of XRPD peaks are shown below in Table 3.

TABLE 3

XRPD peaks of K salt in Form III:

| Angle 2-Theta ° | Intensity % | Intensity Count | d value Angstrom | Angle 2-Theta ° | Intensity % | Intensity Count | d value Angstrom |
|---|---|---|---|---|---|---|---|
| 4.338 | 10.9 | 573 | 20.35316 | 24.732 | 6.4 | 339 | 3.59694 |
| 5.674 | 54.5 | 2873 | 15.56239 | 25.116 | 4.9 | 257 | 3.54284 |
| 7.75 | 5.6 | 297 | 11.39875 | 25.597 | 11.4 | 603 | 3.47725 |
| 9.401 | 10.2 | 540 | 9.39953 | 26.065 | 3.2 | 171 | 3.41594 |
| 9.765 | 30.9 | 1628 | 9.05068 | 26.402 | 5.1 | 268 | 3.37311 |
| 11.311 | 9.8 | 514 | 7.81666 | 26.689 | 3.9 | 207 | 3.33744 |
| 13.468 | 52.5 | 2766 | 6.56928 | 27.115 | 3.9 | 205 | 3.28597 |
| 13.956 | 15.9 | 836 | 6.34075 | 27.787 | 2.6 | 138 | 3.20802 |
| 15.282 | 5.5 | 291 | 5.79306 | 28.131 | 4.8 | 251 | 3.16953 |
| 15.529 | 7.7 | 404 | 5.70176 | 28.429 | 16.5 | 869 | 3.13706 |
| 15.954 | 3.7 | 195 | 5.55076 | 29.556 | 5.4 | 284 | 3.01989 |
| 16.311 | 5.2 | 272 | 5.42987 | 29.847 | 3.3 | 174 | 2.99116 |
| 16.728 | 27.6 | 1455 | 5.29555 | 30.365 | 6 | 318 | 2.9413 |
| 16.975 | 9.9 | 523 | 5.21906 | 31.1 | 2.7 | 143 | 2.87338 |
| 17.653 | 6.2 | 329 | 5.02002 | 31.593 | 3.2 | 170 | 2.82964 |
| 17.953 | 14.9 | 786 | 4.9369 | 32.069 | 6.1 | 320 | 2.78873 |
| 18.394 | 13.6 | 719 | 4.81939 | 32.326 | 4.4 | 232 | 2.76715 |
| 18.853 | 100 | 5270 | 4.70315 | 32.542 | 3.1 | 164 | 2.74933 |
| 19.635 | 22.4 | 1178 | 4.51762 | 33.414 | 5.7 | 303 | 2.67955 |
| 20.929 | 16.3 | 858 | 4.24108 | 34.313 | 2.7 | 140 | 2.61134 |
| 21.345 | 3.6 | 189 | 4.15941 | 34.974 | 4.1 | 214 | 2.56346 |
| 22.025 | 5.1 | 270 | 4.03248 | 35.631 | 3.2 | 169 | 2.51771 |
| 22.674 | 9.5 | 500 | 3.9185 | 36.396 | 2.8 | 149 | 2.46652 |
| 23.351 | 19.6 | 1034 | 3.80641 | 36.753 | 3.1 | 163 | 2.4434 |
| 23.726 | 10.3 | 542 | 3.74705 | 37.131 | 2.7 | 141 | 2.41935 |
| 24.269 | 19.7 | 1038 | 3.66451 | 38.23 | 3.4 | 177 | 2.35229 |
| 24.468 | 11.2 | 588 | 3.63514 | 39.76 | 3.5 | 183 | 2.26523 |

It should be noted that in the procedure above, solvate was obtained when methanol was evaporated to dryness. XR-PD pattern and TGA profile of the solvate were shown in FIGS. 3D (e.g., compare the bottom two XR-PD spectra of FIG. 3D) and 3E. The solvate was dissolved in methanol, and then concentrated again with more residue methanol than the solvate above. Precipitated with ethyl acetate, crystal K salt (Form III) was formed. But the yield was very low (about 130%), and the amount of methanol was difficult to control.

To sum up, solvate of the K salt was easy to prepare, and the yield of K salt was low.

Example 6. Preparation of Sodium Salt of Compound 1

Four procedures were used for scale up study of the sodium salt. Procedure 1: 21.31 mg of Compound 1 was dissolved in 500 μL of 0.1 M NaOH/methanol solution with stirring at room temperature. Reacted for 30 min, the solution was concentrated to dry by $N_2$. Added 200 μL of ethyl acetate into the sticky sample and kept stirred for 1 hour. The clear solution was concentrated to dry again. Added 100 μL of ethyl acetate into the sticky sample, and precipitation occurred in about 1 min. The solid sample was obtained by filtration in 2 hours and dried under vacuum at 40° C. overnight.

Procedure 2: 21.13 mg of Compound 1 was dissolved in 500 μL of 0.1 M NaOH/methanol solution with stirring at room temperature. The reaction solution was concentrated to dry by $N_2$ in 45 min. Then, 400 μL of MTBE was added. Solid sample appeared in several minutes. The solid sample was collected by filtration after stirred for 1 hour. During filtration, some sample became sticky. Dried under vacuum at 40° C. overnight, the sample was characterized.

Procedure 3: 44.39 mg of Compound 1 was dissolved in 500 μL of isobutanol with stirring at 60° C. Added 40 μL of 5 M NaOH/methanol solution and reacted for 2.5 hours. The clear solution was concentrated to dry by $N_2$, and some solid sample appeared. Added 200 μL of isobutanol, and kept stirring for 1.5 hours. The solid sample was collected by filtration and dried under vacuum at 40° C. overnight.

Procedure 4: 43.17 mg of Compound 1 was dissolved in 1 mL of 0.1 M NaOH/methanol solution with stirring at room temperature. The reaction solution was concentrated to dryness in 30 min. Added 500 μL of isopropyl acetate, and kept stirring for 3 hours. The sample was collected by filtration and dried under vacuum at 40° C. overnight.

3 solvates and 1 crystal Na salt were prepared. The product obtained from Procedures 1, 2 and 3 were determined to be solvates: there was residue solvent in all three $^1$H NMR profiles, and much weight loss prior to decomposition.

Crystal Na salt in Form IV was obtained in Procedure 4. There was about 0.35% of residue isopropyl acetate in one sample. In DSC profile, there was an endothermic peak with an onset temperature of 272.90° C., due to the melting. About 0.7% of weight loss prior to 250° C. (FIG. 4B). The sample was also tested by PLM and DVS (FIG. 4C). At 80% RH, it adsorbed 30.84% of moisture. After DVS test, XRPD pattern was changed (FIG. 4D).

Representative XRPD and TGA/DSC spectra are shown in FIGS. 4A and 4B. A table of XRPD peaks are shown below in Table 4.

TABLE 4

XRPD peaks of Na salt in form IV:

| Angle 2-Theta ° | Intensity % % | Intensity Count | d value Angstrom | Angle 2-Theta ° | Intensity % % | Intensity Count | d value Angstrom |
|---|---|---|---|---|---|---|---|
| 6.64 | 15.4 | 525 | 13.30169 | 23.592 | 8.1 | 278 | 3.76809 |
| 7.692 | 39 | 1332 | 11.48413 | 24.514 | 13.2 | 451 | 3.62848 |
| 9.391 | 25.4 | 866 | 9.40957 | 25.193 | 15.2 | 520 | 3.53217 |
| 10.768 | 36.9 | 1261 | 8.20933 | 25.549 | 10 | 342 | 3.48376 |
| 11.43 | 51 | 1740 | 7.73569 | 26.536 | 9.5 | 325 | 3.35635 |
| 12.716 | 59.2 | 2021 | 6.95616 | 27.006 | 9.7 | 331 | 3.29897 |
| 13.225 | 92.2 | 3146 | 6.68938 | 27.576 | 28.2 | 963 | 3.23202 |
| 14.668 | 14.3 | 487 | 6.03444 | 28.415 | 8.1 | 275 | 3.13856 |
| 15.207 | 9.4 | 322 | 5.82177 | 28.999 | 14.4 | 490 | 3.07658 |
| 15.639 | 16.2 | 554 | 5.66163 | 29.453 | 10.9 | 373 | 3.03022 |
| 16.167 | 10.4 | 354 | 5.47813 | 30.528 | 6.5 | 222 | 2.92597 |
| 16.604 | 22 | 750 | 5.33494 | 30.859 | 7.1 | 242 | 2.8953 |
| 16.969 | 15.5 | 529 | 5.22101 | 31.617 | 7.2 | 245 | 2.82758 |
| 17.874 | 48.6 | 1659 | 4.95864 | 32.551 | 11.5 | 392 | 2.74859 |
| 18.26 | 27.7 | 947 | 4.85467 | 32.878 | 6.1 | 208 | 2.72198 |
| 18.787 | 29 | 991 | 4.71967 | 33.492 | 11.8 | 404 | 2.67342 |
| 19.036 | 18.9 | 644 | 4.65841 | 34.98 | 7.6 | 260 | 2.56303 |
| 19.406 | 14.8 | 506 | 4.57045 | 35.359 | 7.3 | 250 | 2.53642 |
| 19.96 | 40 | 1366 | 4.44483 | 35.922 | 6.6 | 225 | 2.49797 |
| 21.266 | 8.5 | 291 | 4.17461 | 36.462 | 5.3 | 181 | 2.46219 |
| 21.829 | 41.2 | 1406 | 4.06831 | 37.585 | 5.2 | 177 | 2.39119 |
| 22.071 | 100 | 3413 | 4.02411 | 38.621 | 6.9 | 237 | 2.32937 |
| 22.855 | 32.4 | 1107 | 3.88795 | 38.959 | 6.3 | 216 | 2.30997 |
| 23.122 | 27.5 | 938 | 3.84366 | 39.815 | 5.5 | 189 | 2.26223 |

Example 7. Preparation of HBr Salt of Compound 1

Four procedures were used for scale up study of the HBr salt. Procedure 1: 43.90 mg of Compound 1 was dissolved in 600 μL of isopropyl acetate with stirring at 60° C. Then, 14.5 μL of HBr acid was added. Sticky sample was produced immediately. Added 100 μL of methanol, the solution became clear. Reacted at 60° C. for 20 min, and then cooled slowly to room temperature. No solid sample appeared. Concentrated to dry, 100 μL of isopropyl acetate was added. No solid product was obtained. Concentrated to dry again, and added 20 μL of methanol, solid sample appeared. Added 500 μL of isopropyl acetate, and stirred for an hour. The solid sample was collected by filtration.

Procedure 2: 43.13 mg of Compound 1 was dissolved in 300 μL of methanol with stirring at 60° C. 14.5 μL of HBr acid was added and reacted for 30 min. Cooled to room temperature, no solid product appeared. Concentrated to dry, 500 μL of isopropyl acetate was added. Kept stirring for 1 hour, the solid sample was collected by filtration.

Procedure 3: 32.22 mg of Compound 1 was added into 600 μL of acetone. The sample could not dissolve completely with stirring at room temperature. After 14.5 μL of HBr acid was added, the reaction solution became clear. Precipitation occurred in several minutes. Kept stirring for 3 hours, the solid product was collected by filtration.

Procedure 4: 32.84 mg of Compound 1 was added into 300 μL of IPA. The sample could not dissolve completely with stirring at room temperature. After 14.5 μL of HBr acid was added, the reaction solution became clear. Precipitation occurred in several minutes. Kept stirring for 3 hours, the solid product was collected by filtration.

Four HBr salts with same XRPD patterns were formed. HBr salts were formed with residue solvent. LCMS results showed that by-product was formed with methanol at 60° C. in acid condition (see Procedures 1 and 2). The molecular weight of the by-product was also 444.

Representative XRPD and TGA/DSC spectra for the salt obtained from Procedures 3 and 4 are shown in FIGS. 5A and 5B. A table of XRPD peaks are shown below in Table 5.

TABLE 5

XRPD peaks of HBr salt in form V:

| Angle 2-Theta ° | Intensity % % | Intensity Count | d value Angstrom | Angle 2-Theta ° | Intensity % % | Intensity Count | d value Angstrom |
|---|---|---|---|---|---|---|---|
| 4.851 | 20 | 607 | 18.20032 | 26.106 | 31.5 | 956 | 3.41066 |
| 7.417 | 70.5 | 2139 | 11.90951 | 27.054 | 8.8 | 266 | 3.29328 |
| 9.566 | 11.4 | 346 | 9.23865 | 27.433 | 13.1 | 398 | 3.24861 |
| 12.104 | 6.1 | 186 | 7.3062 | 27.785 | 10.1 | 306 | 3.20825 |
| 12.67 | 16.2 | 492 | 6.98115 | 28.218 | 29.5 | 895 | 3.15995 |
| 13.417 | 5.7 | 172 | 6.59403 | 28.552 | 31.8 | 965 | 3.12374 |
| 14.187 | 7.9 | 240 | 6.23784 | 28.911 | 51.6 | 1563 | 3.08575 |
| 14.441 | 13.7 | 414 | 6.12877 | 29.765 | 15.3 | 464 | 2.99914 |
| 14.865 | 43 | 1303 | 5.95473 | 29.975 | 27.4 | 831 | 2.97865 |
| 15.648 | 11.5 | 350 | 5.65858 | 30.684 | 15.7 | 475 | 2.91139 |
| 16.452 | 25.9 | 784 | 5.38385 | 31.195 | 31.1 | 942 | 2.86485 |
| 17.345 | 48 | 1454 | 5.10849 | 31.767 | 11 | 334 | 2.8146 |
| 18.088 | 7.9 | 240 | 4.90039 | 32.543 | 8.7 | 263 | 2.74922 |
| 18.532 | 14.8 | 448 | 4.78382 | 32.774 | 11.6 | 351 | 2.73033 |

TABLE 5-continued

XRPD peaks of HBr salt in form V:

| Angle 2-Theta ° | Intensity % % | Intensity Count | d value Angstrom | Angle 2-Theta ° | Intensity % % | Intensity Count | d value Angstrom |
|---|---|---|---|---|---|---|---|
| 19.208 | 12.2 | 371 | 4.61712 | 33.401 | 13.9 | 421 | 2.68056 |
| 19.613 | 100 | 3032 | 4.52268 | 34.4 | 9.4 | 286 | 2.60496 |
| 20.286 | 22.1 | 670 | 4.374 | 35.247 | 14 | 425 | 2.54423 |
| 21.41 | 10.9 | 329 | 4.14687 | 36.039 | 17.5 | 532 | 2.49012 |
| 22.291 | 93.8 | 2845 | 3.9849 | 36.285 | 11.7 | 354 | 2.47381 |
| 22.649 | 34.1 | 1035 | 3.92272 | 36.883 | 20.3 | 616 | 2.43509 |
| 23.253 | 8.1 | 246 | 3.82229 | 37.316 | 10.4 | 316 | 2.40783 |
| 23.533 | 8.9 | 271 | 3.77741 | 37.731 | 10.6 | 322 | 2.38229 |
| 24.279 | 10.8 | 328 | 3.66297 | 38.259 | 5.5 | 168 | 2.3506 |
| 24.67 | 48.6 | 1473 | 3.6058 | 38.897 | 15 | 455 | 2.31352 |
| 25.269 | 34.2 | 1037 | 3.52166 | 39.433 | 10.5 | 317 | 2.28329 |
| 25.492 | 39.2 | 1189 | 3.4914 | 39.695 | 7.6 | 230 | 2.26882 |

Example 8. Solubility and Stability Test of Compound 1, K Salt and HCl Salt

Solubility test: About 15-20 mg of Compound 1 (Form II), K salt (Form III) and HCl salt (Form I) were weighed into vials, and then added 1.5 mL of pH 1.2, pH 6.8 or pH 7.4 buffer to make saturated solutions.

All suspensions were kept shaking with 200 rpm at room temperature for up to 24 hours. At 30 min and 24 hours, the sample solution was filtered and analyzed by HPLC to determine the solubility. The pH of filtrates was also measured. At 24 hours, remaining solids were collected and determined by XRPD.

Stability test: About 15 mg of Compound 1 (Form II), and K salt (Form III) were weighed into vials, and put at the condition of 40° C./75% RH for 9 days. At 0 and 9 days, the solid sample was dissolved using methanol/water (1/1) to make a solution with a concentration of 0.2 mg/mL. Sample solutions were analyzed by HPLC and solid samples were examined by XRPD.

About 15 mg of Compound 1 HCl salt (Form I) was weighed into vials, and put at the condition of 40° C./75% RH for 7 days. At 0 and 7 days, the solid sample was dissolved using methanol/water (1/1) to make a solution with the concentration of 0.2 mg/mL. The sample solution was analyzed by HPLC and solid sample was analyzed by XRPD.

Results of Solubility Test

First, the solubility of Compound 1, HCl salt and K salt was tested in pH 1.2, 6.8 and 7.4 buffer solutions at 25° C. for 30 min and 24 hours. The solubility data and pH value of filtrate were listed in Table 6 and Table 7, respectively.

Salts showed advantage of improving solubility over Compound 1 in buffer solutions at 30 min, and the solubility of K salt was much higher. pH of HCl salt in pH 6.8 and 7.4 buffer solutions were obviously decreased, while the pH of K salt in buffers increased.

Remaining solid samples at 24 hours were tested by XRPD. Salts in pH 6.8 and 7.4 buffers were dissociated. A small portion of Compound 1 and K salt were changed into HCl salt in pH 1.2 buffer solution.

TABLE 6

Solubility results of Compound 1, K salt and HCl salt

| Sample | Buffer | Solubility (mg/mL) 30 min | Solubility (mg/mL) 24 hours |
|---|---|---|---|
| Compound 1 | pH 1.2 | 0.49 | 0.51 |
|  | pH 6.8 | 0.13 | 0.04 |
|  | pH 7.4 | 0.44 | 0.50 |
| K salt | pH 1.2 | 9.52 | 0.71 |
|  | pH 6.8 | 2.55 | 0.55 |
|  | pH 7.4 | 6.38 | 2.25 |
| HCl salt | pH 1.2 | 0.58 | 0.65 |
|  | pH 6.8 | 1.45 | 0.02 |
|  | pH 7.4 | 3.66 | 0.49 |

TABLE 7 pH value of filtrate at 30 min and 24 hours

| Sample | Buffer | pH 30 min | pH 24 hours |
|---|---|---|---|
| Compound 1 | pH 1.2 | 1.11 | 1.16 |
|  | pH 6.8 | 6.87 | 6.81 |
|  | pH 7.4 | 7.39 | 7.38 |
| K salt | pH 1.2 | 1.18 | 1.23 |
|  | pH 6.8 | 6.84 | 7.46 |
|  | pH 7.4 | 7.62 | 8.02 |
| HCl salt | pH 1.2 | 1.10 | 1.17 |
|  | pH 6.8 | 6.59 | 3.34 |
|  | pH 7.4 | 7.02 | 6.06 |

The solubility of HCl salt was obviously decreased in pH 6.8 and 7.4 buffers at 24 hours. Additional solubility of Compound 1 and the HCl salt was tested in pH 6.8 and 7.4 for 30 min and 2 hours. The data was listed in Table 8.

In pH 6.8 buffer, the solubility of HCl salt was decreased at 2 hours. While in pH 7.4 buffer, the solubility was almost constant with that at 30 min. XRPD showed that part of HCl salt had been changed to be Compound 1 in pH 6.8 and 7.4 buffers at 2 hours.

TABLE 8

Solubility results of Compound 1 and HCl salt in pH 6.8 and 7.4 at 30 min and 2 hours

| Sample | Buffer | Solubility (mg/mL) | |
|---|---|---|---|
| | | 30 min | 2 hours |
| Compound 1 | pH 6.8 | 0.11 | 0.12 |
| | pH 7.4 | 0.39 | 0.44 |
| HCl salt | pH 6.8 | 1.62 | 0.95 |
| | pH 7.4 | 3.41 | 3.53 |

Results of Solid Stability Test

K salt and Compound 1 was stored at 40° C./75% RH for 9 days, while HCl salt was stored for 7 days. XRPD and HPLC results showed that samples were all physically and chemically stable at 40° C./75% RH during testing period. HPLC results were shown in Table 9.

TABLE 1

HPLC results of solid stability test.

| Sample | Purity (% Area) | | |
|---|---|---|---|
| | Initial | 7 days | 9 days |
| Compound 1 | 99.53 | / | 99.53 |
| K salt | 99.80 | / | 99.79 |
| HCl salt | 99.81 | 99.78 | / |

CONCLUSION

In solubility testing, K salt and HCl salt showed higher solubility than Compound 1. In solid stability test, the salts and Compound 1 were found to be physically and chemically stable at 40° C./75% RH during testing period.

The process of HCl salt preparation was more feasible, which is more repeatable and with higher yield compared to the potassium salt preparation.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

With respect to aspects of the invention described as a genus, all individual species are individually considered separate aspects of the invention. If aspects of the invention are described as "comprising" a feature, embodiments also are contemplated "consisting of" or "consisting essentially of" the feature.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be incorporated by reference. To the extent that any meaning or definition of a term in this document conflicts with any meaning or definition of the same term in a document incorporated by reference, the meaning or definition assigned to that term in this document shall govern.

What is claimed is:

1. A hydrochloride salt of Compound 1:

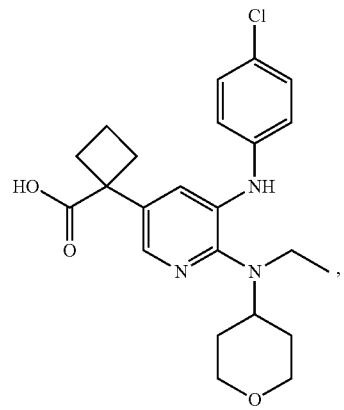

Compound 1 which is in a crystalline Form I, characterized by an X-ray powder diffraction (XRPD) pattern having the following peaks: 14.7, 17.5, 19.8, 22.4, 22.9 degrees 2 theta, ±0.2°.

2. The hydrochloride salt of claim 1, wherein the crystalline Form I is characterized by an X-ray powder diffraction (XRPD) pattern having the following peaks: 12.7, 14.7, 15.0, 15.9, 17.5, 18.7, 19.8, 20.5, 22.4, 22.9, 24.8, 25.5, 26.2, 28.4, 28.7, 29.0 and 30.1 degrees 2 theta, ±0.2°.

3. The hydrochloride salt of claim 1, which is prepared by a process comprising: a) mixing Compound 1 and HCl in a solvent system comprising at least one non-aqueous solvent to form the hydrochloride salt; and b) separating the hydrochloride salt from the solvent system.

4. The hydrochloride salt of claim 3, wherein the at least one non-aqueous solvent comprises isopropanol.

5. The hydrochloride salt of claim 3, wherein the solvent system is free of a primary alcohol.

6. The hydrochloride salt of claim 1, which has a purity by weight and/or by HPLC area of at least 90%.

7. A pharmaceutical composition comprising the hydrochloride salt of claim 1, and optionally a pharmaceutically acceptable excipient.

8. The pharmaceutical composition of claim 7, which is free of Compound 1 in free acid form.

9. The pharmaceutical composition of claim 7, comprising the hydrochloride salt, wherein the pharmaceutical composition is free of Compound 1 in a salt form other than hydrochloride salt.

10. The pharmaceutical composition of claim 7, comprising the hydrochloride salt, wherein the pharmaceutical composition is free of hydrochloride salt of Compound 1 in a solid form other than Form I.

11. The pharmaceutical composition of claim 7, further comprising hydrochloride salt of Compound 1 in an amorphous form.

12. The pharmaceutical composition of claim 7, which is a solid dosage form.

\* \* \* \* \*